US007030890B1

(12) United States Patent
Jouet et al.

(10) Patent No.: US 7,030,890 B1
(45) Date of Patent: Apr. 18, 2006

(54) DISPLAYING GRAPHICAL OBJECTS

(75) Inventors: Bruno Jouet, Paris Cedex (FR); Emile Nguyen Van Huong, Paris Cedex (FR); Jean-Stephane Villers, Cergy (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 135 days.

(21) Appl. No.: 10/111,928

(22) PCT Filed: Nov. 1, 2000

(86) PCT No.: PCT/IB00/01720

§ 371 (c)(1),
(2), (4) Date: Aug. 21, 2002

(87) PCT Pub. No.: WO01/33344

PCT Pub. Date: May 10, 2001

(30) Foreign Application Priority Data

Nov. 2, 1999 (EP) .................................. 99402721
Feb. 3, 2000 (EP) .................................. 00300832

(51) Int. Cl.
*G09G 5/00* (2006.01)
(52) U.S. Cl. .................. 345/619; 345/700; 345/589; 345/590; 345/593; 345/594
(58) Field of Classification Search ................ 345/619, 345/700, 589, 590, 593, 594
See application file for complete search history.

(56) References Cited

U.S. PATENT DOCUMENTS

| 5,629,720 | A | * | 5/1997 | Cherry et al. ................ 345/601 |
| 5,631,825 | A | * | 5/1997 | van Weele et al. ............ 700/83 |
| 5,774,121 | A | * | 6/1998 | Stiegler ....................... 345/769 |
| 5,831,633 | A | * | 11/1998 | Van Roy ...................... 345/441 |
| 5,844,542 | A | * | 12/1998 | Inoue et al. .................. 345/594 |
| 5,861,889 | A | * | 1/1999 | Wallace et al. ............... 345/619 |
| 5,995,653 | A | * | 11/1999 | Reed et al. ................... 382/162 |
| 6,023,271 | A | * | 2/2000 | Quaeler-Bock et al. ...... 715/866 |
| 6,097,384 | A | * | 8/2000 | Alecci et al. ................. 715/767 |
| 6,154,747 | A | * | 11/2000 | Hunt .......................... 707/100 |
| 6,343,265 | B1 | * | 1/2002 | Glebov et al. ................ 703/25 |
| 6,424,354 | B1 | * | 7/2002 | Matheny et al. .............. 345/619 |
| 6,441,833 | B1 | * | 8/2002 | Anderson et al. ............ 715/762 |
| 6,559,860 | B1 | * | 5/2003 | Hamilton et al. ............ 345/700 |
| 6,577,323 | B1 | * | 6/2003 | Jamieson et al. ............ 345/700 |

(Continued)

FOREIGN PATENT DOCUMENTS

EP     0 725 337 A1     8/1996

(Continued)

OTHER PUBLICATIONS

"Generic View Handler Class," IBM Technical Disclosure Bulletin, vol. 34, No. 1, Jun. 1991, 2 pages.

*Primary Examiner*—Matthew C. Bella
*Assistant Examiner*—Mike Rahmjoo
(74) *Attorney, Agent, or Firm*—Osha Liang LLP

(57) ABSTRACT

Aspects of the present invention relate to a method of controlling the appearance of a graphical object in a graphical user interface. In an embodiment of an aspect of the invention, an object, such as a widget, in a graphical user interface comprises an instance of a widget class in which arr defined properties and/or methods which control operation of the object; and an associated instance of a look object class in which are defined properties and/or methods which control the look of the object.

14 Claims, 41 Drawing Sheets

U.S. PATENT DOCUMENTS

| | | | |
|---|---|---|---|
| 6,587,129 B1* | 7/2003 | Lavendel et al. | 345/776 |
| 6,731,314 B1* | 5/2004 | Cheng et al. | 715/848 |
| 2002/0126147 A1* | 9/2002 | Lavendel et al. | 345/764 |
| 2004/0055006 A1* | 3/2004 | Iwamura | 725/37 |

FOREIGN PATENT DOCUMENTS

| | | |
|---|---|---|
| EP | 0 798 634 A1 | 10/1997 |
| WO | WO 95/31773 | 11/1995 |
| WO | WO 96/34466 | 10/1996 |

\* cited by examiner

FIG. 32
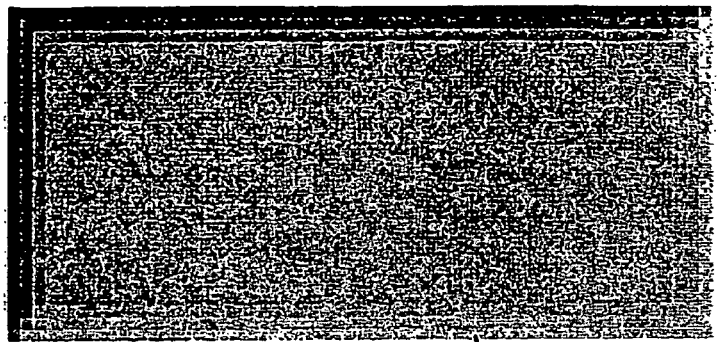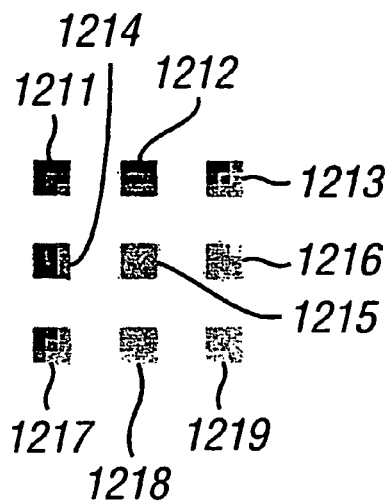
1211 1214 1212
1213
1216
1215
1217 1218 1219
1220
FIG. 33
1222 1226 1223
1221
1224
1225
1227 1228 1229
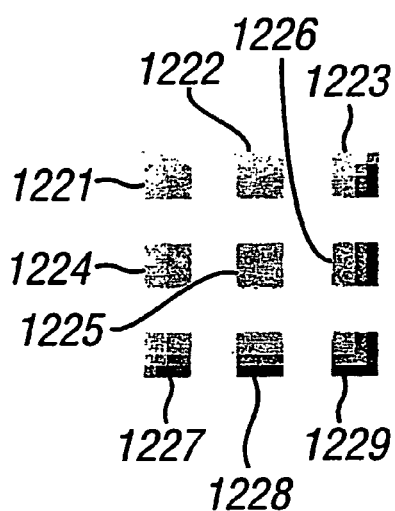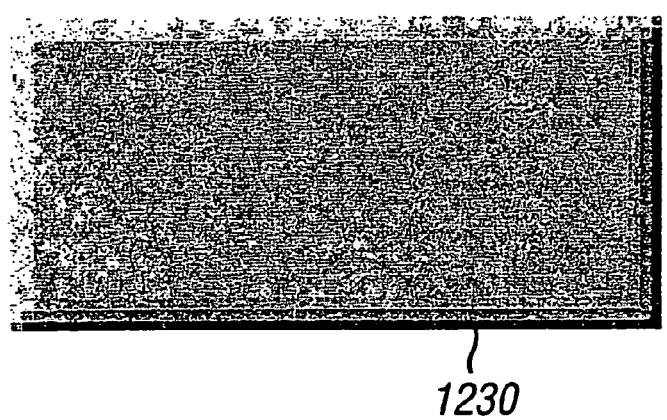
1230
FIG. 34
   
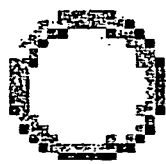 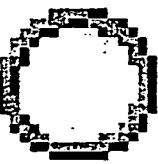  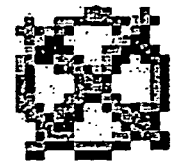

FIG. 43

| , | ~ | - |
|---|---|---|
| ; | < | > |
|   | 2 | _ |
| ◀ | | |

~1523

| ( | ) | * |
|---|---|---|
| [ | ] | + |
| { | } | = |
| | | |

| # | % | \| |
|---|---|---|
| " | » | ' |
| \ | ^ | ¶ |
| | ¢ | |

1522 ⌒ 1521

| h | t | p |
|---|---|---|
| . | f | r |
| c | o | m |
| ◀ | | |

1520

| à | â | ç |
|---|---|---|
| é | è | ê |
| ī | ô | û |
| | | |

| ē | ¨ | ° |
|---|---|---|
| $ | £ | § |
| μ | @ | ¶ |
| | ◀ | |

1521

| » | ↑ | ¶ |
|---|---|---|
| ← | | → |
| » | ↓ | ¢ |
| ◀ | | |

| 1 | 2 | 3 |
|---|---|---|
| 4 | 5 | 6 |
| 7 | 8 | 9 |
| | 0 | |

| ! | , | - |
|---|---|---|
| ? | = | & |
| √ | : | . |
| | @ | |

| a | b | c |
|---|---|---|
| d | e | f |
| g | h | i |
| ◀ | | |

| j | k | l |
|---|---|---|
| m | n | o |
| p | q | r |
| | | |

| s | t | u |
|---|---|---|
| v | w | x |
| y | z | ¶ |
| | ¢ | |

| A | B | C |
|---|---|---|
| D | E | F |
| G | H | I |
| ◀ | | |

| J | K | L |
|---|---|---|
| M | N | O |
| P | Q | R |
| | | |

| S | T | U |
|---|---|---|
| V | W | X |
| Y | Z | ¶ |
| | ¢ | |

NB:  » Tab         ← Move left       ↑ Move up
     ¶ Carriage return  → Move right     ↓ Move down
     ¢ Cancel      ◀ Backspace

DISPLAYING GRAPHICAL OBJECTS

The present invention relates to graphical user interfaces. Aspects of the present invention relate to a method of controlling the appearance of a graphical object in a graphical user interface. Aspects of the invention relate to a receiver/decoder, a television system, a computer program product, a computer readable medium and a signal. Aspects of the invention have a particular, but not exclusive, application in providing a graphical user interface for appliances such as receiver/decoders for digital television signals. However, aspects of the invention also have application to general purpose computers and other appliances.

Most graphical user interfaces (GUIs) include a similar set of basic components that can be manipulated by a user. These include such objects as push-buttons, sliders, list boxes, and so forth. Such components are referred to generically as "widgets". Although the basic function of widgets is common amongst many GUIs, the appearance of the widgets differs from one GUI to another.

Some graphical operating systems, the X window system for example, impose few constraints upon the appearance of widgets that can be displayed in the GUI. This allows programmers to develop applications using a number of different widget sets, each of which has its own distinctive appearance. Moreover, a large number of window managers run under X which influence the overall appearance of windows created by applications. Normally, it is possible to exercise some control over the appearance of an application as displayed on the GUI both during development of the application and to some extent at run time. However, the appearance is, in both cases, determined by hard coded parts of the widget set or the window manager. It is not possible for a user to change significantly the look of an application without re-coding the widget set, the window manager, or both. Either of these options requires a large amount of re-coding work and a large amount of new code to be installed on a host system.

One proposal to reduce the amount of re-coding work that must be done in order to update a look is to build elements (for example, corners, borders, and so forth) of a window in a GUI display from pixel maps stored in memory of a host system. This may be provided as an independent aspect of the invention. However, the pixel maps can occupy a significant amount of memory when in use, and represent a large amount of data to be transferred when the look is to be updated. This can be a significant disadvantage if the GUI must operate with limited resources and must be updated over a link of limited bandwidth. One example of such a situation arises when an application is executed on a receiver/decoder for digital television signals. Such a decoder has a limited amount of memory as compared with a general purpose computer, and the software (including the look of the GUI) is updated by downloading data from a channel which forms part of the received television signal.

An aim of this invention is to provide an application developer with the ability to control the appearance of an application in a consistent and readily controllable manner, with a minimum of re-coding being necessary, and with a minimum of data required to be transferred to an execution environment.

In a first aspect of the present invention there is provided a method of controlling the appearance of a graphical object in a graphical user interface, comprising
    defining a look object; and
    associating the look object with the graphical object.

By explicitly defining a look object, rather than embedding code which controls appearance in an application, the invention may allow greater flexibility than hitherto in the way in which the appearance of a graphical object is controlled.

Preferably the look object includes code or parameters determining how the graphical object is displayed, such code or parameters preferably being stored in memory. For example, the look object may be defined by object-oriented program code.

The look object may be defined by instantiating a look object class. A look object which is defined in this way may contain a pointer to another look object class (other than that from which it is derived). This can allow the look object to access attributes and/or methods of that other look class. In this way, a look object can take its characteristics from two or more other looks, which can allow a look to be created which is the union of two different looks, or allow extra characteristics to be added to the look.

In order to associate the graphical object with the look object, the graphical object may include an attribute identifying the look object associated with the graphical object.

Preferably, the look object defines actual colours which are assigned to specific named colours. For example, the look object may define the actual colours which are assigned to at least one of black, white and one or several shades of grey. In this way, the look can define a certain colour scheme, for example, by giving a certain hue to graphical objects associated with that look. The look object may also define a colour map which sets the actual colour values which are to be used when displaying any particular colour.

In order to change the appearance of the graphical object, either the look object may be re-defined or modified (for example by changing the code or parameters at compile time, or the parameters at run time), or a different look object may be associated with the graphical object. The method may therefore further comprise modifying the appearance of the graphical object by re-defining or modifying the look object or by associating a different look object with the graphical object.

If a look object is re-defined or modified, then it may be necessary to update the appearance of graphical objects which are associated with that look object. In order to achieve this, the look object may include an update counter whose value is updated when the look object is re-defined or modified.

Preferably, graphical objects store the value of the update counter of the look object which they have affected. Each time a graphical object is to be redisplayed, the value stored by the graphical object is compared with the value of the update counter of the look object. If the two are different, the graphical object takes into account the modifications in the look object, and stores the new value of the update counter.

The look object may include a validation mask which indicates methods that can be called by the look object, so that methods which are not implemented by the look object are not called. The graphical object can access the validation mask of the look object to optimise the drawing of the graphical object. In this way, calls to methods which are not implemented can be avoided, which can speed up the drawing of the graphical object.

In some circumstances, for example when a look object is first created, the look object may be associated with a single graphical object. However, in preferred embodiments, the look object is associated with a plurality of graphical objects. By associating the look object with a plurality of graphical objects, a uniform appearance for those objects may be achieved, and the amount of data required for defining the look object may be reduced, in comparison to the case where each graphical object has its appearance defined independently.

Thus, the method may be a method of controlling the appearance of a plurality of graphical objects in a graphical user interface, and may comprise associating the look object with the plurality of graphical objects.

In certain situations, such as where no graphical objects are associated with a look object, it may be desirable to delete the look object, for example to enable the memory space used by the look object to be re-allocated. This may be particularly important in devices such as receiver/decoders where memory may be limited. For this purpose (amongst others) the look object may include a counter which indicates the number of graphical objects which are associated with that look object. Preferably, each time a graphical object is associated with the look object, the counter is incremented, and each time a graphical object is disassociated with the look object, the counter is decremented. If the counter is at zero, then it may be assumed that the look object can be safely deleted.

In another method aspect of the invention, there is provided a method of defining a graphical object in a graphical user interface, comprising providing a look object which controls the appearance of the graphical object (for example, by defining properties and/or methods which control the appearance of the graphical object), and providing a widget object which controls operation of the graphical object (for example, by defining properties and/or methods which control the operation of the graphical object). Any of the features mentioned above may be provided in combination with this aspect.

Any of the methods described above preferably further comprise displaying the graphical object, for example on a screen such as a computer screen or a television screen.

Any of the methods described above may be carried out by a receiver/decoder, such as a digital or analogue television receiver/decoder.

The term "receiver/decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser, a video recorder, or a television. In an apparatus aspect of the invention there is provided apparatus for controlling the appearance of a graphical object in a graphical user interface, comprising:
  means for defining a look object, for example by creating or modifying code or parameters in memory determining how a graphical object will be displayed; and
  means for associating the look object with the graphical object, for example by setting an attribute of the graphical object to identify the look object.

Preferably the apparatus includes a suitably programmed processor for defining the look object and for associating the look object with the graphical object, and memory for storing the look object and the graphical object. The look object may be defined by object-oriented program code. The look object may be defined by instantiating a look object class. The look object may contain a pointer to another look object class.

The apparatus may be adapted to modify the appearance of the graphical object, by re-defining or modifying the look object, or by associating a different look object with the graphical object. The look object may include an update counter (such as a location in memory) whose value is updated when the look object is re-defined or modified.

The look object may include a validation mask (for example, stored in memory) which indicates methods that can be called by the look object.

The apparatus may be apparatus for controlling the appearance of a plurality of graphical objects in a graphical user interface, and may be adapted to associate the look object with a plurality of graphical objects. The look object may include a counter (such as a location in memory) which indicates the number of graphical objects which are associated with that look object.

The apparatus may further comprise means, such as a screen (for example a computer screen or a television screen) for displaying the graphical object.

In one embodiment, the apparatus is a receiver/decoder, such as a digital or analogue television receiver/decoder.

In a further aspect, the invention provides an object in a graphical user interface, comprising an instance of a widget class which controls operation of the object, and an instance of a look object class which controls the appearance of the object.

The invention also provides a widget set for creating objects as described above, the widget set comprising a plurality of widget classes and one or more look object classes. Most typically, the widget set comprises a plurality of look object classes including a base class and a class derived from the base class.

In order to amend the appearance of the object, the look object class can be changed. This does not change the function of the object since function is controlled by the widget class. Moreover, it is possible for one instance of the look object class to be used by many instances of the widget class, thereby minimising the amount of memory used.

The look object class can be contained in a library linked into an application at run time. A user can therefore select a preferred look for the object by selecting which one of a range of libraries should be linked. Because the look object class is changed independently of the other items, re-coding is simplified to the minimum necessary to implement the new look.

Alternatively, the look object class can be contained in a library linked into an application at compile time. This allows an application developer to have full control of the appearance of the object.

The look object class may export drawing methods that can be invoked to draw part of a component on a GUI display. The widget class typically contains code which invokes drawing methods of the look object class. The look object class may also export properties which provide data relating to elements of a component.

The look object class may be a default class which provides a default look for widgets in a GUI display. Alternatively, the look object class may be a class derived from a default class, the derived class overriding one or more methods and/or properties of the default class. By this arrangement, a user or a developer can make changes to just a limited number of elements within the look of a GUI without having to re-work any parts which are to remain unchanged.

The look object class instance may be a property of the widget class instance. Typically, a pointer to an instance of the look object class is assigned to a property of the widget class instance. Such a pointer may be passed as an argument to a constructor of the widget class.

The invention also provides a method of creating an object in a graphical user interface in which a look object class is instantiated in which is defined properties and/or methods which control the look object of the object; and a widget class is instantiated which is defined properties and/or methods which control operation of the object.

In a method according to the last-preceding paragraph, a pointer to the look object class is typically stored in instance memory of the widget class instance.

By controlling operation, it is not necessarily meant that the object is functional; whereas sliders and buttons and the like may be capable of performing actions, some graphical objects may simply be decorative, such as symbols or parts of composite objects. Thus the properties and/or methods which control operation of the object may do little more than determine the basic function of the object (for example to appear as a pointer), with the precise appearance being controlled by the look object.

In another aspect, the invention provides a method of creating a plurality of objects in a graphical user interface in which a look object class is instantiated in which look object class is defined properties and/or methods which control the look of the objects; and a widget class is instantiated a plurality of times in which is defined properties and/or methods which control operation of the object.

In another aspect, the invention provides a method of implementing a graphical user interface display for an application execution device (for example, a computer, a receiver/decoder for a digital television signal, or another device) comprising loading a widget set as described above into memory of the appliance, creating a plurality of objects in the graphical user interface by a method as described above, and displaying the objects on the display.

In such a method applied to a receiver/decoder, the widget set may be loaded into memory of the receiver/decoder by being downloaded in a channel within a digital television signal.

In another aspect, the invention provides a method of updating the appearance of a graphical user interface display for an application execution device, which display includes a widget set as described above, in which at least one look object class is replaced by another look object class.

In another aspect, the invention provides a method of updating the appearance of a graphical user interface display of a receiver/decoder for a digital television signal, which display includes a widget set as described above stored in memory of the receiver/decoder in which at least one replacement look object class is transmitted to the receiver/decoder in a channel being part of a digital television signal to replace a stored look object class.

The invention extends to corresponding apparatus. In particular, the invention extends to a receiver/decoder arranged to perform a method of any preceding aspect.

In another aspect, the invention provides an application execution device (for example, a computer, a receiver/decoder for a digital television signal, or another device) for implementing a graphical user interface, comprising a processor, memory, and an output port for outputting a signal to a display, the memory having stored therein a program for carrying out any of the methods described above, or any of the objects described above, or any of the widget sets described above.

In any of the above cases, the look object or look object class preferably defines how at least one of the following properties (if present) of a graphical object are displayed:— the background appearance, for example a background colour;
a background overlay, for example a logo;
the foreground appearance;
a foreground overlay, for example a logo;
the appearance of relief or shading;
the appearance of an object border;
the display of any focus assigned to the object;
the display of any highlighting assigned to the object.

The invention also extends to a computer program for carrying out any of the above methods, and to a computer readable medium having stored thereon a program for carrying out any of the above methods. The invention also extends to an application for a receiver/decoder arranged to perform a method of any preceding aspect. The invention also extends to a method or apparatus substantially as described herein with reference to the accompanying drawings.

Design of Displayed Graphical Objects

Most graphical user interfaces (GUIs) display various graphical objects, some of which can be manipulated by a user ("active" objects) and some which cannot ("static" objects). Preferably, as is described above, the displayed graphical objects are preferably designed to complement each other to produce a coherent design scheme. For example, the displayed graphical objects preferably share a main colour and texture and font, where appropriate. A design scheme is called herein a "look" of the graphical objects.

In some cases, only the look of the active graphical objects can be altered by the user. According to an aspect of the present invention, preferably the look of static graphical objects is alterable. According to an aspect of the invention, preferably the look of a group of graphical objects is alterable. Thus a coherent design of the displayed graphical objects can be obtained.

With reference to other aspects of the invention, where graphical objects and link elements are displayed, preferably both the look of the graphical objects and of the link elements are changeable. Preferably the look of both the graphical objects and the link elements are the same in the look selectable by the user. In this way a coherent look for displayed chains of graphical objects can be achieved.

In preferred aspect of the invention, the look of the chain is selectable independently of the look of other graphical objects displayed.

An aspect of the invention comprises a method of controlling the appearance of a plurality of graphical objects in a graphical user interface, the method comprising associating a look object with a plurality of graphical objects.

In a preferred embodiment of the invention, the plurality of graphical objects comprises a linked chain. Thus preferably, a particular look or design can be applied to the chain or linked list as a whole. Preferably, the look or design can be applied to the chain, linked list or graphical object independently of any look or design applied to other chains, linked lists or graphical objects.

An aspect of the invention provides a method of displaying a group of graphical objects, the method including the step of providing means for defining a plurality of different displayable groups of graphical objects and for selecting a group of graphical objects from the plurality of displayable groups.

Preferably the method comprises defining a displayable group of graphical objects and associating a look object with the group of graphical objects.

According to the invention there is provided a method of controlling the appearance of a group of graphical objects, the method including defining a displayable group of graphical objects.

Also provided is an apparatus for controlling the appearance of a group of graphical objects, the apparatus including means for defining a displayable group of graphical objects.

Preferably the representation of graphical objects from a group differ from the representation of graphical objects of another group, for example in one or more of colour, shape, size, texture or pattern.

Preferably the group of graphical objects comprises elements for displaying a linked chain of graphical objects.

Preferably the group of graphical objects comprises static objects and active objects. Thus the apparatus may comprise a library of groups of graphical objects, preferably having different looks or designs.

Preferably, displayed graphical objects from a first group differ from displayed graphical objects of another group in one or more of colour, shape, size, texture or pattern. The arrangement of the graphical objects in the first group may differ from the arrangement of the graphical objects in another group.

In accordance with a preferred embodiment of the invention, the group of graphical objects comprises a linked chain of graphical objects. Preferably, the linked chain is displayable as a linked chain in the GUI.

Other preferred features of this aspect of the invention are described above under the heading Displaying Graphical Objects.

Building Graphical Objects

Most graphical user interfaces (GUIs) include various graphical objects, some of which can be manipulated by a user. Such graphical objects include windows, dialog boxes and push-buttons. The GUI generally includes several different types of each graphical object, for example the GUI may be arranged for the display of a large variety of dialog boxes having different sizes and/or aspect ratios.

Where a GUI has, for example, two types of dialog box, one being half the size of the other, each type of box is formulated and saved in the system as a separate object. Where the GUI includes a large number of different types of dialog box and/or different types of other graphical objects, that can lead to inefficient use of system resources.

An aspect of the invention provides a method of controlling the appearance of a graphical object in a graphical user interface, the method comprising defining a plurality of graphical object elements of the graphical object for use in displaying a representation of the graphical object.

An aspect of the invention provides a graphical object element being adapted for combination with other graphical object elements to form the graphical object.

Where the GUI includes a number of different types of the same graphical object, the different types will often have features in common with other types of the object. For example, windows and boxes of different sizes will often have the same corners as each other, the difference between the different types of boxes being only in the length of the edges of the box. By providing object elements for building the graphical objects, advantage can be taken of the common features of the various objects so that a few building blocks (the object elements) can be used to create a large number of different types of the graphical object.

The graphical object may comprise, for example, a window, a dialog box, a push-button, a scroll-bar, an icon or other on-screen object. The graphical object may be "active" in that the user can interact with it or "static", for example features of the background.

An aspect of the invention provides a graphical object comprising a plurality of graphical object elements.

An aspect of the invention provides a method of displaying a representation of a graphical object in a graphical user interface, the method comprising assembling a plurality of graphical object elements to form the graphical object.

An aspect of the invention provides apparatus for forming a graphical object in a graphical user interface, the apparatus comprising means for assembling a plurality of graphical object elements to form the graphical object.

An aspect of the invention provides an application execution device for implementing a graphical user interface, comprising a processor, memory, and an output port for outputting a signal to a display, the memory having stored therein a program for carrying out an aspect of the invention.

Preferably the application execution device comprises a receiver/decoder of a digital television.

An aspect of the invention provides a computer program for carrying out a method of the invention.

The graphical object elements of a graphical object may all be the same, the size and shape of the graphical object being determined by the number and configuration of the elements.

Preferably, the graphical object includes a plurality of different sets of graphical object elements. Preferably, the method aspect includes defining a plurality of different sets of graphical object elements of the graphical object.

A set of graphical object elements may comprise, for example, corner, side or edge portions of the graphical object. For example, where the graphical object is a dialog box, the sets of graphical objects used to make up the box may comprise corner elements and edge elements. For example, a rectangular box may comprise four corner elements and four edge elements which link together the corner elements.

Within each set of elements, there may be different types of elements, for example having a different size, shape, orientation and/or colour. Thus the example of the box may comprise four types of corner elements and two types of edge elements.

A push-button may comprise two side elements and a centre element which is chosen depending on the type of push-button the graphical object is to be. For example a PLAY button may have a centre element including an arrow symbol, a STOP button may have a centre element including a square symbol. The side elements of the PLAY button may be the same as the side elements of the STOP button.

A library of object elements can also be used to form graphical objects having relatively complex shapes. For example a variety of complex matrices of dialog boxes could easily be formed from a selection of object elements comprising box edges, corners and intersection points.

In a preferred embodiment of the invention, the graphical object includes at least two "corner" elements which define the "corners" or "sides" of the graphical object and a plurality of filler elements, the number of which can be varied to vary the size and/or shape of the graphical object. Thus, a text box preferably has four corner elements and a plurality of filler elements are used to fill the box between the corner elements to create the box of the desired size. The filler elements may all be the same. In the embodiments below, different types of filler elements are used, for example centre elements and four types of edge elements, to build boxes and windows.

Preferably the filler elements are repeated to build up the required size and shape of the graphical object.

The method preferably includes defining a set of fixed elements and a set of repeatable elements.

The invention also provides a method of forming a graphical object, the method comprising providing a set of fixed elements and a set of repeatable elements.

For example, for a window or box, the set of fixed elements may comprise the corners and any ornamentation for the box, those fixed elements being fixed for all boxes or windows of that sort, of whatever size; the set of repeatable elements are used to build up the required size and shape of the object. Preferably, only one of each fixed element is required for each instance of the graphical object. Thus the set of repeatable elements may include edge segments and centre pieces which are used to fill in between the corners.

The size of the repeatable elements are preferably chosen so that the number of types of repeatable elements for a particular object is minimised. For example, the size of the repeatable elements are preferably chosen having regard to the smallest size of the graphical object required. Thus the memory taken up in the storage of the "skit" required to build each graphical object can be reduced.

The invention also provides a kit of elements for a graphical object, the kit comprising a set of fixed elements and a set of repeatable elements.

The invention also provides a method of producing a kit of elements for a graphical object, the method comprising defining a set of fixed elements common to instances of the graphical object and further defining a set of repeatable elements.

The size of an object element may be adjustable. Thus fewer types of object elements are required to create a wide range of objects. For the example of the dialog box, the length of the edge elements may be adjustable. In this way, a large number of different box shapes could be created using just the four corner elements and two types of edge elements (in this case vertical edge elements of adjustable length and horizontal edge elements of adjustable length).

The invention further provides a method of displaying a representation of a graphical object in a graphical user interface, the method comprising assembling a plurality of graphical object elements.

Preferably the method comprises displaying a set of fixed elements and displaying a plurality of repeatable elements.

The invention further provides apparatus for controlling the appearance of a graphical object in a graphical user interface, the apparatus comprising means for defining a plurality of graphical object elements of the graphical object for use in displaying a representation of the graphical object.

Further provided by the invention is a kit of elements for use in displaying a graphical object, comprising a set of fixed elements common to instances of the graphical object and a set of repeatable elements.

The invention further provides apparatus for displaying a representation of a graphical object in a graphical user interface, the apparatus comprising means for assembling a plurality of graphical object elements.

The invention is of particular advantage in the application of the invention to wide-screen television; the aspect ratio of the graphical objects can be easily adjusted by changing the number or size of the graphical object elements compared with the graphical object for a standard television.

The invention also allows variations in the graphical objects to be made easily, for example embellishments and ornamentations. An object element may comprise an ornamentation to be included on dialog boxes. A huge variety of different objects having different or the same ornamentation can be created using the present invention.

Tool Tips and Menu Chains

Graphical user interfaces (GUIs) generally include various graphical objects, some of which can be manipulated by the user ("active" objects), and others which cannot ("static" objects). The graphical objects, in particular active objects, are often identified to the user by icons which may comprise pictures or diagrams illustrating what the graphical object is. For example, a button for carrying out a PLAY function may include an icon comprising an arrow. Such icons can improve the visual appearance of the graphical objects as well as assisting in easy navigation of the display.

In particular, where screen space is as a premium, icons are particularly useful. An example is a GUI used for a receiver/decoder for a digital television in which the icons are on-screen icons for use in the operation of the television and/or for other on-screen functions, for example web browsing. The resolution of a standard television screen is relatively low and, for legibility, any data appearing on the screen is required to be relatively large. Also, users of a television set generally sit further from the screen when using the television than they would when using, for example, a personal computer. Thus any icons and text appearing on the screen are required to be relatively large.

This imposes restraints on the amount of information that can be displayed on the screen at once. Thus the use of icons is particularly advantageous.

Effort is made to choose icons which clearly depict what the graphical object does. However, some users may be unfamiliar with the icon used and may be unsure what the feature represents. However, it would be undesirable to have the graphical objects being identified on the screen by a text explanation, because the screen may become too cluttered.

An aspect of the invention provides a method of controlling the appearance of a graphical object in a GUI, the method comprising defining a first displayable representation of a graphical object and further defining a second displayable representation of the graphical object, the second representation being displayable adjacent the first representation.

An aspect of the invention provides a method of displaying a graphical object on a GUI, the method comprising displaying a first representation of a graphical object and displaying a second representation of the graphical object adjacent the first representation.

The first representation preferably comprises an icon. Preferably the second representation is selectively displayed.

Preferably, the first representation is active, so that activating or selecting the first representation carries out an action of the graphical object. For example the first representation may be a push-button. Preferably, the second representation is a text description of the graphical object, for example a word indicating the function of the object. The second representation may or may not be active.

The second representation is preferably only selectively displayable. Thus, preferably, the second representation of the graphical object does not appear on the screen all the time, only when of assistance to the user.

Preferably the second representation displayable by focussing on the first representation. For example the second representation may only be displayed when the user has focussed on the first representation, for example by moving a focus to it using cursor keys, or by moving a mouse pointer to point to it.

Preferably the text representation of the graphical object is displayed within a frame, for example in a box or in a window. Preferably the design of the frame complements or is matched to the design of other graphical objects displayed, especially other representations of the same graphical object. Thus a coherent design scheme can be obtained. Preferably the second representation is linked to the first representation, for example by linking the box or window to the first representation. Thus the user can see more clearly exactly to what the text description applies.

Preferably the method includes defining a link element for linking the first representation and the second representation. Preferably the method includes associating a look object with the first representation, the second representation, and preferably the link element. Thus preferably the first and second representations and the link element share features of, for example, colour, texture, and shape to give a coordinated look. The look object may comprise a plurality of separate look objects, so that a coordinated look can be obtained for the various representations and link elements.

The invention further provides a method of displaying a graphical object, the method comprising displaying a first representation of the graphical object, displaying a second representation of the graphical object, and displaying a link element linking the first representation and the second representation.

The invention provides apparatus for controlling the appearance of a graphical object in a GUI, the apparatus comprising means for defining a first displayable representation of a graphical object and means for defining a second displayable representation of the graphical object, and means for displaying the second representation being adjacent the first representation.

Preferably the apparatus includes means for selectively displaying the second representation, preferably when detecting a focus on the first representation.

According to the invention, there is also provided apparatus for displaying a graphical object, the apparatus comprising means for displaying a first representation of the graphical object, means for displaying a second representation of the graphical object, and means for displaying a link element linking the first representation and the second representation.

Where the graphical object is in a chain or linked list as described below, preferably the second representation is a part of the displayed chain or linked list. Preferably the method includes defining a linked chain of graphical object, the first and second representations being displayable as links of a chain of representations of graphical objects.

Preferably the second representation is in a sub-chain. Preferably the sub-chain branches from the first representation.

An aspect of the invention provides a display including a graphical object, the graphical object comprising a first representation of the graphical object and, preferably selectively displayable, a second representation of the graphical object adjacent the first representation of the graphical object.

An aspect of the invention provides apparatus for controlling the appearance of a graphical object in a graphical user interface, comprising means for defining a first representation of the graphical object and means for defining a second representation of the graphical object, the second representation being displayable adjacent the first representation.

An aspect of the invention provides an application execution device for implementing a graphical user interface, comprising a processor, a memory and an output port for outputting a signal to a display, the memory having stored therein a program for carrying out an aspect of the invention.

Preferably the application execution device comprises a receiver/decoder of a digital television.

Also provided is a computer program for carrying out a method of the invention.

For GUIs of computers and other apparatus, the user is usually provided with a mouse or other pointer device for navigating around the display and manipulating the displayed graphical objects. However, in some applications, for example television receiver/decoder apparatus and mobile telephones and personal organisers, the user might not have a pointer device. For example, the user might use a cursor keypad to navigate around the display. Such cursor keypads usually include up, down, left and right keys. It can be confusing for the user to navigate around the display using only those keys, in particular where displayed graphical objects on the screen are not arranged in obvious lines and/or columns.

An aspect of the present invention provides a method of controlling the appearance of graphical objects in a graphical user interface, the method comprising defining a linked chain of graphical objects.

An aspect of the present invention provides a method of controlling the appearance of a graphical object in a graphical user interface, the method comprising defining a first graphical object, defining a second graphical object and defining a link element for linking the graphical objects.

An aspect of the present invention provides apparatus for displaying graphical objects in a GUI, the apparatus comprising means for displaying a plurality of graphical objects and means for displaying link elements between graphical objects.

An aspect of the invention provides a graphical object and a link element associated with the graphical object.

An aspect of the invention provides a method of displaying representations of graphical objects in a graphical user interface (GUI), the method comprising displaying representations of graphical objects and displaying a representation of a link element for illustrating a link between graphical objects.

Preferably, the displayed link element extends from one graphical object to another. Preferably, the method includes displaying a linked chain of representations of graphical objects.

Preferably the method further includes defining a sub-chain of graphical objects, the sub-chain comprising a branch from a linked chain, preferably the sub-chain being selectively displayable.

Preferably, the method further includes displaying graphical objects in a sub-chain, the sub-chain preferably comprising a branch of the linked chain, and preferably the sub-chain is displayable by focussing on a graphical object in the linked chain. Thus the sub-chain might only be displayed when of interest to the user, thus reducing cluttering of the display.

An aspect of the invention provides a method of displaying graphical objects in a GUI, the method comprising displaying a plurality of graphical objects as a linked list. Thus, an aspect of the invention provides graphical objects which can be navigated using a cursor keypad. Preferably, the displayed graphical objects comprise icons. Preferably the links between the graphical objects are displayable.

The displayed link element may extend from one graphical object to another to indicate a path between them. This is of particular advantage where the user is using cursor keys to navigate the display rather than a mouse. In some cases, however, the link element might not extend across the whole distance between graphical objects, while still providing an indication to the user of a path between the graphical objects. For example, the link element might comprise an arrow on an icon pointing to the next icon in the path.

An aspect of the invention provides a chain of graphical objects. More than one link element may be provided for each graphical object, indicating a choice of navigation paths from that object. Thus a branched network or tree structure of graphical objects and link elements can be formed, the network being easily navigable by the user, even without the use of a mouse. Also provided by an aspect of the invention is a network of graphical objects.

An aspect of the invention provides a main chain of graphical objects and a sub-chain of graphical objects branched from the main chain. Preferably, the representations of the graphical objects are buttons. (As used herein the term "button" is preferably to be interpreted broadly to refer to any graphical object which carries out a function when selected.)

Preferably, a plurality of sub-chains are displayable. Preferably a sub-chain is displayable by selecting a graphical object of the main chain.

Preferably the sub-chain extends substantially perpendicular to the main chain.

Where, in accordance with another aspect of the invention, a second representation of the graphical object is displayable adjacent the graphical object, preferably the second representation of the graphical object is displayable as a part of the sub-chain of the first representation of the graphical object. Thus, where the second representation of the graphical object is a text box including a description of the graphical object, the sub-chain will preferably include the text box and description in the sub-chain. This can be of assistance to the user.

According to an aspect of the invention there is provided an apparatus for displaying a graphical object, the apparatus comprising means for displaying a first representation of the graphical object, means for displaying a second representation of the graphical object, and means for displaying a link element linking the first representation and the second representation.

Also provided is an apparatus for controlling the appearance of graphical objects in a graphical user interface, the apparatus comprising means for defining a linked chain of graphical objects.

Also provided is apparatus for controlling the appearance of a graphical object in a graphical user interface, the apparatus comprising means for defining a first graphical object, defining a second graphical object and defining a link element for linking graphical objects.

The invention also provides apparatus for displaying representations of graphical objects in a graphical user interface, the apparatus comprising means for displaying representations of graphical objects and means for displaying a representation of a link element for illustrating a link between graphical objects.

Also provided by the invention is an object in a graphical user interface comprising a first representation of a graphical object and a second representation of a graphical object, and a link element linking the first and second representations; an object in a graphical user interface comprising a linked chain of graphical objects; and an object in a graphical user interface comprising a first graphical object, a second graphical object and a link element linking the first and second graphical objects. Preferably the object further includes a sub-chain of graphical objects, the sub-chain comprising a branch from a linked chain, preferably the sub-chain being selectively displayable.

An aspect of the invention includes an application execution device for implementing a graphical user interface, the device comprising a processor, memory and an output port for outputting a signal to a display, the memory having stored therein a program for carrying out an aspect of the invention.

The aspect of the invention also includes a computer program for carrying out a method of the invention.

Head to Tail Flipflop

Most graphical user interfaces (GUIs) include various graphical objects, some of which can be manipulated by a user. Such graphical objects are often displayed as icons which normally comprise pictures or diagrams illustrating what the graphical object is. For example, an object for carrying out a PLAY function may be displayed as an icon including an arrow. An object for effecting printing may comprise a diagram of a printer. Such icons can improve the visual appearance of the displayed graphical objects as well as assisting in easy navigation of the GUI.

Effort is made to choose icons which clearly depict what the graphical object does. Many "standard" icons are used and are generally recognisable as being icons depicting "forward", "go back", "play" and "stop". However, some users may be unfamiliar with the icon used and will be unsure what the feature represents.

An aspect of the invention provides a graphical object having a feature displayed, wherein the feature is displayable in a plurality of forms, and means for changing the form in which the feature is displayed.

Preferably, one form of in which the feature is displayed is an icon. For example a PLAY button may be in the shape of an arrow.

An aspect of the invention comprises a method of controlling the appearance of a graphical object in a GUI, the method comprising defining a first representation of the graphical object and a second representation of the graphical object, the first and second representations being selectively displayable, preferably cyclically displayable.

An aspect of the invention provides a method of displaying a graphical object in a GUI, the method comprising displaying a first representation of the graphical object and subsequently displaying a second representation of the graphical object.

Preferably, the first representation of the graphical object includes an icon. Preferably, the second representation of the graphical object includes a text description of the graphical object. Preferably, the display of the graphical object cycles between the first representation and the second representation.

An aspect of the invention provides apparatus for controlling the appearance of a graphical object in a GUI, the apparatus comprising means for defining a first representation of the graphical object and means for defining a second representation of the graphical object.

An aspect of the invention provides application execution device for implementing a graphical user interface, the device comprising a processor, memory and an output port for outputting a signal to display, the memory having stored therein a program for carrying out an aspect of the invention.

Preferably the application execution device comprises a receiver/decoder of a digital television.

Also provided is a computer program for performing a method of the invention.

The different representations which may be displayed include, for example, an icon and a text description of the feature. Thus a PLAY icon (for example a illustration of an arrow) may also be displayable as the word "play". Thus the visual and other benefits of the use of the icon can be obtained while ensuring that the user knows the meaning of the icon from the text description. By providing the different representations of the graphical object, the visual appearance of the GUI can be improved and the different displays do not clutter the user's viewable area.

In a first embodiment of the invention, the representation of the graphical object to be displayed can be set by the user. For example, the user might be familiar with the icons used and not require a text explanation of the icons. In this case he may select that only the icons be displayed.

In a second embodiment of the invention, the representation displayed can be changed by the user by selecting or focussing on (for example highlighting) the displayed representation. For example, if the representation is set to the graphical object as the "PLAY" icon, the user can change the "PLAY" icon to the text "play" by focussing on, for example highlighting or selecting, the first representation.

In a third embodiment of the invention, the display of the graphical object switches between the different representations without intervention by the user. For example, the preferences can be set so that the displayed graphical object cycles between two types of representation. In a preferred embodiment, the display cycles between the icon and the text description. The cycle time may be adjustable. An example of a cycle time is about 2 seconds.

In an embodiment of the invention, a timer is started when a representation is displayed; when the timer reaches a predetermined value, the representation changes. The change of representation may be directly from one representation to another, for example from the icon to the text description, or may comprise a sequence of representations. For example, the sequence of representations may show a progressive change from one representation to another. In an embodiment, the sequence of representations gives the effect that the two representations are on opposite faces of a spinning coin.

The invention further provides apparatus for controlling the appearance of a graphical object in a GUI, the apparatus comprising means for defining a first representation of the graphical object and a second representation of the graphical object, and means for selectively displaying the first and second representations, and preferably means for cyclically displaying the first and second representations.

Also provided is apparatus for displaying a representation of a graphical object in a GUI, the apparatus comprising means for displaying a first representation of the graphical object, and means for subsequently displaying a second representation of the graphical object.

Preferably the apparatus further comprises means for displaying a sequence of representations between the displaying the first and second representations.

The invention further provides an object in a GUI comprising a first representation of the graphical object and a second representation of the graphical object, the first and second representations being selectively displayable, preferably cyclically displayable.

On-Screen Keyboard

Devices having numeric keypads are being used more and more to carry out tasks which involve writing data including text using the keypad. For example, mobile telephones are used to enter information into the telephone memory, for example names into telephone books in the phone, or the sending of text messages. Other examples include television remote controls used to enter text onto a television screen, for example when accessing the Internet using a television having a receiver/decoder.

Such devices normally have only numeric keypads having a key for each of the numbers 0 to 9 and possibly a few other keys, for example # and *. In order to be able to enter text, at least 26 additional key functions are required for the letters of the alphabet, with still further key functions required where both upper and lower case letters, punctuation and symbols as well as accented letters are required.

In known keypads used for text entry, each key of the keypad is assigned a number of functions, and the user cycles through the available functions by pressing the key several times, the different functions usually being viewable on a display. When the user reaches the desired function for the key, the function is selected, usually by pressing a "select" key or by moving the display cursor. It will be seen that, where a full set of functions is to be made available, each key of the keypad necessarily relates to several different functions. For example, the "2" key of a keypad may include the following functions:

A, B, C, a, b, c, 2, Ä, ä, Á, á, Â, â, À, à, Ȧ, ȧ, AE, ae, Ç and ç and may further include symbol functions. Each time a particular letter, number or symbol is required, the key has to be pressed several times. This clearly can be time consuming and inefficient. Also, design restraints and the physical size of the keys often dictate that not all of the letters and symbols which can be accessed by a particular key can be displayed to the user. Thus, if the user wishes to enter a particular letter or symbol, he often has to use trial and error to find the key which activates it.

A solution which is used for some models of mobile phones is to include a QWERTY keyboard, but clearly that is not ideal where a small keypad is desirable; the keys must remain large enough for use.

An aspect of the invention provides, a keypad having keys for performing functions, each key including a function option, wherein the function option of the key is changeable.

In an embodiment of the invention, each key has only one function option at a time, so that the key need only be pressed once to carry out that function. By providing that the functions options of the keys are changeable, it is still possible to use the keypad to carry out more functions than there are keys, but the efficiency of use can be improved.

Preferably, a set of options is arranged as a template for the keypad, the template being changeable. For example, if the keypad is to be used in one task for typing only numbers, it would be inefficient if, for each number to be typed, the user had to scroll through 3 or more letters. By changing the options of all the keys of the keypad to "numbers", a key need only be pressed once by the user to type the required number. Similarly, if the user wishes to type in capitals, the "capitals" template can be applied to the keypad. Thus only capital letters will be included in the options for the key functions, reducing the number of functions through which the user must scroll to find the desired one.

Preferably, the key options are changed for the keypad as a whole but, alternatively, the options for only some of the keys might be changed.

An aspect of the invention provides a method aiding entry of data into a graphical user interface (GUI) using a keypad, the method comprising defining a plurality of templates, each template comprising a set of functions for the keypad.

An aspect of the invention provides apparatus for use in entering data into a graphical user interface using a keypad, the apparatus comprising a plurality of templates, each template comprising a set of functions for the keypad.

Preferably the templates are displayable on a display.

Preferably, a number of different templates are provided, and the method includes the step of selecting a template for use. Preferably the apparatus further comprises means for selecting a template. The different templates preferably provide different function sets for the keypad. For example, a template may provide the capital letters A to J for the number keys of the keypad. A different template may provide the capital letters K to T, and so on.

In embodiments of the invention described herein, the templates each include only 10 functions, for use with ten keys of the keypad. In a different embodiment, the keypad may include more keys and it may be possible to represent the whole alphabet on the template. For example, the keypad may comprise a keyboard. Different templates may be provided corresponding to different types of keyboard, for example different language variants, different numbers and arrangement of keys, and symbols and other characters. All the required functions might be included on each template, the different templates being provided corresponding to different key layout of different types of keypad or keyboard.

The term keypad used herein is preferably to be interpreted broadly to include all devices having an array of keys or buttons or the like. Thus the term preferably includes remote controllers, telephones and computer keyboards as well as other devices.

Preferably the method includes the step of displaying the template, for example on the screen of a computer or television. Preferably a plurality of available templates are displayed and preferably the user is able to choose one of the displayed templates for use.

In a preferred embodiment, the available templates are displayed as a grid, and preferably the user selects the desired template using the cursor keys of the keypad. The user may alternatively use a different device, for example a pointer device, for example a mouse.

Preferably, the display shows the functions of the template in a configuration corresponding to the arrangement of the relevant keys of the keypad. Preferably, the method includes displaying an image of a keypad. Preferably the step of selecting the template includes moving the image of the keypad relative to the templates on the screen.

Preferably the apparatus further includes a displayable keypad image, the apparatus preferably providing means for moving the keypad image relative to a display of the templates.

Preferably, the displaying of the image of the keypad on the screen includes the step of selecting the image of the keypad to be displayed. The layout of keys on a keypad can vary from one type of keypad to another and thus it is advantageous for the layout of keys on the template shown to correspond to the keypad layout.

Preferably the user moves the image of the keypad relative to the templates using cursor keys on the keypad.

The functions of the templates may be set out as QWERTY keyboards, the keyboard being split into various zones for the image of the keypad. For example, in one position, the keypad may be used to enter the letters q, w, e, a, s, d, z, x, c and SPACE.

In other embodiments, the functions of the templates are set out in other ways. Preferably, functions used often by the user are arranged so that they appear on more than one template. Preferably, the templates may be customised by the user.

The functions provided by a key of the template keyboard may comprise more than one letter, number or symbol. For example, where the keypad is used for a web browser, a key may be used to enter a text string, for example "http:\" or "www".

Preferably, the keypad template is displayed on the screen while the user enters the data.

An aspect of the invention provides a template for a keypad. Preferably the template is displayable in a GUI.

An aspect of the invention provides a method of entering data using a keypad, the method including selecting a template comprising a set of functions for the keypad.

The aspect of the invention further provides apparatus for entering data using a keypad, the apparatus including means for displaying a keypad template. Preferably the apparatus includes means for displaying a plurality of keypad templates and means for selecting a template.

Preferably the display of the keypad templates for data entry is separate from any other application that the apparatus may be running. For example, if the apparatus is running a web browser application and data needs to be entered in a dialog box, the user calls up the keypad templates which runs parallel to the browser application. Preferably, the keypad template application can be called from a plurality of applications in the apparatus.

The aspect of the invention also provides an application execution device for implementing a graphical user interface, comprising a processor, memory and an output port for outputting a signal to a display, memory having stored therein a program for carrying out an aspect of the invention. Preferably, the memory further has stored therein a library of keypad templates and preferably further has stored therein a library of keypad images.

The aspect of the invention further provides a library of keypad templates and/or keypad images.

An aspect of the invention provides a computer program for carrying out a method of the invention.

General

Where reference is made herein to graphical and other objects, such term is to be interpreted broadly. In particular, it should not be interpreted as implying that the objects are defined by object-oriented program code.

The methods described herein are preferably carried out using an application execution device having a suitably programmed processor.

Preferably the inventions relate to the broadcasting and receiving of transmissions.

Any of the methods above may be carried out by a receiver/decoder, such as a digital or analogue television receiver/decoder. Alternatively, the methods may be carried out by a mobile telephone, a computer, or another device.

The inventions described herein also extend to a computer program for carrying out any of the described methods, and to a computer readable medium having stored thereon a program for carrying out any of the above methods. The invention also extends to an application for a receiver/decoder arranged to perform a method of any aspect of the invention.

The inventions also extend to computer program products, for example comprising computer software and/or computer software upgrades. Such computer program products may be, for example, transmitted to a user from a broadcast centre by, for example cable or satellite broadcast.

The computer program products may be provided on a disc, for example a CD ROM. The computer program product may be tangibly embodied for example as software stored on a storage medium such as a hard disk or volatile or non-volatile memory, or as a signal.

Thus aspects of the invention further provide: a computer program product comprising code for:

defining a look object; and associating the look object with the graphical object; a computer program product for use in defining a graphical object in a graphical user interface comprising:

code for providing a look object which controls the appearance of the graphical object; and code for providing a widget object which controls operation of the graphical object; a computer program product for use in a method of controlling the appearance of a group of graphical objects, including code for defining a plurality of different displayable groups of graphical objects and for selecting a group of graphical objects from the plurality of displayable groups; a computer program product for use in a method of controlling the appearance of a group of graphical objects, comprising code for defining a displayable group of graphical objects; a computer program product for use in a method of controlling the appearance of a graphical object in a graphical user interface, comprising code for defining a plurality of graphical object elements of the graphical object for use in displaying a representation of the graphical object; a computer program product for use in a method of producing a kit of elements for a graphical object, comprising code for defining a set of fixed elements common to instances of the graphical object and for defining a set of repeatable elements; a computer program product for use in a method of displaying a representation of a graphical object in a graphical user interface, comprising code for assembling a plurality of graphical object elements; a computer program product for use in a method of controlling the appearance of a graphical object in a GUI, comprising code for defining a first displayable representation of a graphical object and for defining a second displayable representation of the graphical object, and code for displaying the second representation adjacent the first representation; a computer program product for use in a method of displaying a graphical object, comprising code for displaying a first representation of the graphical object, displaying a second representation of the graphical object, and displaying a link element linking the first representation and the second representation; a computer program product for use in a method of controlling the appearance of graphical objects in a graphical user interface, comprising code for defining a linked chain of graphical objects; a computer program product for use in a method of controlling the appearance of a graphical object in a graphical user interface, comprising code for defining a first graphical object, defining a second graphical object and defining a link element for linking graphical objects; a computer program product for use in a method of displaying representations of graphical objects in a graphical user interface, comprising code for displaying representations of graphical objects and for displaying a representation of a link element for illustrating a link between graphical objects; a computer program product for use in a method of controlling the appearance of a graphical object in a GUI, comprising code for defining a first representation of the graphical object and a second representation of the graphical object, and code for selectively displaying the first and second representations, preferably cyclically displaying the representations; a computer program product for use in a method of displaying a representation of a graphical object in a GUI, comprising code for displaying a first representation of the graphical object, and for subsequently displaying a second representation of the graphical object; and a computer program product as herein described for use with a receiver/decoder.

Also provided is a computer program product comprising a memory and processor, the memory having stored therein an application, and the processor (under the control of the application) being adapted to carry out the any of the methods described herein; a computer program product comprising a program for carrying out any of the methods described herein; and a computer program for carrying out any of the methods described herein.

Also provided by the invention is a computer readable medium having stored thereon a program for carrying out any of the methods as described herein and a computer readable medium having stored thereon a computer program product as described herein.

Also provided is a signal tangibly embodying a computer program product as described herein.

The invention further provides a method substantially as herein described with reference to and illustrated in the accompanying drawings and apparatus substantially as herein described with reference to and as illustrated in the accompanying drawings.

Where aspects of the invention relate to graphical objects, the invention provides a method of defining the graphical objects, of controlling the appearance of the graphical objects and also to displaying representations of the graphical objects on a suitable display, for example a television screen or LCD of a mobile telephone, and to the graphical objects themselves. The invention also provides apparatus for carrying out the invention, and the methods of the invention, preferably using a suitably programmed processor.

Preferably the invention finds application for digital television, and preferably a web browser for a television. The invention may be embodied in a receiver/decoder for example for a digital television. Features of the aspects of the inventions described above are preferably provided by a processor and/or memory, for example a processor and memory of the receiver/decoder.

Any of the methods described herein may be carried out by the receiver/decoder, such as a digital or analogue television receiver/decoder.

The term "receiver/decoder" used herein may connote a receiver for receiving either encoded or non-encoded signals, for example, television and/or radio signals, which may be broadcast or transmitted by some other means. The term any also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser, a video recorder, or a television.

It will be understood that the present invention has been described herein purely by way of example, and modifications of detail can be made within the scope of the invention.

Each feature disclosed in the description, and (where appropriate) the claims and drawings may be provided independently or in any appropriate combination.

Where features of the apparatus are described herein as "means for" a particular function, it is intended that those terms be interpreted broadly and are preferably not interpreted to be limited to any particular embodiment of the invention described herein. Features of the apparatus are, in preferred embodiments provided by a suitably programmed computer or computers, and thus features of the apparatus are preferably provided by the relevant features of a computer or product comprising a computer program. For example, features of the apparatus may be provided by a processor, or other part of a computer, for example a memory or data store.

Features of one aspect may be applied to any other aspect; method features may be applied to apparatus aspects and vice versa.

Preferred features of the present invention will now be described, purely by way of example, with reference to the accompanying drawings, in which:

FIG. 32 is a further example of a graphical object formed by tiling;

FIG. 33 is a further example of a graphical object formed by tiling;

FIG. 34 is a further example of a graphical object formed by tiling;

Figure 42:
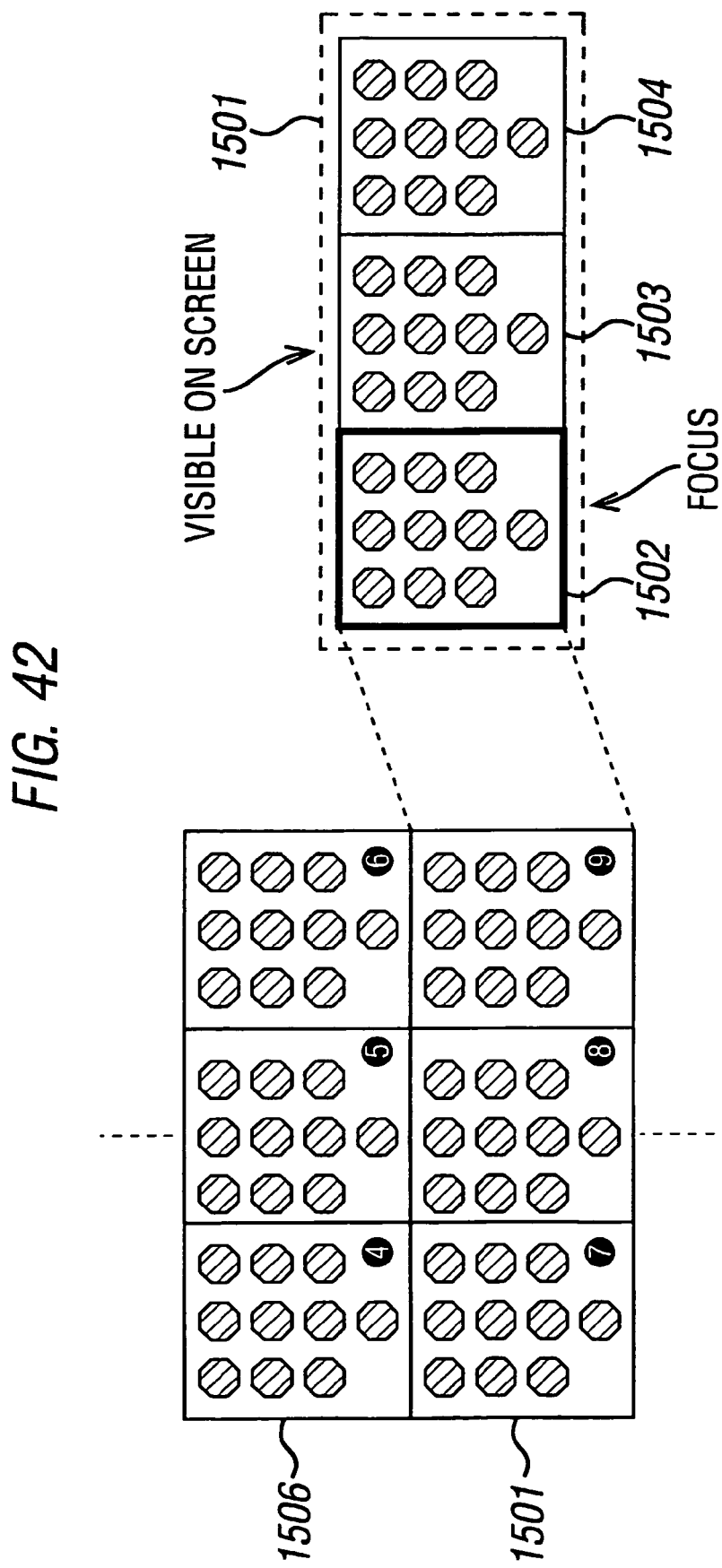
Figure 44:
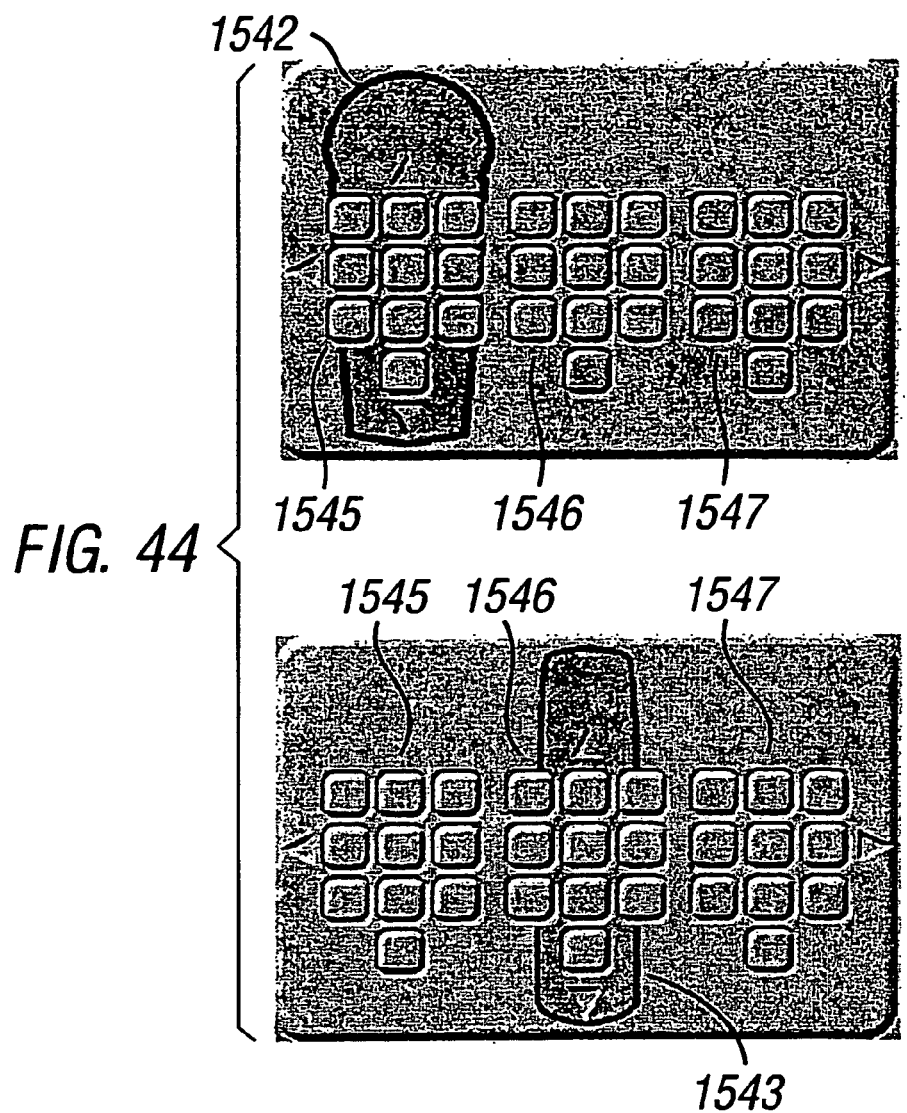

FIG. 42 schematically illustrates the operation of a virtual keyboard;

FIG. 43 shows a typical mapping of characters to keys on a virtual keyboard;

FIG. 44 shows examples of a virtual keyboard; and

Figure 45:
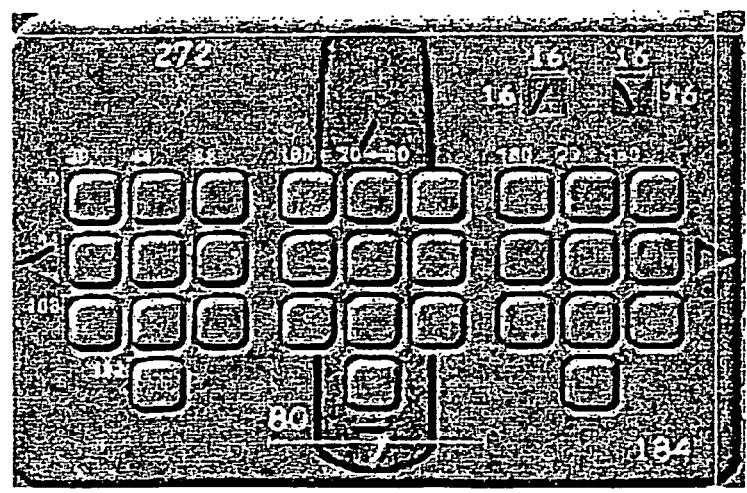

FIG. 45 shows typical dimensions of a virtual keyboard.

OVERVIEW OF A DIGITAL TELEVISION SYSTEM

Figure 1A:
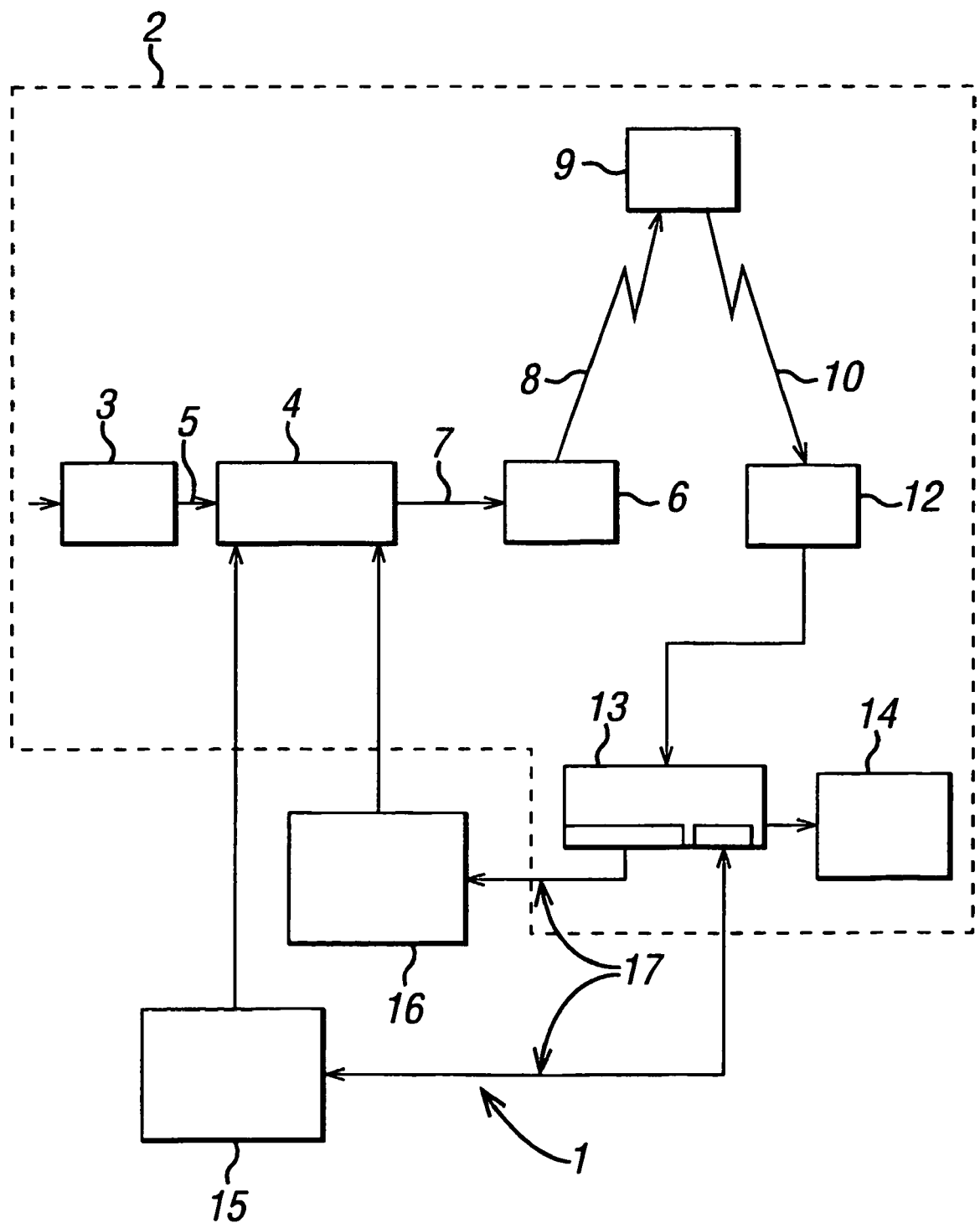
FIG. 1a shows an overview of a typical digital television system.

An overview of a digital television system 1 is shown in FIG. 1a. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. Other transport channels for transmission of the data are of course possible, such as terrestrial broadcast, cable transmission, combined satellite/cable links, telephone networks etc.

The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14. Although a separate receiver/decoder is shown in FIG. 1a, the receiver/decoder may also be part of an integrated digital television. As used herein, the term "receiver/decoder" includes a separate receiver/decoder, such as a set-top box, and a television having a receiver/decoder integrated therewith.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the receiver/decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the receiver/decoder 13 and smartcard, the end user may purchase commercial offers in either a subscription mode or a pay-per-view mode. As used herein, the term "smartcard" includes, but not exclusively so, any chip-based card device, or object of similar function and performance, possessing, for example, microprocessor and/or memory storage. Included in this term are devices having alternative physical forms to a card, for example key-shaped devices such as are often used in TV decoder systems.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 13 having access to an equivalent to the exploitation key stored on a smart card inserted in the decoder to decrypt the encrypted control word and thereafter descramble the transmitted data. A paid-up subscriber will receive, for example, in a broadcast monthly ECM (Entitlement Control Message) the exploitation key necessary to decrypt the encrypted control word so as to permit viewing of the transmission.

Interactive System

An interactive system 16, also connected to the multiplexer 4 and the receiver/decoder 13 and again located partly in the broadcast centre and partly in the receiver/decoder, enables the end user to interact with various applications via a modemmed back channel 17. The modemmed back channel may also be used for communications used in the conditional access system 15.

Figure 1B:
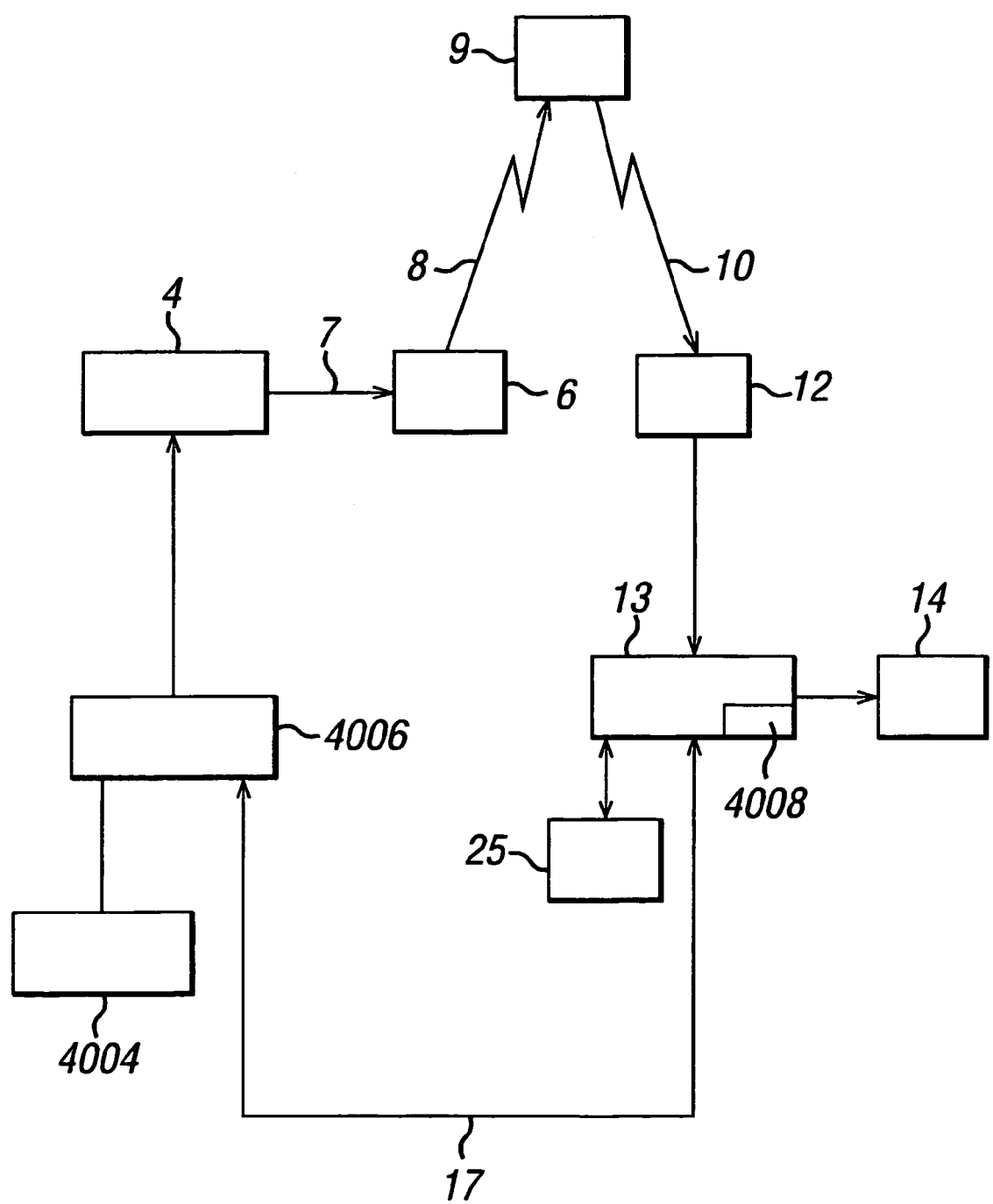
FIG. 1b shows the general architecture of the interactive television system.

FIG. 1b shows the general architecture of the interactive television system 16 of the digital television system 1.

For example, the interactive system 16 allows an end user to buy items from on-screen catalogues, consult local news and weather maps on demand and play games through their television set.

The interactive system 16 comprises in overview four main elements:—
- an authoring tool 4004 at the broadcast centre or elsewhere for enabling a broadcast supplier to create, develop, debug and test applications;
- an application and data server 4006, at the broadcast centre, connected to the authoring tool 4004 for enabling a broadcast supplier to prepare, authenticate and format applications and data for delivery to the multiplexer and scrambler 4 for insertion into the MPEG-2 transport stream (typically the private section thereof) to be broadcast to the end user;
- a virtual machine including a run time engine (RTE) 4008, which is an executable code installed in the receiver/decoder 13 owned or rented by the end user for enabling an end user to receive, authenticate, decompress, and load applications into the working memory of the decoder 13 for execution. The engine 4008 also runs resident, general-purpose applications. The engine 4008 is independent of the hardware and operating system; and
- a modemmed back channel 17 between the receiver/decoder 13 and the application and data server 4006 to enable signals instructing the server 4006 to insert data and applications into the MPEG-2 transport stream at the request of the end user.

The interactive television system operates using "applications" which control the functions of the receiver/decoder and various devices contained therein. Applications are represented in the engine 4008 as "resource files". A "module" is a set of resource files and data. A "memory volume" of the receiver/decoder is a storage space for modules. Modules may be downloaded into the receiver/decoder 13 from the MPEG-2 transport stream.

Receiver/Decoder

Figure 2A:
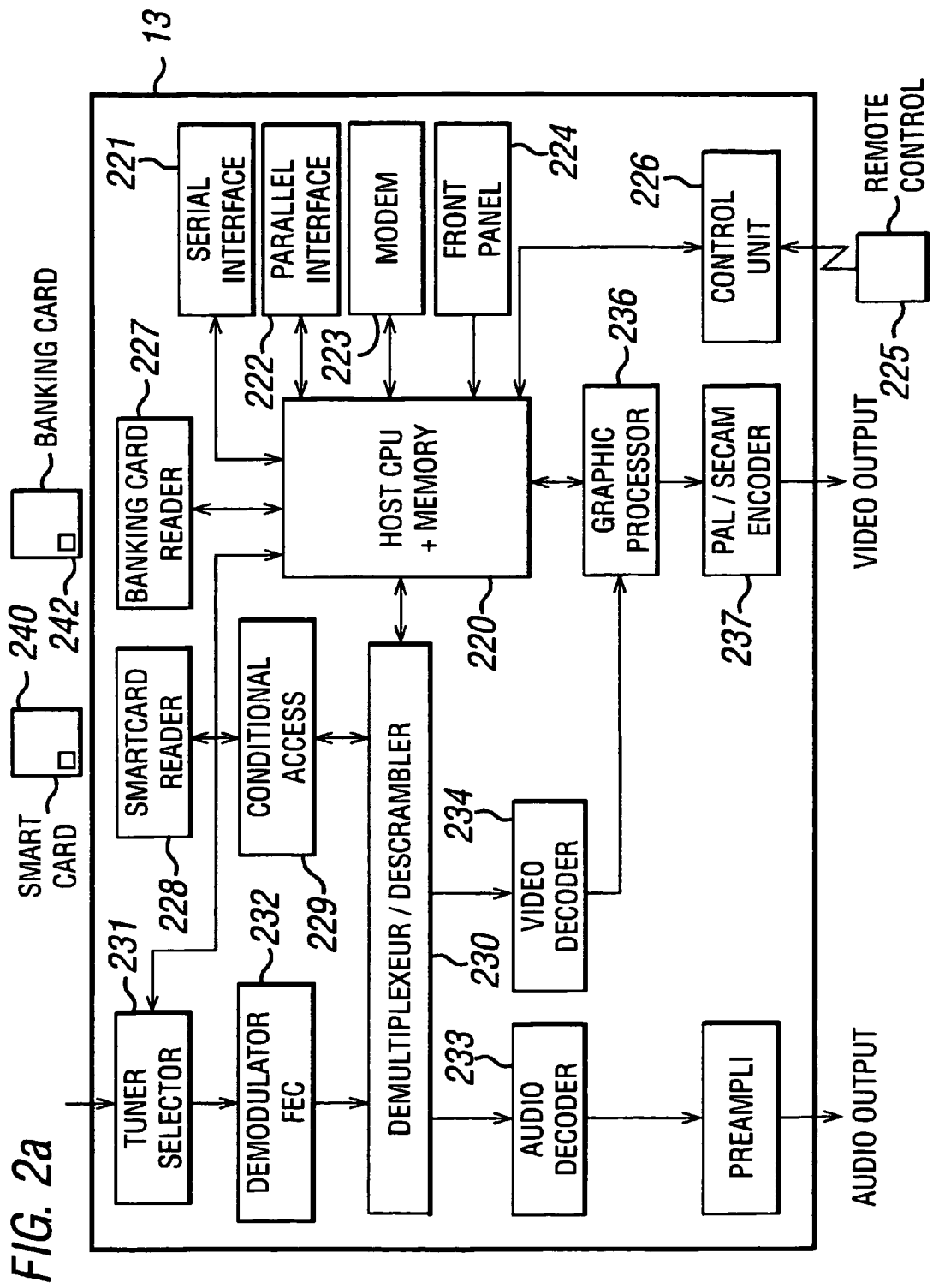
FIG. 2a is a block diagram of a receiver/decoder.

Referring to FIG. 2a, the various elements of receiver/decoder 13 will now be described in terms of functional blocks.

The receiver/decoder 13, which may be, for example, a digital set-top box (DSTB), comprises a central processor 220 including associated memory elements and adapted to receive input data from a serial interface 221, a parallel interface 222, a modem 223 (connected to the modem back channel 17 of FIG. 1a), and switch contacts 224 on the front panel of the decoder.

The receiver/decoder is additionally adapted to receive inputs from an infra-red remote control 225 via a control unit 226 and also possesses two smartcard readers 227, 228 adapted to read bank and subscription smartcards 242,240 respectively. The subscription smartcard reader 228 engages with an inserted subscription card 240 and with a conditional access unit 229 to supply the necessary control word to a demultiplexer/descrambler 230 to enable the encrypted broadcast signal to be descrambled. The decoder also includes a conventional tuner 231 and demodulator 232 to receive and demodulate the satellite transmission before being filtered and demultiplexed by the unit 230.

Figure 2B:
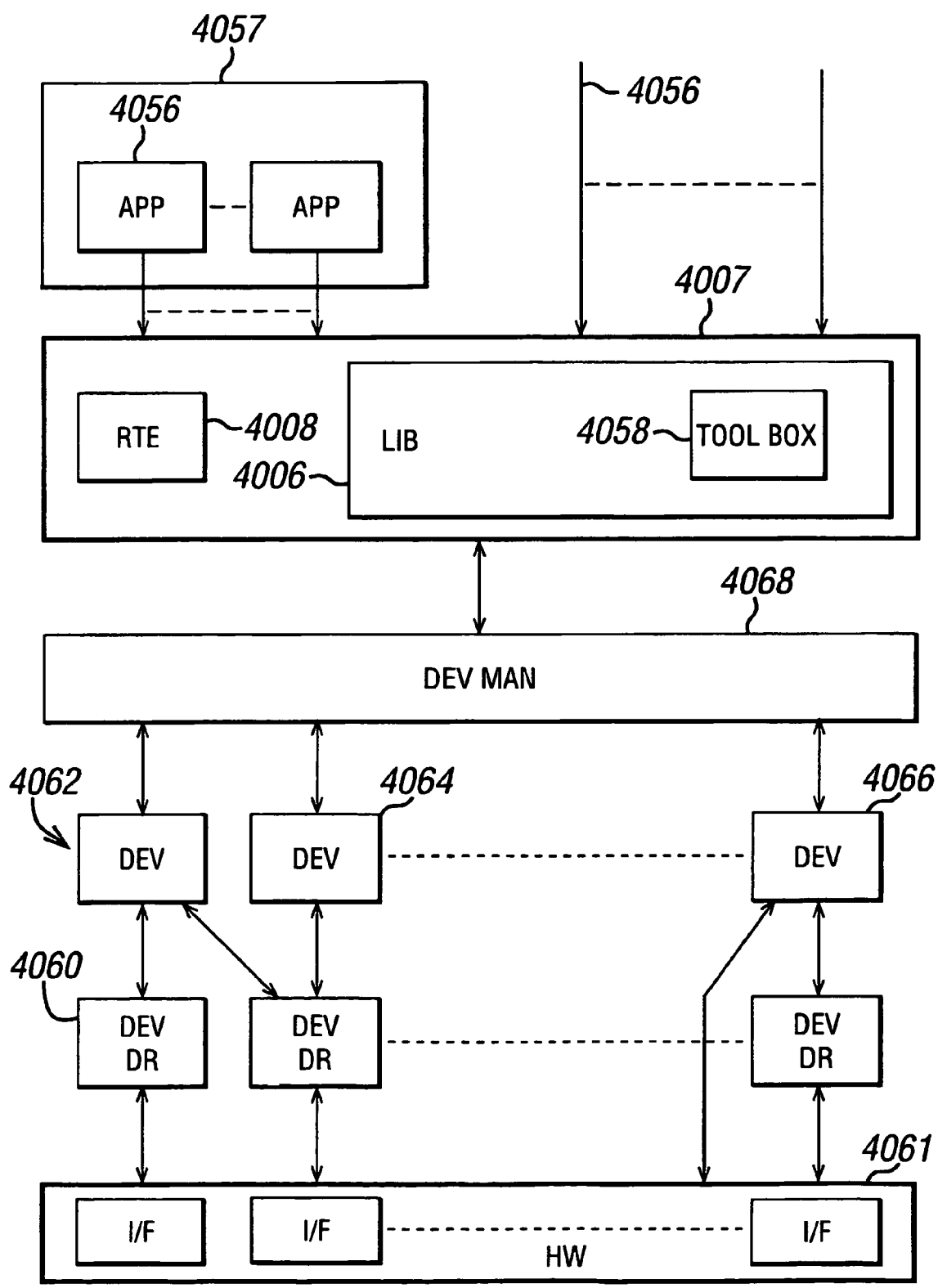
FIG. 2b shows the architecture of a receiver/decoder.

Processing of data within the receiver/decoder is generally handled by the central processor 220. FIG. 2b illustrates the software architecture of the central processor 220 of the receiver/decoder. With reference to FIG. 2b, the software architecture comprises a Run-Time-Engine 4008, a Device Manager 4068 and a plurality of Devices 4062 and Device Drivers 4066 for running one or more applications 4056.

As used in this description, an application is preferably a piece of computer code for controlling high level functions of preferably the receiver/decoder 13. For example, when the end user positions the focus of remote control 225 on a button object seen on the screen of the television set 14 and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 13, or broadcast and downloaded into the RAM or FLASH memory of the receiver/decoder 13.

Applications are stored in memory locations in the receiver/decoder 13 and represented as resource files. The resource files comprise graphic object description unit files, variables block unit files, instruction sequence files, application files and data files, as described in more detail in the above-mentioned patent specifications.

The receiver/decoder contains memory divided into a RAM volume, a FLASH volume and a ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Software Architecture

The central processor 220 can be regarded as centred on a run time engine 4008 forming part of a virtual machine 4007. This is coupled to applications on one side (the "high level" side), and, on the other side (the "low level" side), via various intermediate logical units discussed below, to the receiver/decoder hardware 4061, comprising the various ports as discussed above (that is, for example, the serial interface 221, the parallel interface 222, modem 223, and control unit 226).

With specific reference to FIG. 2b, various applications 4057 are coupled to the virtual machine 4007; some of the more commonly used applications may be more or less permanently resident in the system, as indicated at 4057, while others will be downloaded into the system, eg from the MPEG data stream or from other ports as required.

The virtual machine 4007 includes, in addition to the run time engine 4008, some resident library functions 4006 which include a toolbox 4058. The library contains miscellaneous functions in C language used by the engine 4008. These include data manipulation such as compression, expansion or comparison of data structures, line drawing, etc. The library 4006 also includes information about firmware in the receiver/decoder 13, such as hardware and software version numbers and available RAM space, and a function used when downloading a new device 4062. Functions can be downloaded into the library, being stored in FLASH or RAM memory.

The run time engine 4008 is coupled to a device manager 4068 which is coupled to a set of devices 4062 which are coupled to device drivers 4060 which are in turn coupled to the ports or interfaces. In broad terms, a device driver can be regarded as defining a logical interface, so that two different device drivers may be coupled to a common physical port. A device will normally be coupled to more than one device driver; if a device is coupled to a single device driver, the device will normally be designed to incorporate the full functionality required for communication, so that the need for a separate device driver is obviated. Certain devices may communicate among themselves.

Each function of the receiver/decoder 13 is represented as a device 4062 in the software architecture of the receiver/decoder 13. Devices can be either local or remote. Local devices 4064 include smartcards, SCART connector signals, modems, serial and parallel interfaces, a MPEG video and audio player and an MPEG section and table extractor. Remote devices 4066, executed in a remote location, differ from local devices in that a port and procedure must be defined by the system authority or designer, rather than by a device and device driver provided and designed by the receiver/decoder manufacturer.

The run time engine 4008 runs under the control of a microprocessor and a common application programming interface (API). They are installed in every receiver/decoder 13 so that all receiver/decoders 13 are identical from the application point of view.

The engine 4008 runs applications 4056 on the receiver/decoder 13. It executes interactive applications 4056 and receives events from outside the receiver/decoder 13, displays graphics and text, calls devices for services and uses functions of the library 4006 connected to the engine 4008 for specific computation.

The run time engine 4008 is an executable code installed in each receiver/decoder 13, and includes an interpreter for interpreting and running applications. The engine 4008 is adaptable to any operating system, including a single task operating system (such as MS-DOS). The engine 4008 is based on process sequencer units (which take various events such as a key press, to carry out various actions), and contains its own scheduler to manage event queues from the different hardware interfaces. It also handles the display of graphics and text A process sequencer unit comprises a set of action-groups. Each event causes the process sequencer unit to move from its current action-group to another action-group in dependence on the character of the event, and to execute the actions of the new action-group.

The engine 4008 comprises a code loader to load and download applications 4056 into the receiver/decoder memory. Only the necessary code is loaded into the RAM or FLASH memory, in order to ensure optimal use. The downloaded data is verified by an authentication mechanism to prevent any modification of an application 4056 or the execution of any unauthorized application. The engine 4008 further comprises a decompressor. As the application code (a form of intermediate code) is compressed for space saving and fast downloading from the MPEG stream or via a built-in receiver/decoder mode, the code must be decompressed before loading it into the RAM. The engine 4008 also comprises an interpreter to interpret the application code to update various variable values and determine status changes, and an error checker.

Architecture of Receiver/Decoder

Figure 2C:
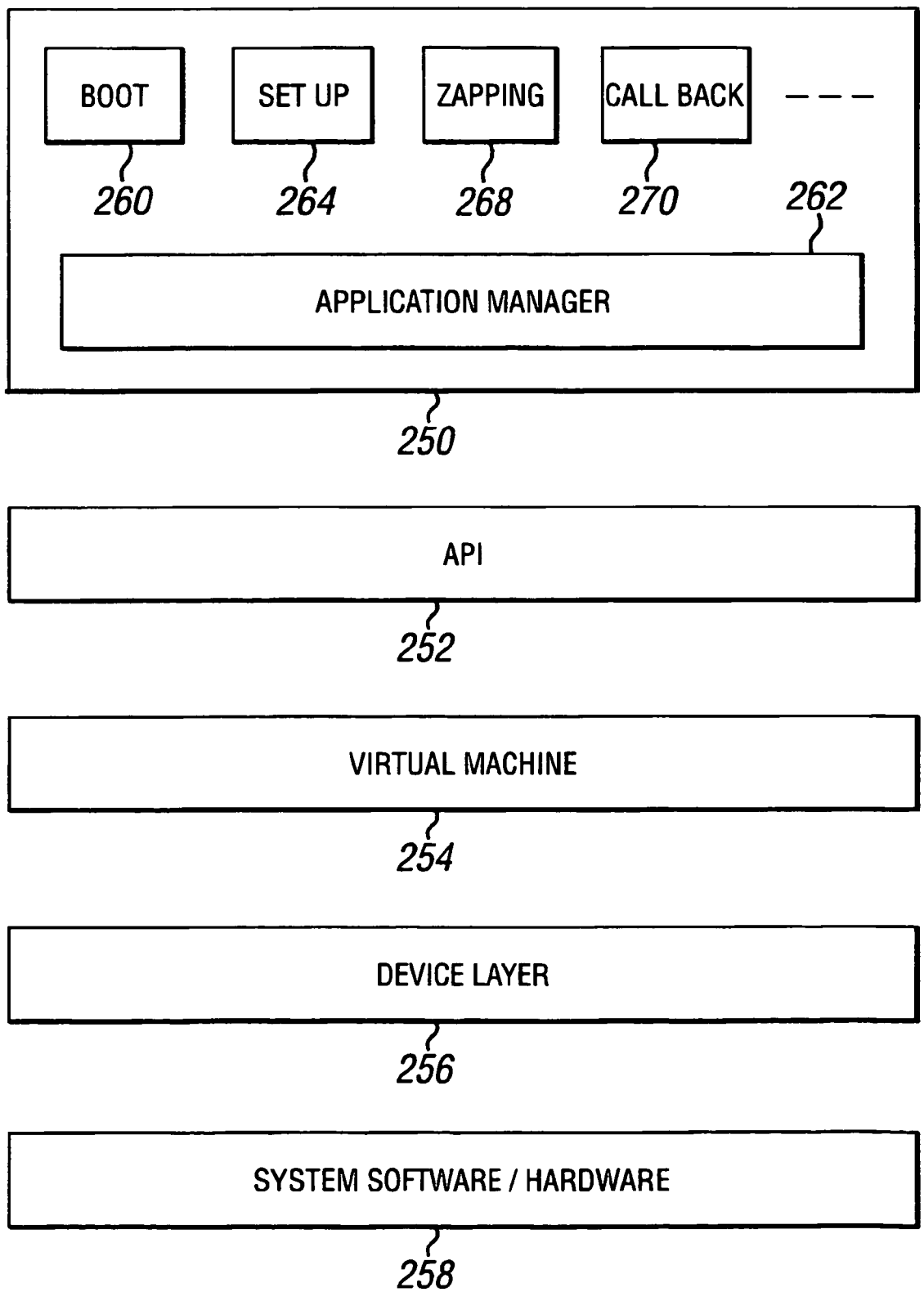
FIG. 2c illustrates further the architecture of the receiver/decoder.

The receiver/decoder contains five software layers, organized so that the software can be implemented in any receiver/decoder and with any operating system. Referring to FIG. 2c, the various software layers are Application Layer 250, Application Programming Interface (API) layer 252, Virtual Machine Layer 254, Device Layer 256 and System Software/Hardware Layer 258.

The Application Layer 250 encompasses applications that are either resident in or downloaded to the receiver/decoder. They may be interactive applications used by customers, written in, for example, Java, HTML, MHEG-5 or other languages, or they may be applications used by the receiver/ decoder to run such applications. This layer is based on a set of open Application Programming Interfaces (APIs) provided by the Virtual Machine layer. This system allows applications to be downloaded to flash or RAM memory in the receiver/decoder on-the-fly or on demand. The application code can be transmitted in compressed or uncompressed format using protocols such as Data Storage Media Command and Control (DSMCC), Network File Server (NFS) or other protocols.

Interactive applications are applications that the user interacts with, for example, to obtain products and services, such as electronic program guides, telebanking applications and games.

Various security features are provided for these downloaded applications and data, as follows:

Nothing can be downloaded to the receiver/decoder without first having been authenticated for the intended network, which prevents any unregistered software from being run in the receiver/decoder. This means that any software running in the receiver/decoder is recognized and has been fully tested.

A Security Manager limits access of applications to various memory zones, thus assuring data integrity.

The system can interface with any conditional access system that makes use of secure processors (for example, smart cards inserted in the receiver/decoder).

The following resident applications are used to manage interactive applications:

Boot. The Boot application 260 is the first application launched when the receiver/decoder is powered on. The Boot application starts the different "Managers" in the Virtual Machine, the first being the Application Manager 262.

Application Manager. The Application Manager 262 manages the interactive applications that are run in the receiver/decoder, that is, it starts, stops, suspends, resumes, handles events and deals with communication between applications. It allows multiple applications to run at once, and thus is involved in the allocation of resources among them. This application is completely transparent to the user.

SetUp. The purpose of the SetUp application 264 is to configure the receiver/decoder, primarily the first time it is used. It performs actions such as scanning for TV channels, setting the date and time, establishing user preferences, and so on. However, the SetUp application can be used at any time by the user to change the receiver/decoder configuration.

Zapping. The Zapping application 268 is used to change channels using the Program-up, Program-down and numeric keys. When another form of zapping is used, for example, through a banner (pilot) application, the Zapping application is stopped.

Callback. The Callback application is used to extract the values of various parameters stored in the receiver/decoder memory and return these values to the commercial operator via modemmed back channel 17, or by other means.

The API layer 252 provides high-level utilities for interactive application development. It includes several packages that make up this high-level API. The packages provide all the functionality necessary to run interactive applications. The packages are accessible by the applications.

In a preferred embodiment the API is adapted to run applications written in the Java programming language. Furthermore, it can interpret HTML and other formats, such as MHEG-5. Besides these interpreters, it also includes other packages and service modules that are detachable and extensible as requirements dictate.

The Virtual Machine layer 254 is composed of language interpreters and various modules and systems. It consists of everything necessary to receive and execute interactive applications in the receiver/decoder, including the following:

Language Interpreters. Different interpreters can be installed to conform to the type of applications to be read. These include Java, HTML, MHEG-5 and others.

Service Information (SI) Engine. The SI Engine loads and monitors common Digital Video Broadcasting (DVB) or Program System Information Protocol (PSIP) tables and puts them into a cache. It allows access to these tables by applications which need the data contained in them.

Scheduler. This module allows for preemptive, multi-threaded scheduling with each thread having its own event queue.

Memory Manager. This module manages the access to memory. It also automatically compresses data in memory when necessary and performs automatic garbage collection.

Event Manager. This module allows events to be triggered according to priority. It manages timer and event grabbing and allows applications to send events to each other.

Dynamic Linker. This module allows the resolution of addresses arising from native Java functions, loads native methods from a Java class downloaded into RAM and resolves calls from downloaded native codes towards ROM.

Downloader. This module uses automatic data loading from a remote DSMCC carousel or through the NFS protocol, with downloaded files accessed in the same way as resident ones. Memory clear-up, compression and authentication are also provided.

Class Manager. This module loads classes and resolves any class referencing problems.

File System. This module is compact and optimized to manage a hierarchical file system with multiple ROM, flash, RAM and DSMCC volumes. Flash integrity is guaranteed against any incidents.

Security Manager. This module authenticates applications and controls the access of applications to sensitive memory and other zones of the set-top box.

Graphics System. This system is object-orientated and optimized. It includes graphic window and object management as well as a vectorial font engine with multi-language support.

Furthermore, the DAVIC resource notification model is supported so that client resources are efficiently managed.

The Device Interface layer 256 includes a Device Manager and devices. Devices are software modules which consist of the logical resources necessary for management of external events and physical interfaces. The Device Layer manages communication channels between drivers and applications and provides enhanced error exception checking. Some examples of managed devices are: card readers, modems, network, PCMCIA (Personal Computer Memory Card International Association), LED display and so on. Programmers do not have to deal with this layer directly, since the API layer controls the devices from above.

The System Software/Hardware layer 258 is provided by the manufacturer of the receiver/decoder. Because of the modularity of the system and because services supplied by the OS (such as event scheduling and memory management) are part of the Virtual Machine, the higher layers are not tied to a particular real-time operating system (RTOS) or to a particular processor.

Widget Sets

In a preferred embodiment, a widget set is provided for use in applications to run in a graphical user interface (GUI). One particular application of such a widget set is to provide widgets in a GUI display of a receiver/decoder for digital television. Each widget is implemented as an object-oriented module such that, for each widget, there is a corresponding widget class. Thus, any widget may be built up from simpler component widgets by inheriting or aggregating classes of other widgets.

Figure 3:
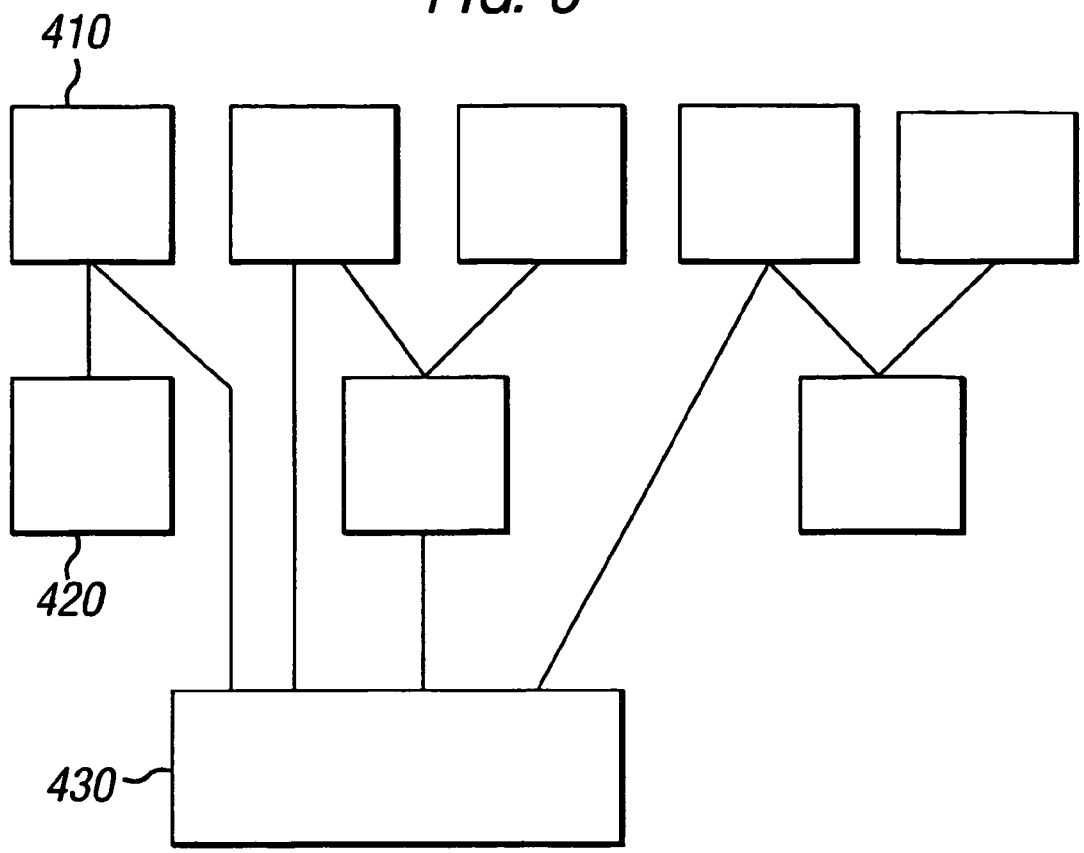
FIG. 3 is a diagram of part of the hierarchy of widgets within a widget set.
Figure 6B:
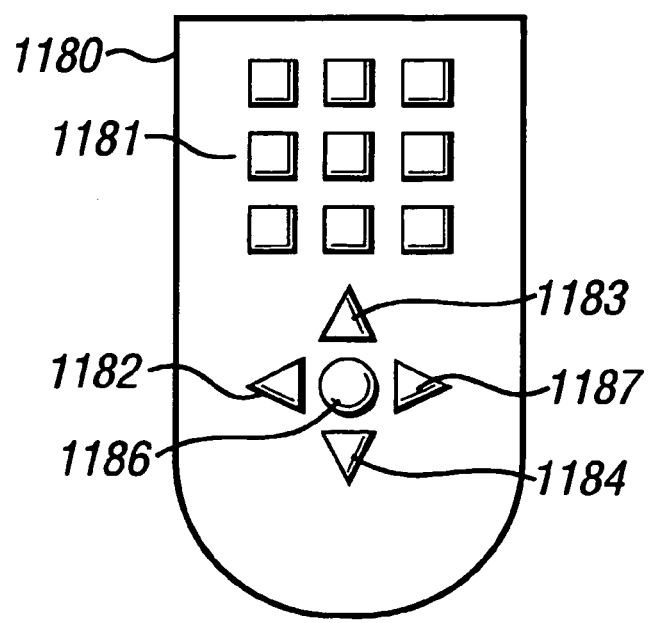
FIG. 6b shows a remote control for navigating the web browser.

FIG. 3 is a simplified diagram of the hierarchy of widgets within a widget set. In this embodiment, the widget set contains a set of primitive widget classes 410 including, amongst others, widow and dialogue box frames, a slider control, a push button, a check box, a text field, and a text editing box. At a next level of complexity, there are classes 420 which combine several primitive widget classes or modify the behaviour of a primitive widget. For example, a widget such as a list box may create editable list items from a text editing box class and allow a user to scroll through the list using a scroll bar derived from a slider control class. At yet a higher level of complexity, the widget set contains aggregate widgets 430 such as a file selection dialogue box which contains push buttons, scrollable lists, text fields and text editing boxes, all of which are defined in other classes of the widget set.

Each of the widget classes implements methods and event handlers to control operation of the widget. The widget classes may also contain methods for drawing some parts of the widget. However, in order to provide a particular appearance or "look" for the widget, the widget classes invoke drawing methods of a look object class with which the widget class is associated. This will be described in further detail below.

Look Class Public Methods and API

In order that the look object classes and widget classes can interact, it is necessary for the look object classes to have a consistent set of public methods that are guaranteed to be available for use by the widget class. In particular, the look object class must provide a standard API, which contains methods that the widget class can invoke in order to draw itself on a GUI display.

The API used by widgets is defined in a base class, from which all looks are derived. The API comprises the following elements:

1. General display methods
2. Particular display methods
3. Control of the creation and destructions of instances
4. Control of borders
5. Control of modifications General display methods are those which are available to all widgets while particular display methods are particular to certain types of widget.

Looks are constructed using a hierarchical architecture. A new look class is created by inheriting the attributes, methods and default values of the class from which it is derived, and then adding new attributes, methods and default values, or overriding some or all of those inherited.

A look class is organised as a table containing pointers to public methods. A look class which is derived from another look class may therefore redefine a method by changing the relevant pointer so that it points to another method. Typically, a look class only implements some of the available public methods.

In one implementation, public methods, known as dummy methods, are provided, which do nothing other than return the call. If a method not implemented by the look class is called by the widget, a dummy method is called. This is done in order to ensure error free functioning of method calls even when the method is in fact not implemented. A disadvantage of calling dummy methods is that time may be wasted in calling a method which does nothing.

In another implementation, look classes are provided with validation masks. A validation mask defines which methods can be called by the look class, so that methods which are not implemented are not called. A widget can access the validation mask of a look class to optimise the drawing of the widget. In this case, the widget is aware of methods which are not implemented, so the widget will avoid generating calls to such methods. In this way, it is possible to prevent time from being wasted in calling dummy methods.

A look class may be derived from two or more other classes (multi-heritage). This can enable a look class to be created that is an union of two or more other looks. As mentioned above, when a look class is created, it adopts the attributes, methods and default values of the look class from which it is derived. In order to implement multi-heritage, the look also contains one or more pointers to the additional classes from which it derives attributes, methods and default values. The look can then access those attributes, methods and default values, without having to copy or create them itself.

In another embodiment, when a look class is created, it adopts the attributes, methods and default values of all of the look classes from which it is derived.

The principle of multi-heritage is also useful in situations where non-standard widgets are designed, which may require the look to implement non-standard methods. A pointer in the look can point to a second look class which contains the non-standard methods that are required to display the widget.

It is important to ensure that the various look classes from which a look is derived do not conflict with each other. This can be done by ensuring that the additional look classes only contain methods which are not in the main look class from which the look is derived, or by giving an order of precedence to the various classes.

An example of the public methods of a look object class is set forth below.

/* Initialisation of instances */

MhwWgtLookInitDefault (MhwWgtLookclass* MhwWgt-LookAtts*);

MhwWgtLookInitClass (Void);

MhwWgtLookResetDefault (MhwWgtLookclass*);

MhwWgtLookAttsGetDefault (MhwWgtLookClass*, MhwWgtLookAtts*);

MhwWgtLookAttsInit (MhwWgtLookAtts *);

/* Retrieve and set border dimensions */

MhwWgtLookAttsGetBorderwidthBottotm (MhwWgtLookAtts *, Card8*);

MhwWgtLookAttsGetBorderWidthLeft (MhwWgtLookAtts *, Card8*);

MhwWgtLookAttsGetBorderWidthRight (MhwWgtLookAtts *, Card8*);

MhwWgtLookAttsGetBorderWidthTop (MhwWgtLookAtts *, Card8*);

MhwWgtLookAttsSetBorderwidthBottom (MhwWgtLookAtts *, Card8);

MhwWgtLookAttsSetBorderWidthLeft (MhwWgtLookAtts *, Card8);

MhwWgtLookAttsSetBorderwidthRight (MhwWgtLookAtts *, Card8);

MhwWgtLookAttsSetBorderWidthTop (MhwWgtLookAtts *, Card8);

/* Retrieve and Set Colours*/

MhwWgtLookAttsGetColorBackground (MhwWgtLookAtts*, MhwWgtColor*);

MhwWgtLookAttsGetColorBlack (MhwWgtLookAtts*, MhwWgtColor*);

MhwWgtLookAttsGetColorDarkGray (MhwWgtLookAtts*, MhwWgtColor*);

MhwWgtLookAttsGetColorForeground (MhwWgtLookAtts*, MhwWgtColor*);

MhwWgtLookAttsGetColorHighlight (MhwWgtLookAtts*, MhwWgtColor*);

MhwWgtLookAttsGetColorLightGray (MhwWgtLookAtts*, MhwWgtColor*);

MhwWgtLookAttsGetColorMapAndVisual (MhwWgtLookAtts*, MhwWgtColorMapId*, MhwWgtVisual*);

MhwWgtLookAttsGetColorMiddleGray (MhwWgtLookAtts*, MhwWgtColor*);

MhwWgtLookAttsGetColorTransparent (MhwWgtLookAtts*, MhwWgtColor*);

MhwWgtLookAttsGetColorVeryLightGray (MhwWgtLookAtts*, MhwWgtColor*);

MhwWgtLookAttsGetColorWhite (MhwWgtLookAtts*, MhwWgtColor*);

MhwWgtLookAttsSetColorBackground (MhwWgtLookAtts*, MhwWgtColor*);

MhwWgtLookAttsSetColorBlack (MhwWgtLookAtts*, MhwWgtColor*);

MhwWgtLookAttsSetColorDarkGray (MhwWgtLookAtts*, MhwWgtColor*);

MhwWgtLookAttsSetColorForeground (MhwWgtLookAtts*, MhwWgtColor*);

MhwWgtLookAttsSetColorHighlight (MhwWgtLookAtts*, MhwWgtColor*);

MhwWgtLookAttsSetColorLightGray (MhwWgtLookAtts*, MhwWgtColor*);

MhwWgtLookAttsSetColorMapAndVisual (MhwWgtLookAtts*, MhwWgtColorMapId, MhwWgtVisual);

MhwWgtLookAttsSetColorMiddleGray (MhwWgtLookAtts*, MhwWgtColor);

MhwWgtLookAttsSetColorTransparent (MhwWgtLookAtts*, MhwWgtColor);

MhwWgtLookAttsSetColorVeryLightGray (MhwWgtLookAtts*, MhwWgtColor);

MhwWgtLookAttsSetColorWhite (MhwWgtLookAtts*, MhwWgtColor);

/* Retrieve and Set Heritage Data */

MhwWgtLookAttsGetHeritageData1 (MhwWgtLookAtts*, Void**);

MhwWgtLookAttsSetHeritageData1 (MhwWgtLookAtts*, Void*);

/* Constructor */

MhwWgtLookNew (MhwWgtLookAtts*);

/* Destructor */

MhwWgtLookDelete (anObject)

/* Standard API */

MhwWgtLookDrawAnchor (anObject, aWidget, aX, aY, aW, aH, aText, aLength, anAscent, aState)

MhwWgtLookDrawBackground (anObject, aWidget, aX, aY, aW, aH)

MhwWgtLookDrawCheckSymbol (anObject, aWidget, aX, aY, aW, aH, aState, aSymbol)

MhwWgtLookDrawChoiceSymbol (anObject, aWidget, aX, aY, aW, aH)

MhwWgtLookDrawCross (anObject, aWidget, aX, aY, aW, aH)

MhwWgtLookDrawCursor (anObject, aWidget, aX, aY, anAscent, aH)

MhwWgtLookDrawForeground (anObject, aWidget, ax1 aY1 aW, aH)

MhwWgtLookDrawFocus (anObject, aWidget, aX, aY, aW, aH)

MhwWgtLookDrawHighlight (anObject, aWidget, aX, aY, aW, aH)

MhwWgtLookDrawInset (anObject, aWidget1 aX, aY, aW, aH)

MhwWgtLookDrawIterm (anObject, aWidget, aX, aY, aW, aH, aText, aTextLength, anAscent, aState)

MhwWgtLookDrawOutset (anObject, aWidget, aX, aY, aW, aH)

MhwWgtLookDrawRelief (anObject, aWidget, aX, aY, aW, aH, aRelief)

MhwWgtLookDrawSelectedBG (anObject, aWidget, aX, aY, aW, aH)

MhwWgtLookDrawSlidArrow (anObject, aWidget, aX, aY, aW, aH, aDirection)

MhwWgtLookDrawSlidLift (anObject, aWidget, aX, aY, aW, aH)

MhwWgtLookDrawString (anObject, aWidget, aX, aY, aText, aLength, anAscent)

MhwWgtLookGetBorderWidth (anObject, aBorder)

MhwWgtLookGetClassId (anObject)

MhwWgtLookGetClassName (anObject)

MhwWgtLookGetItemBorderWidth (anObject)

MhwWgtLookGetMethodMask (anObject)

MhwWgtLookGetPreferredSizeArrow (anObject)

MhwWgtLookGetPreferredSizeCheck (anObject)

MhwWgtLookGetPreferredSizeChoice (anObject)

MhwWgtLookGetPreferredSizeCross (anObject)

MhwWgtLookGetUpdateCounter (anObject)

MhwWgtLookIsInstanceOf (anObject, aClassId)

MhwWgtLookReDrawItem (anObject, aWidget, aX1 aY, aW, aH, aText, aLength, anAscent, aState)

MhwWgtLookRef (anObject)

MhwWgtLookSetBorderWidth (anObject, aBorder, aWidth)

MhwWgtLockUnDrawCross (anObject, aWidget, aX, aY, aW, aH)

MhwWgtLookUnDrawCursor (anObject, aWidget, aX, aY anAscent, aH)

MhwWgtLookunDrawFocus (anObject, aWidget, aX, aY, aW, aH)

MhwWgtLookunDrawHighlight (anObject, aWidget, aX, aY, aW, aH)

MhwWgtLookunDrawRelief (anObject, aWidget, aX, aY, aW, aH)

MhwWgtLookunRef (anObject)

MhwWgtLookGetBackground (anObject)

MhwWgtLookGetColorBlack (anObject)

MhwWgtLookGetColorDarkGray (anObject)

MhwWgtLookGetColorHighlight (anObject)

MhwWgtLookGetColorLightGray (anObject)

MhwWgtLookGetColorMap (anObject)

MhwWgtLookGetColorMiddleGray (anObject)

MhwWgtLookGetColorTransparent (anObject)

MhwWgtLookGetColorVeryLightGray (anObject)

MhwWgtLookGetColorWhite (anObject)

MhwWgtLookGetColorForeground (anObject)

MhwWgtLookGetColorHeritageData1 (anObject)

MhwWgtLookGetColorHeritageLink1 (anObject)

Creating and Displaying a Widget

When an application requires a widget to appear on the display of a GUI, the first task it must perform is to construct an instance of the widget class. During creation of the widget instance, a look class instance becomes associated with the widget class instance. The particular look is chosen as follows:
1. If a look class instance is passed by the application to the constructor, then use it.
2. Otherwise, use the default look specified for the class of widget being created, if there is one.
3. Otherwise, use the default look specified for the widget context, if there is one.
4. Otherwise, use the default look for the widget set.

Once the widget class has been instantiated, the application can invoke an appropriate one of its public methods to display it.

Figure 5:
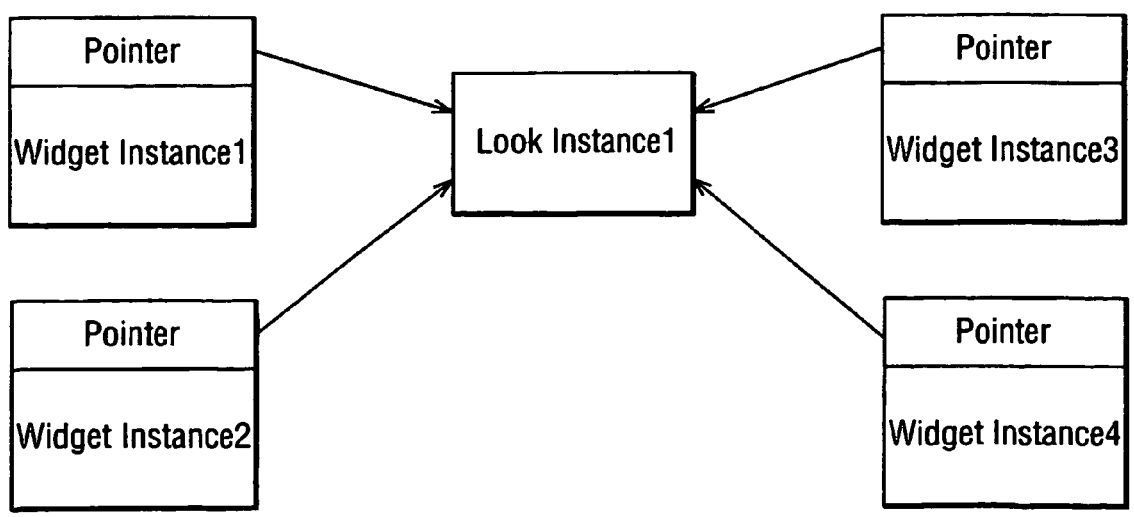
FIG. 5 illustrates the location in memory of several widgets

The widget class also preferably provides a public method that can be called with a pointer to a look class instance, and that look class instance then becomes associated with the widget class instance. This causes the appearance of the widget to change in accordance with the newly associated look class instance. It should be understood that "association" is, in reality, nothing more than setting the value of a field within the widget class instance. To associate the widget with a different look class can, in the simplest of embodiments, be done simply by making an assignment to the field. (However, see the comments below relating to memory management and the method MhwWgtXxxSet-Look.) Moreover, many widget class instances may be associated with one look class instance. This is illustrated diagrammatically in FIG. 5.

When a widget class method is called to draw the widget on a GUI display, it builds the image of the widget in the following order:
1. The background of the widget (for example, a background colour or an image).
2. Background overlay (for example, a logo)
3. Foreground of the widget
4. Foreground overlay (for example, a logo)
5. The widget border.
6. Highlighting
7. Input focus.

For a given widget, certain parts may be absent. The presence or absence of a part of the widget depends on the following criteria.
1. Hard coding. Some of the parts are not defined for certain classes of widget.
2. Optional parts. For example, the focus, the relief and the highlight may be inhibited at will by means of a public attribute of the widget.
3. Definition of the look. A look can omit one or more of the parts.

In a typical example, the following steps are carried out.

Firstly the background of the widget is drawn by the widget class method itself, for example, by painting a background colour, a background pattern or an image. The background overlay is then drawn by invoking the public method of the associated look instance MhwWgtLookDrawBackground specifying appropriate arguments for the height, width and position of the widget on the display. The appearance of the background is thus modified by the look, for example, by overlaying a logo.

The widget class method must then build up the foreground of the widget; that is to say, it creates the visual objects that actually are manipulated by a user or display information when the widget is in use. For example, the widget might implement a check box, in which case it invokes the look class method MhwWgtLookDrawCheckSymbol. The look may then modify the foreground, for example by overlaying a logo.

The border region of the widget is then drawn, as will be described below.

If the widget class determines that one of the objects within the widget has input focus, it invokes the look class method MhwWgtLookDrawFocus to indicate this in the displayed widget. Similarly, if part of the widget is to be highlighted, the widget class invokes the look class method MhwWgtLookDrawHighlight.

Widget Border Management

Figure 4:
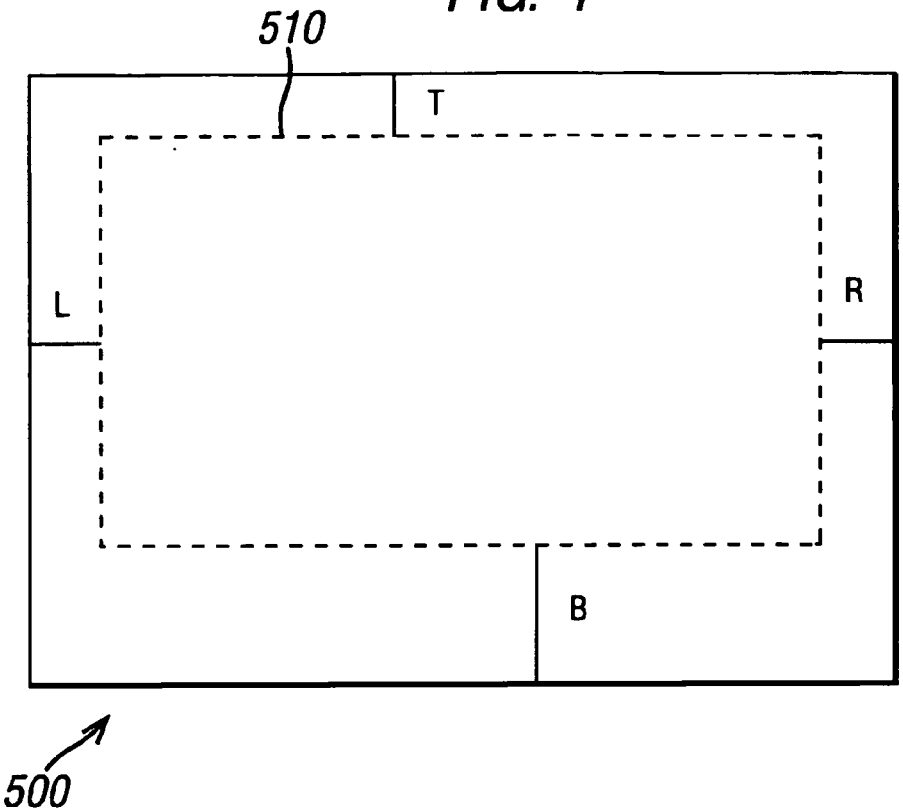
FIG. 4 is a simplified diagram of a widget appearing on a GUI display.

One specific example of the way in which the look controls the appearance of the widget on a GUI display is in the management of borders. The appearance of a widget with borders in its most general form on a GUI display is shown in FIG. 4. The widget 500 occupies a rectangular area in the display of a GUI. The area occupied by the widget includes two regions: an inner operative region 510 surrounded by a border region.

The border region typically does not contribute to the function of the widget (although it may, in some cases, by used by a user to move and/or re-size the widget). Therefore, there is considerable scope for variation of the appearance of the border region in accordance with a user's wishes. For example, the colour, width, background pattern can all be selected to appeal to a user or to provide a consistent appearance. Therefore, responsibility for drawing the border is given to the look class.

The look maintains four dimensions to specify the width of the border. These specify the distance from the left, right, top and bottom of the operative region 510 to the edge of the widget. These dimensions are indicated respectively at L, R, T, and B in FIG. 4. Values for these dimensions are specified in the default look. An application may define a class derived from the default look class in which the values are overridden to create a look that creates a widget with a border of non-standard width. An application (for example, a look manager) can also change the values at run time by invoking the look methods MhwWgtLookAttsSetBorderwidth-Bottom, MhwWgtLookAttsSetBorderWidthLeft, MhwWgt-LookAttsSetBorderwidthRight, or MhwWgtLookAttaSet-BorderWidthTop.

Within the look class there is code that controls the detailed layout of a border according to values passed to the look class by the widget class.

Widget Colour Management

A look also includes a definition of colours, so that any widget instance which is associated with a particular look instance will use the colours defined in that look instance. In one embodiment, a look defines the following colours:
 black
 dark gray
 middle gray
 light gray
 very light gray
 white
 transparent
 highlight colour The colour definitions in the look are used when drawing a widget. For example, if a black line is to be drawn when displaying a widget, the colour which has been defined as "black" will be used. For example, if the look is to have a red hue, then "black" may be defined to be dark red, and "white" may be defined to be light pink, with various shades of red being defined in between. In this example, a drawing operation which would normally draw a black line will instead draw a dark red line, and so on.

In addition, the look defines a colour map which sets the actual colour values which are to be used when displaying any particular colour on the display of a GUI.

Creating a Modified Widget

Suppose that the default look method MhwWgt-LookDrawCheckSymbol draws a rectangular box which is either empty or which contains a small tick symbol depending on its state, and that this defines the look of a normal check box in a GUI. Now suppose that another widget is required in which either a tick or a cross is displayed. The appearance is entirely controlled by the look class, so only the look class need be altered. Moreover, a new look class to implement this behaviour can be derived from the existing look class, and provide only one method MhwWgt-LookDrawCheckSymbol to override the method of the same name in the base look class. Moreover, when the method MhwWgtLookDrawCheckSymbol is invoked with the argument aState set to true, the method MhwWgt-LookDrawCheckSymbol of the base class can be called to draw a tick. New code need be written only to handle the case where a cross is to be drawn. Thus, a new widget can be created with a minimum of programming effort.

It should be understood that this procedure does not alter the appearance of the original check box widget; this widget uses the base look class which has not been amended. In order to effect a change to the appearance of the original check box widgets in an application, the method MhwWgt-LookDrawCheckSymbol in the base look class must be amended. All check box widgets derived from that class will then change their appearance following the next occasion (at compile time, or run time, as the case may be) upon which the look class is linked with the application.

The widget class will, in principle, co-operate to create a widget with any class having an appropriate set of public methods and properties as a look class. However, there is advantage in deriving all look classes from as small as possible a number of common base classes, and ideally just one base class. Those familiar with object-oriented programming will understand that this minimises the use of memory and other resources by the look classes. A derived class has a pointer to its base class so that it can access method code and static data of the base class without duplication of such code or data in memory.

Version Control

It may be that some widget instances have a very long life. For example, the root window of a window manager, a taskbar widget in a workstation display, and so forth. In such cases, there is a strong possibility that the look classes might be updated during the life of the widget. The widget class must be caused to re-draw itself when this happens.

One a way to achieve this is to give each look class an update counter which is exported as a public property or is accessible though a public method. When a widget class is instantiated, the widget class instance queries the update counter of the associated look, and stores the value of the update counter in memory local to the widget class instance. If the instance of the look class is subsequently updated, the widget class instance can detect this change by comparing the value that is stored in its local memory with the value of the update counter in the look class instance. If the look class instance has been updated, the widget can then redraw itself using the methods of the look class.

Construction and Destruction of Look Class Instances

In general, there will be fewer instances of each look class than of each widget class. In some cases, there may be just one instance of a look base class referred to by all widget class instances in an application. There may also be instances of derived look classes referred to by some of the widget class instances of an application. However, a widget class cannot assume that there will always be a look class instance in existence at the time that the widget class is being instantiated; the widget instance might be the first to require association with a particular look class.

Therefore, it is proposed that during instantiation of each widget class, the widget class constructor invokes the associated look class constructor MhwWgtLookNew. If no instance of the look class exists, then a new instance is created. A value of 1 is then stored in a reference counter held in the local memory of the look class instance. If an instance of the look class already exists, the look class constructor returns a pointer to it, and increments the reference counter.

During destruction of each widget class instance, the destructor of the widget class invokes the destructor MhwWgtLookDelete for the associated look class instance. The destructor MhwWgtLookDelete decrements the reference counter. If the counter remains greater than zero, the destructor simply returns. However, if the destructor reaches zero, then no widget class instances (other that the one undergoing destruction) are associated with that look class instance, in which case the look class destructor proceeds to remove the look class instance from memory.

The widget class method MhwWgtXxxSetLook can be called to change the look with which a particular widget class instance is associated. Within this method, a call is first made to the destructor of the outgoing look class instance, and a call is then made to the reference function of the new look class to obtain a pointer to a class instance. This ensures that the reference counters of the look classes are properly updated.

There must also provision for a new instance of a look class to be created even if an instance already exists. This allows an application to have more than one instance of any given look class, and to set different attributes in the different instances. For example, there may be two instances of the same look class identical in all respects other than one has all attributes remaining in accordance with their defaults, and the other having different values assigned to one or more of its attributes (border width, colour, and so forth).

Look Managers

As will be understood, the system of look classes and instances allows very detailed control over the overall look of an application. For instance, just one attribute of any look class can be changed to effect a minor change to the look of an application. Accordingly, a look manager application may be provided to enable a user to alter these attributes as required.

Such an application typically includes a GUI display including widgets embodying the invention in order that the user can immediately see the effect of changing the attributes of the look upon the appearance of the widget.

Web Browser

The internet navigator interface will now be described with reference to the accompanying drawings.

Figure 6A:
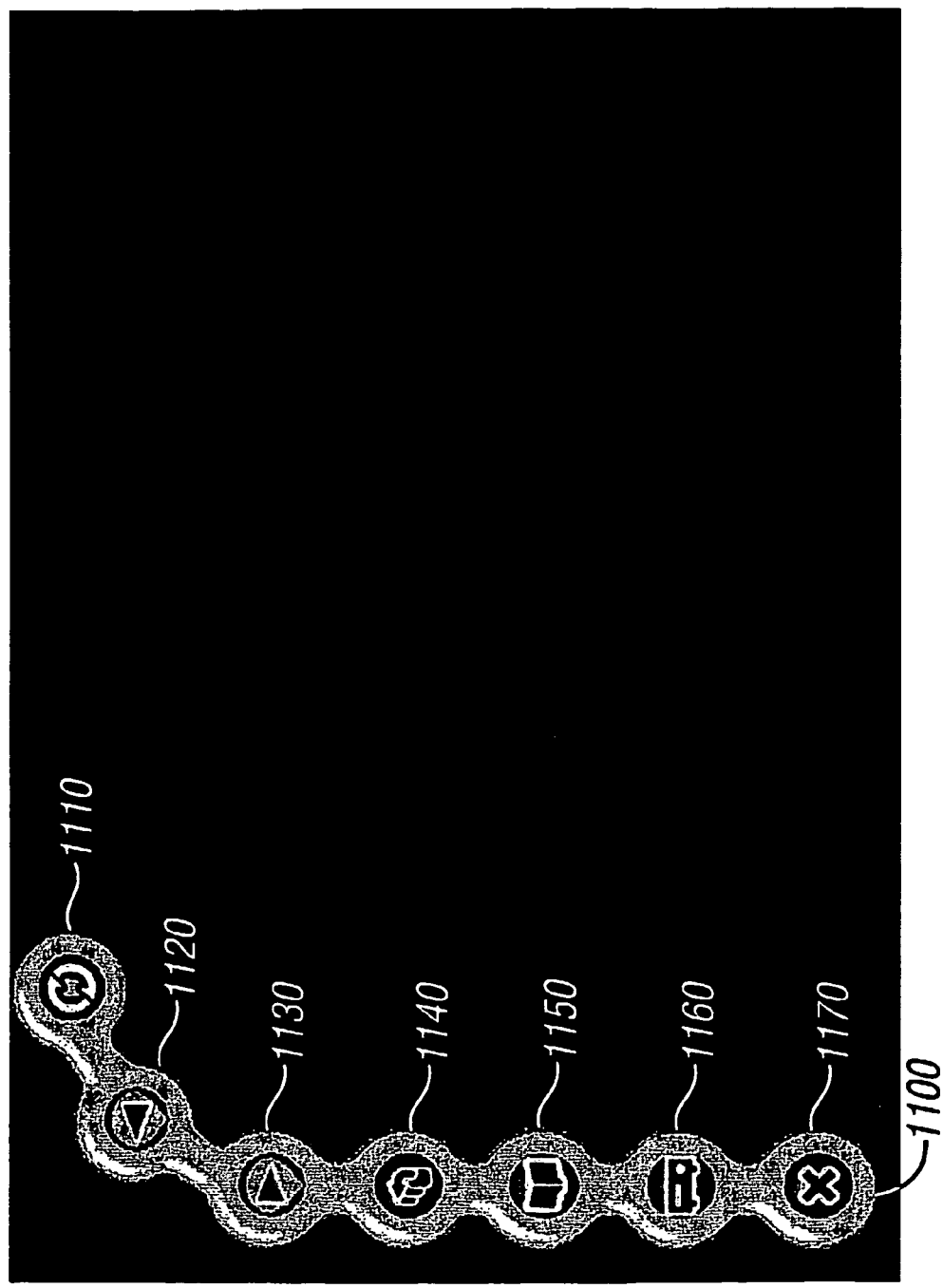
FIG. 6a illustrates a screen display of the web browser.

FIG. 6a shows a screenshot of the main screen navigator display of an Internet browser.

The main screen shows a vertical chain 1100 which includes the main menu which includes various buttons as a linked list. The buttons are linked by link elements of the chain. The buttons shown in the chain 1100 of FIG. 6a include the RELOAD/STOP button 1110, the PREVIOUS button 1120, NEXT button 1130, HISTORY button 1140, BOOKMARK button 1150, SETTINGS button 1160 and the QUIT button 1170.

The main menu chain 1100 is arranged to be superimposed on the hyper-text markup language (HTML) document to be displayed on the screen 1101. In FIG. 6a, no HTML document is displayed and the screen 1101 is blank apart from the main menu chain 1100.

The web browser includes several preferences which can be set by the user. The browser includes a facility for setting several user profiles.

The user has a controller with which he can navigate between objects on the screen 1101, highlight objects and select objects. In the present example, the controller used is a television remote control 1180. The number keys 1181 are used to enter data; the cursor keypad 1182 is used to navigate around the screen. The cursor keypad 1182 includes an UP key 1183, a DOWN key 1184, a LEFT key 1185 and a RIGHT key 1187. The cursor keypad 1182 also incudes a SELECT key 1186 which is used for selecting objects on the screen.

The UP key 1183 and the DOWN key 1184 are used to move a focus, in this example a highlight up and down the chain 1100 to selectively highlight the buttons 1110, 1120, 1130, 1140, 1150, 1160 and 1170. When a button is highlighted, it can be selected using the select key 1186.

When an HTML page is displayed, any button of the remote control calls the chain 1100 (toolbar). The chain 1100 can also be turned on and off by the user. In one settings option the chain 1100 automatically is hidden when a new HTML page is displayed, the user calling up the chain 1100 when he wants to move to another HTML page.

Figure 7:
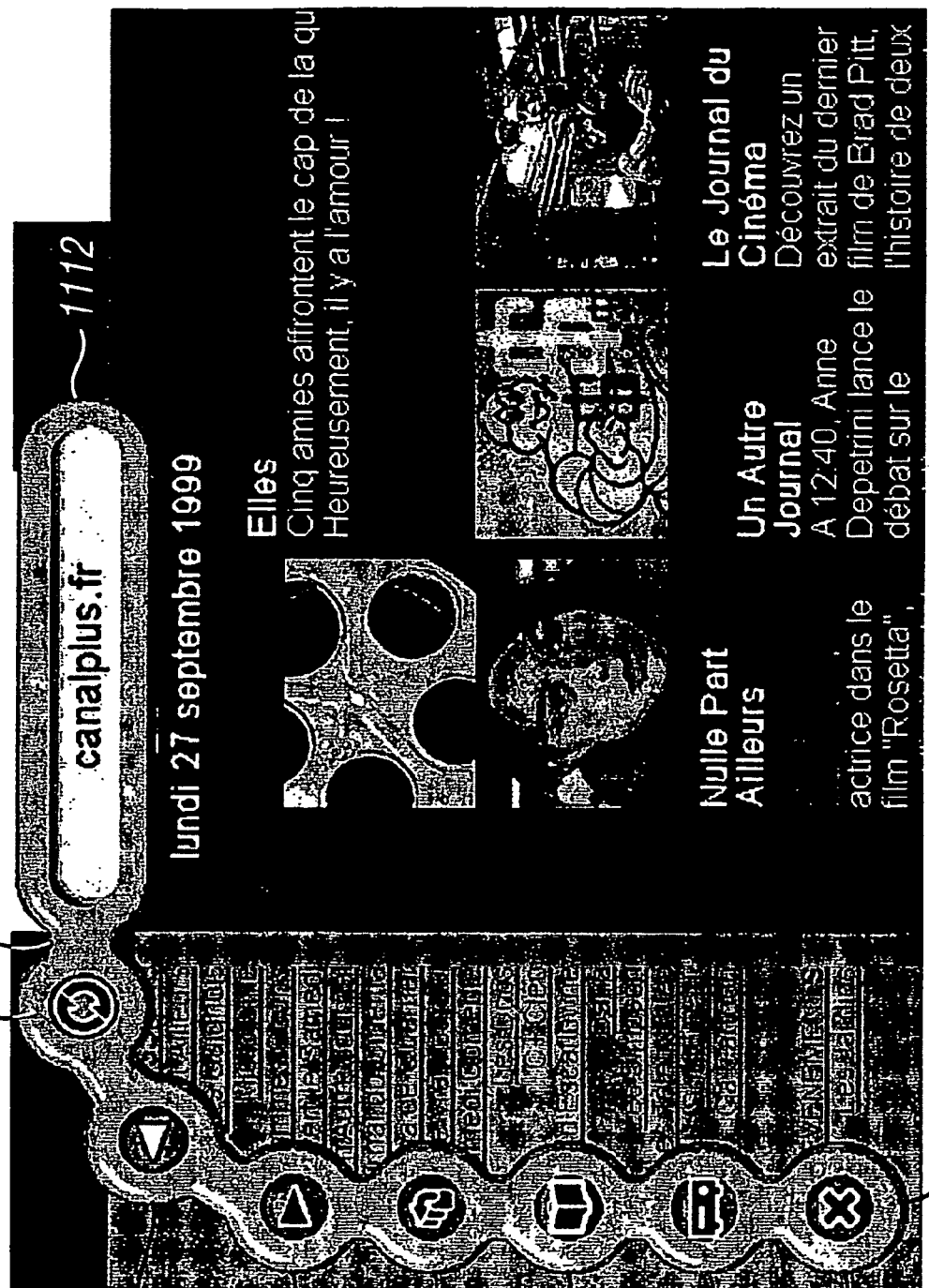
FIG. 7 illustrates a further screen display of the web browser.

FIG. 7 shows the screen of FIG. 6a having an HTML document open. Information about the open document is given in a text box 1112 linked in the chain to the RELOAD/STOP button 1110. It will be seen that the chain links 1114 between the buttons indicate visually to the user that he can move between the buttons in the direction of the links.

FIG. 6a shows the RELOAD/STOP button highlighted (the highlighted RELOAD/STOP icon is white on a dark background rather than dark on a white background as in FIG. 7 where it is not highlighted). The HTML document can be reloaded by pressing the select key 1186 when the RELOAD/STOP button is highlighted.

Figure 8:
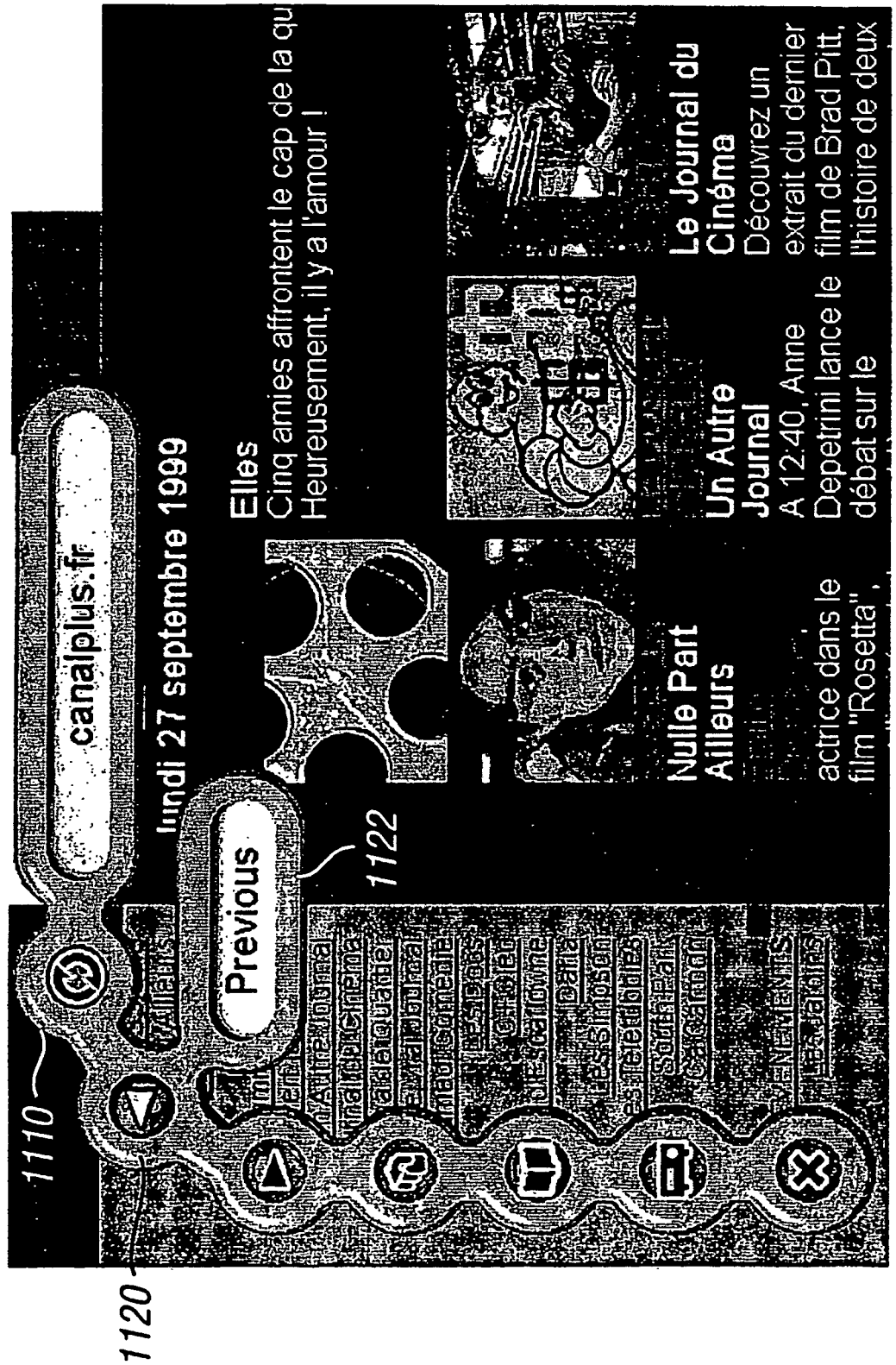
FIG. 8 illustrates a further screen display of the web browser.

The user moves the highlight down the chain 1100 using the DOWN key 1184. In FIG. 7, the PREVIOUS button 1120 is now highlighted. FIG. 8 shows how, when the highlight is on the PREVIOUS button 1120 a "tooltip" comprising a text box 1122 appears on the screen. In the present example, the tooltip appears as soon as the relevant icon is highlighted. The preferences could be set so that the tooltip appears after a delay when the button is highlighted. The text box 1122 includes the word "previous" to indicate the function of the PREVIOUS button 1120. By activating the PREVIOUS button, by pressing the SELECT key 1186, the browser moves to the previous page viewed.

Figure 9:
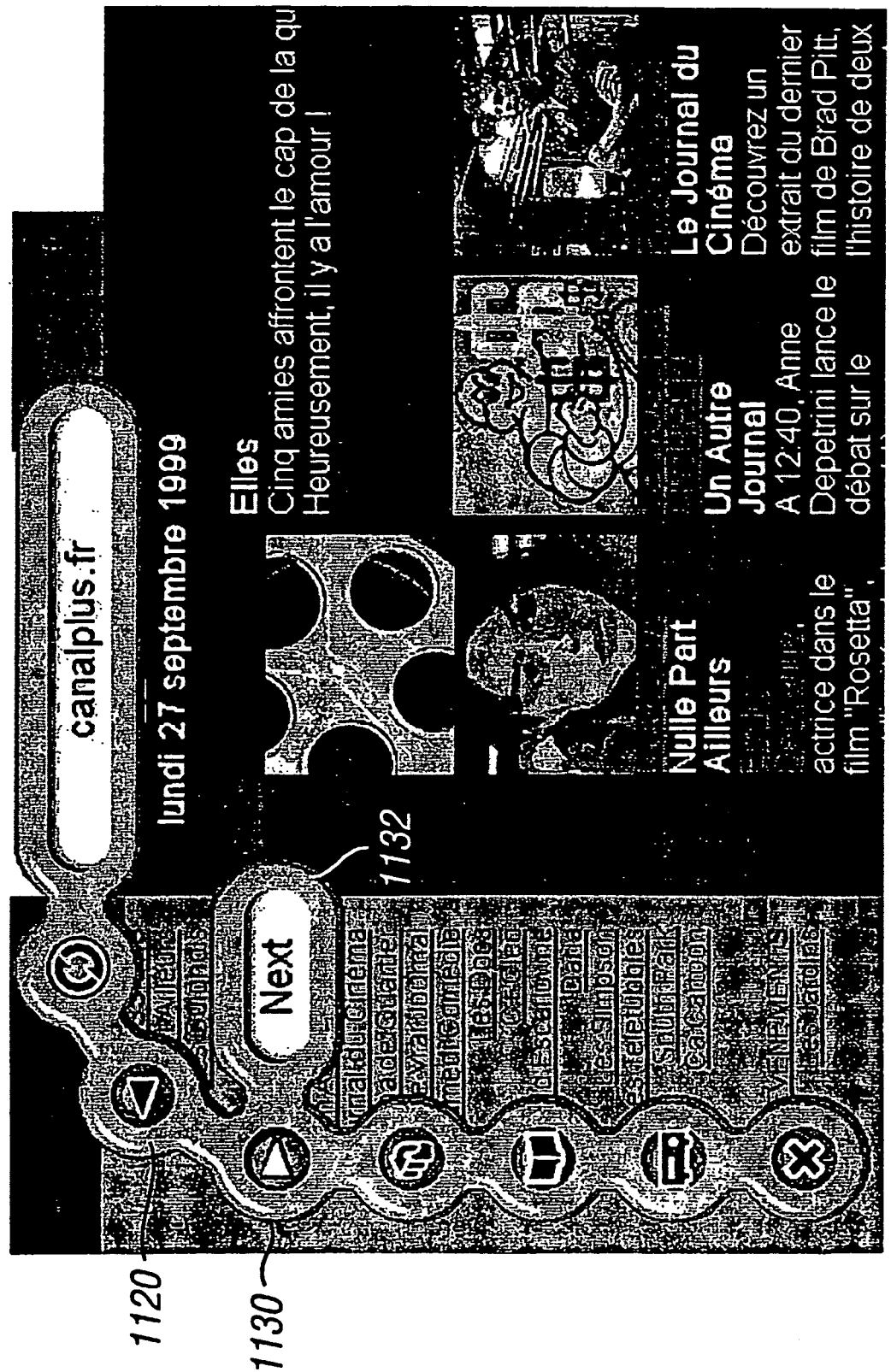
FIG. 9 illustrates a further screen display of the web browser.

In FIG. 9, the highlighting is moved down to the NEXT button 1130 and, after a short time, a tooltip comprising a text box 1132 including the word "next" appears to assist the user.

Figure 10:
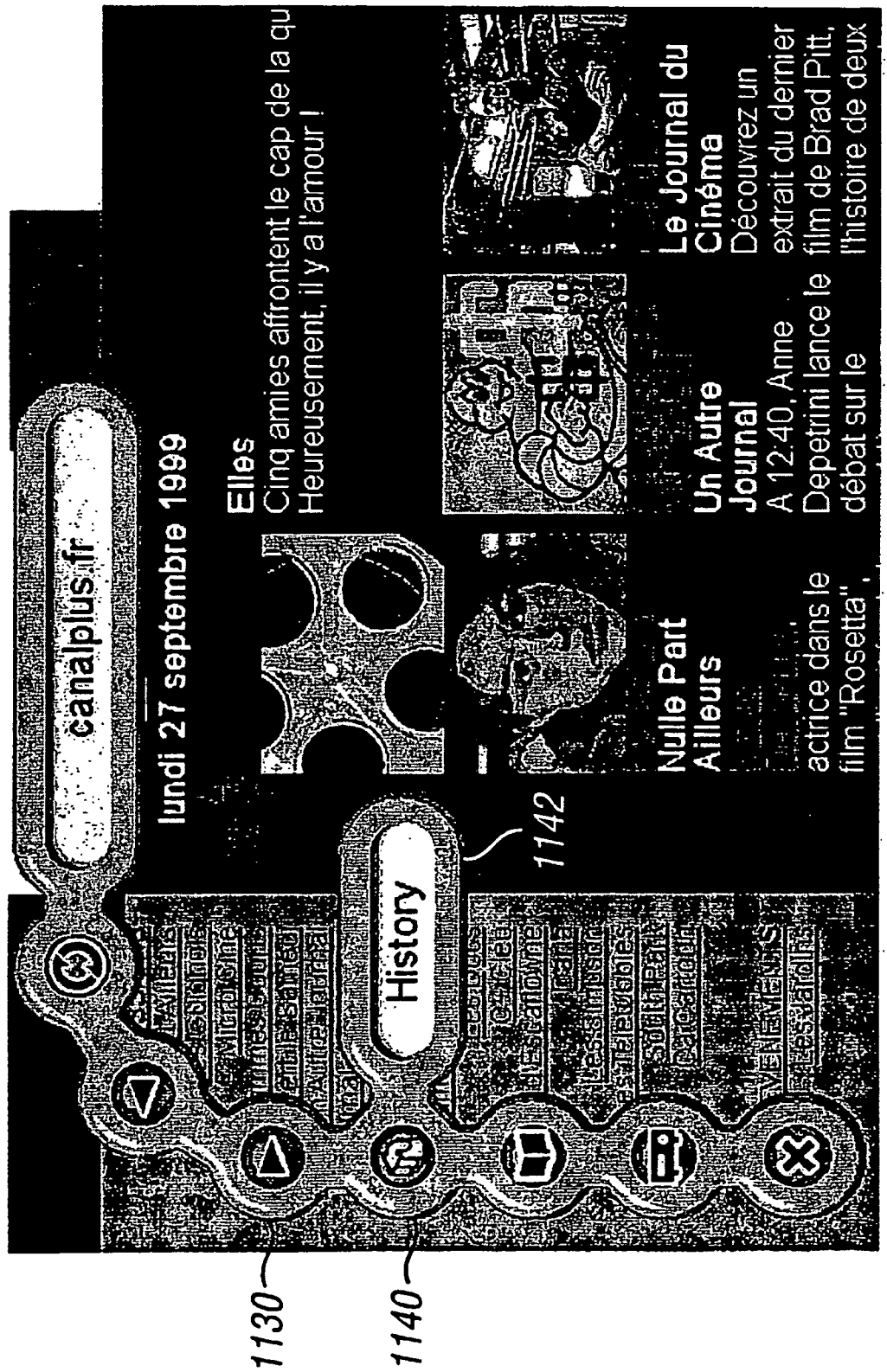
FIG. 10 illustrates a further screen display of the web browser.
Figure 11:
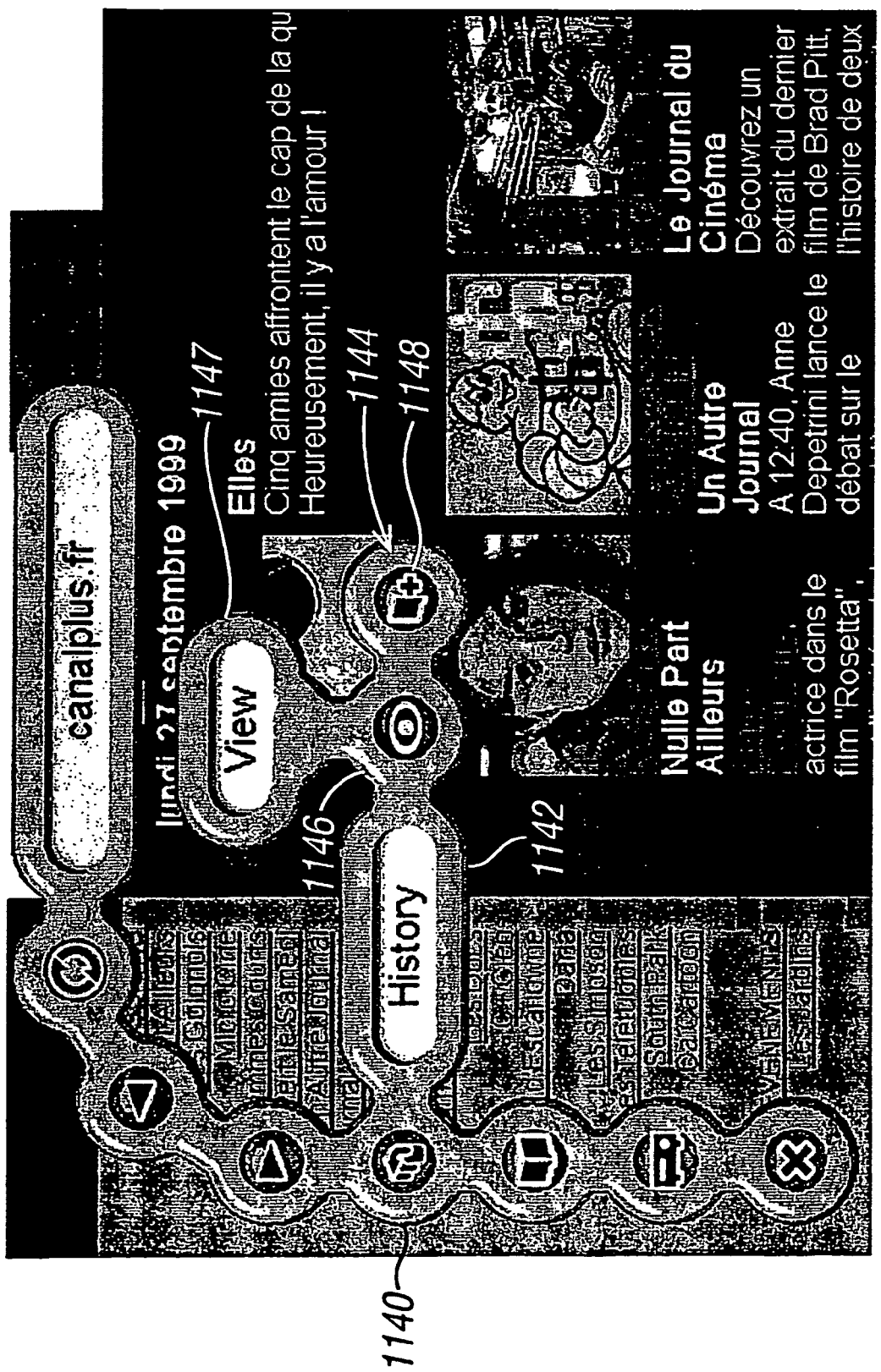
FIG. 11 illustrates a further screen display of the web browser.

In FIG. 10, the HISTORY button 1140 is highlighted and its associated tooltip 1142 appears with the word "history". The HISTORY button 1140 has more than one function and so, activating the button by pressing the SELECT key 1186 on the control keypad causes a sub-chain 1144 to appear giving further options relating to the history function. The sub-chain 1144 is shown in FIG. 11. The sub-chain 1144 includes additional buttons including a VIEW button 1146 and an ADD button 1148. The user moves along the sub-chain 1144 using the RIGHT and LEFT keys 1187, 1185. In the screen display of FIG. 11, the VIEW button is highlighted and a tooltip 1147 appears to tell the user that the button highlighted is VIEW. It will be noted that the tooltips attached to the main chain 1100 appeared on the right hand side of the chain 1100; the tooltips for the subchain appear above the sub-chain.

The size of the box for the tooltip is matched to the length of the word or words to be displayed. Where different language preferences can be set, the size of the box for the tooltip is preferably matched to the length of the word in the language selected.

Figure 12:
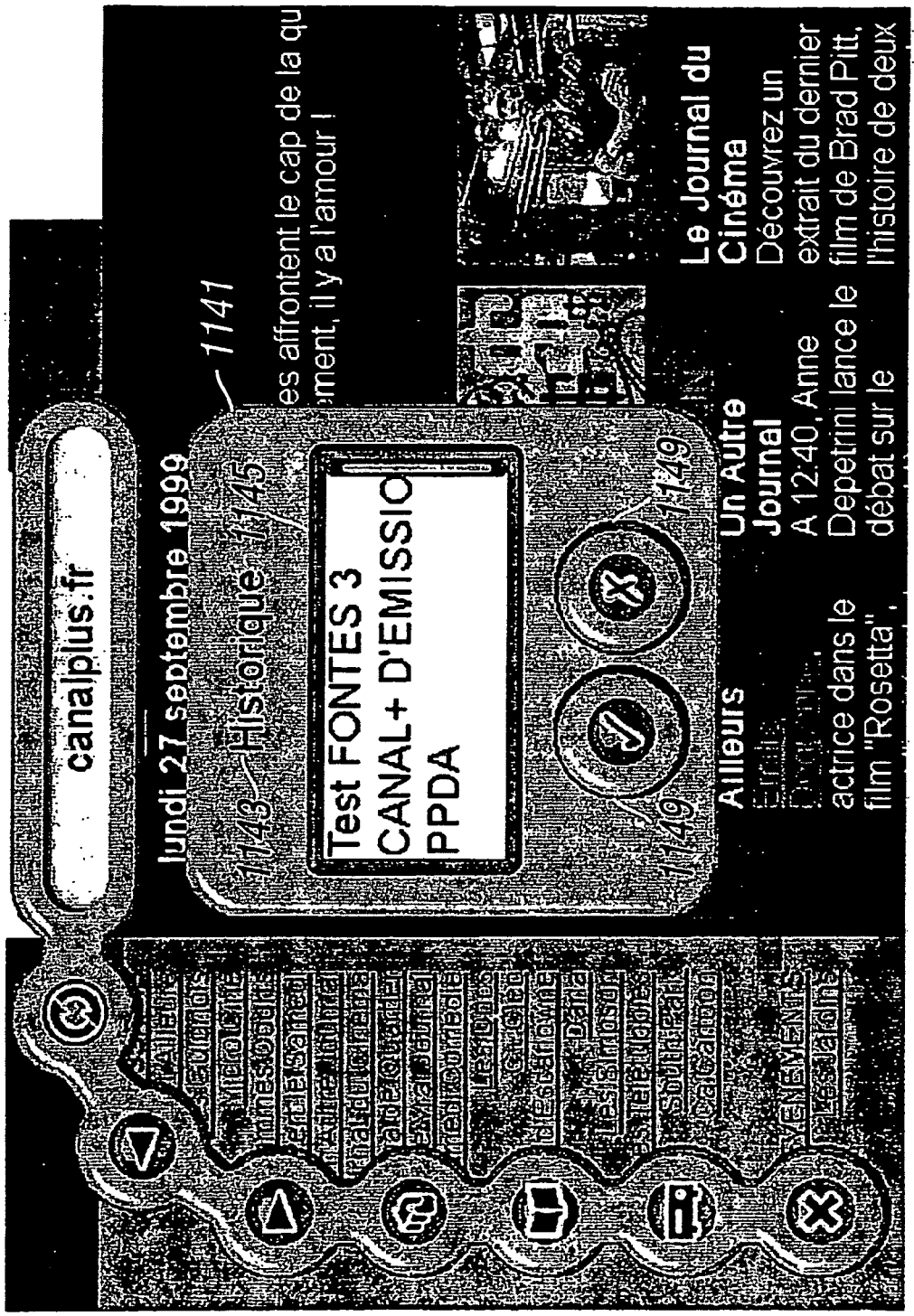
FIG. 12 illustrates a further screen display of the web browser.

FIG. 12 shows the display obtained when the VIEW button is selected. A VIEW HISTORY window 1141 appears on the screen having a heading 1143 (here the French language option has been selected for the heading) and showing details 1145 of previous pages viewed by the user. The user may scroll up and down the text and highlight one of the details 1145 using the SELECT key 1186. The LEFT and RIGHT keys are used to highlight the OK or CANCEL keys 1149, 1149'.

Figure 13:
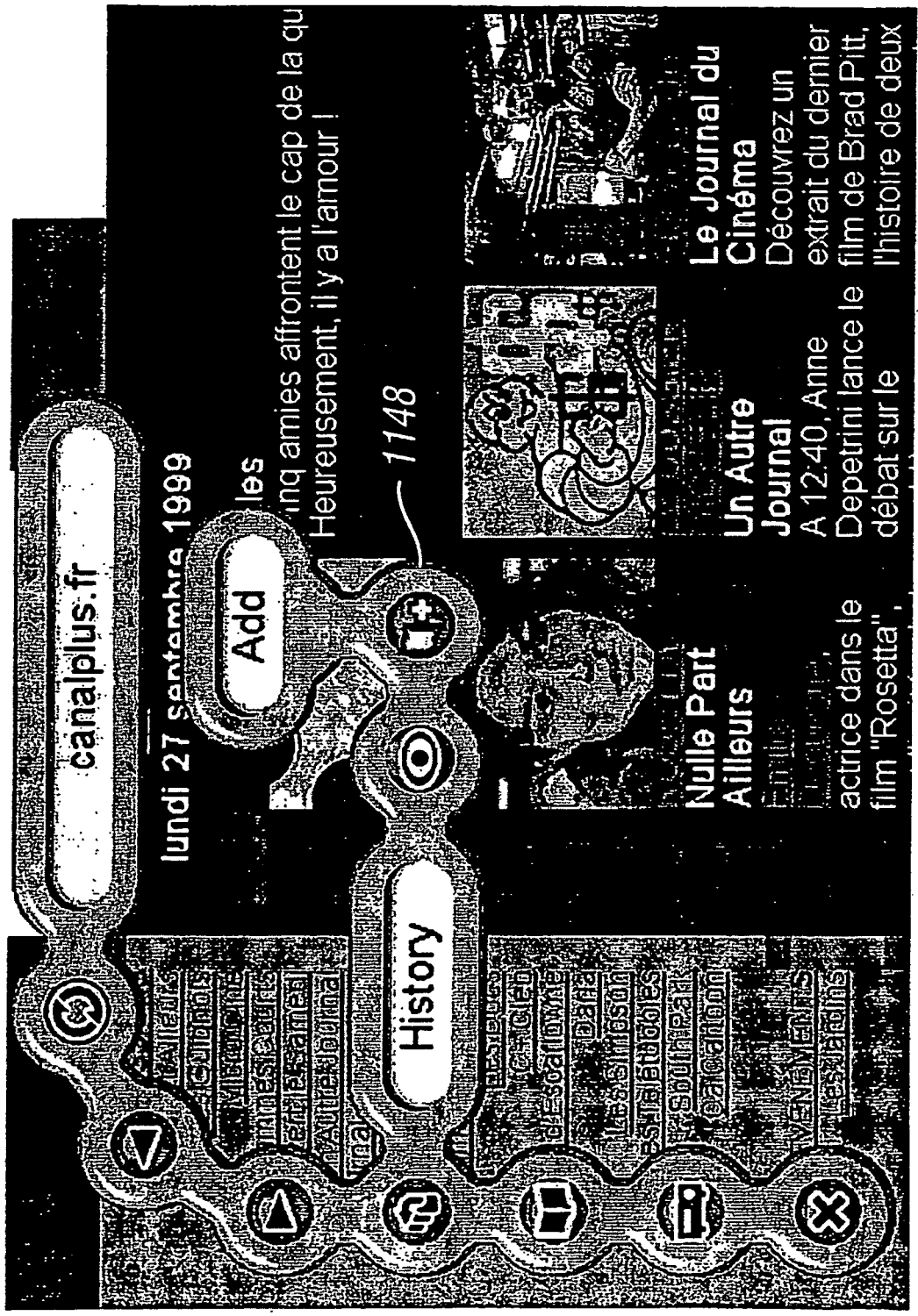
FIG. 13 illustrates a further screen display of the web browser.

FIG. 13 shows the ADD button 1148 highlighted and its associated tooltip. The ADD button 1148 is used to add the presently displayed page to the history list 1145.

Figure 14:
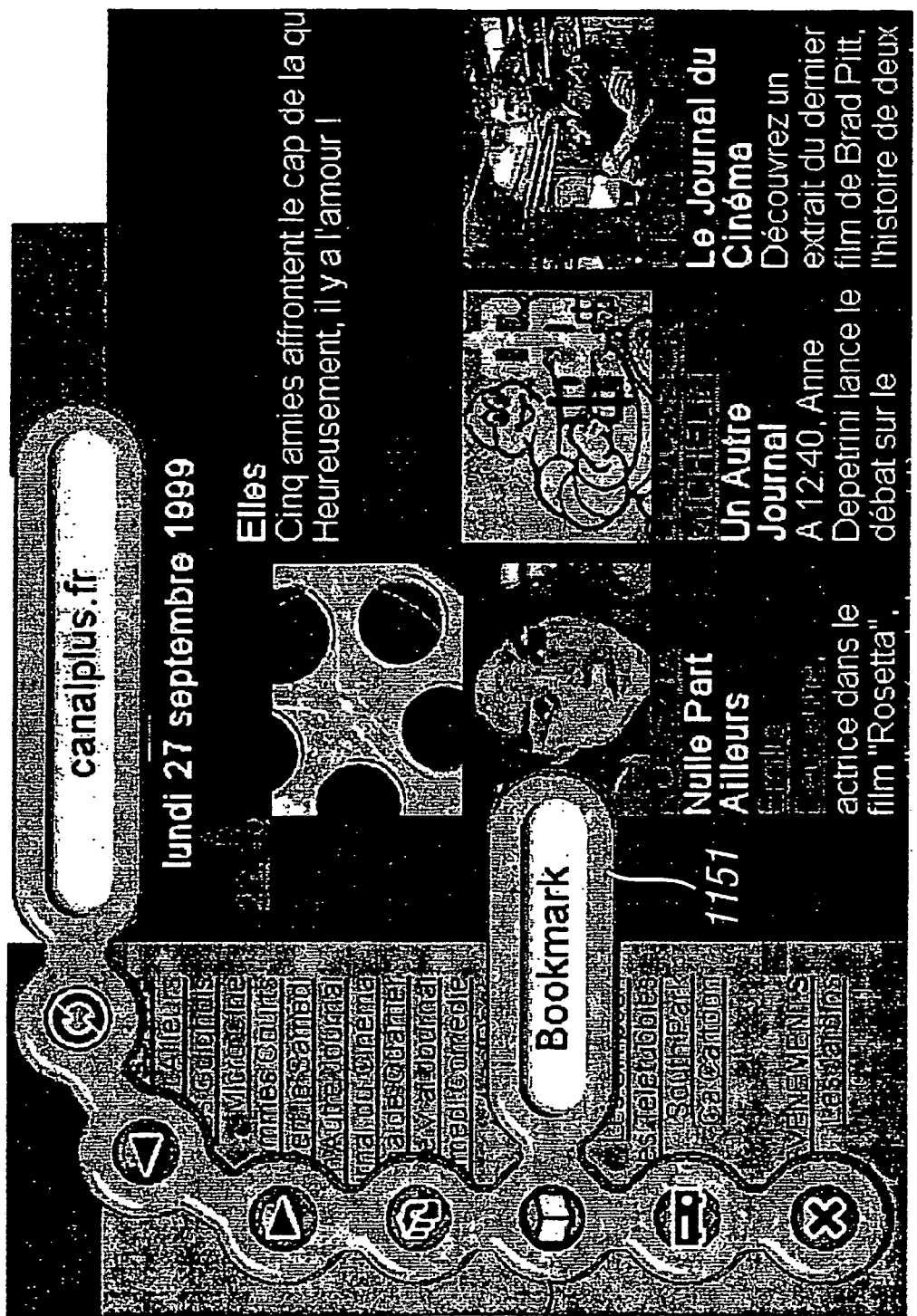
FIG. 14 illustrates a further screen display of the web browser.
Figure 15:
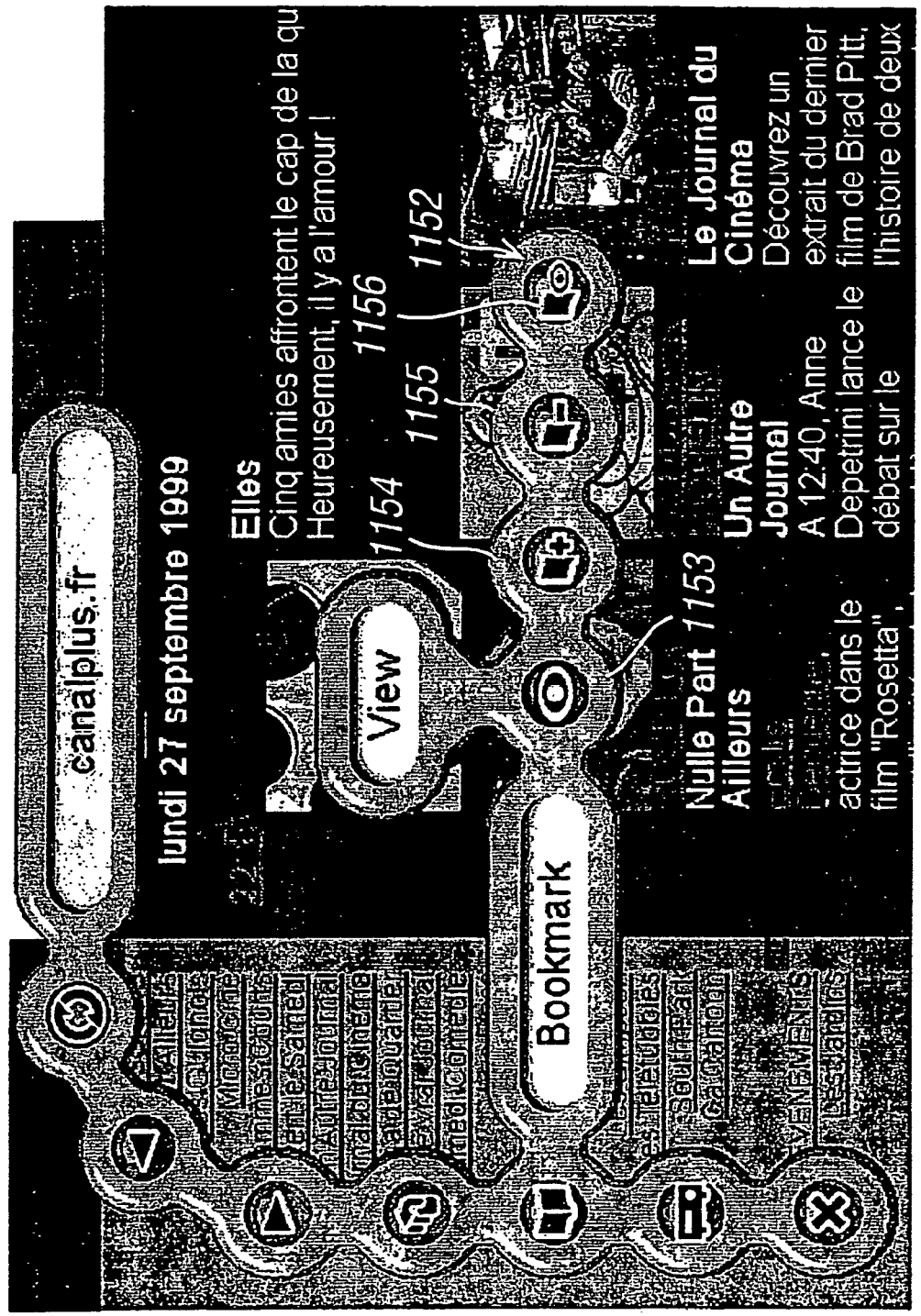
FIG. 15 illustrates a further screen display of the web browser.
Figure 16:
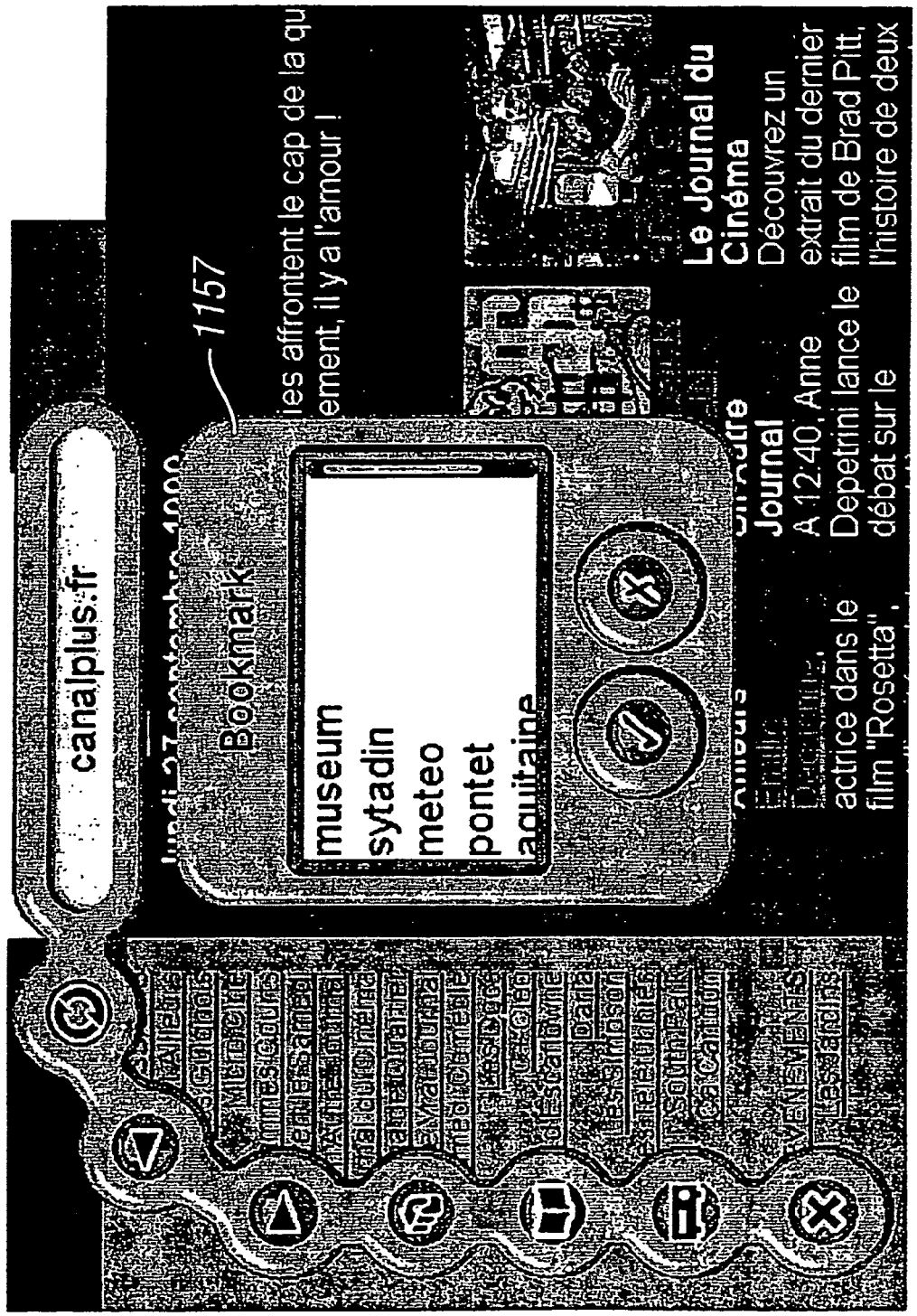
FIG. 16 illustrates a further screen display of the web browser.

FIG. 14 shows the BOOKMARK button 1150 highlighted and its associated tooltip 1151. In FIG. 15, the BOOKMARK button 1150 has been selected and the bookmark sub-chain 1152 is shown including the tooltip 1151, the VIEW, ADD, DELETE and EDIT buttons, 1153, 1154, 1155, 1156. In FIG. 15, the VIEW button 1153 is highlighted and its tooltip shown. The VIEW button 1153 is selected and the VIEW window 1157 is shown (see FIG. 16). (It will be seen that, for clarity, the bookmark sub-chain 1152 is not shown when the view window 1157 is on the screen.) The VIEW window 1157 includes a heading, and a scrollable text box listing bookmarks. As for the VIEW HISTORY window, the window also includes OK and CANCEL keys. The cursor keypad 1182 is used to navigate about the window and to select a bookmark, if desired.

Figure 17:
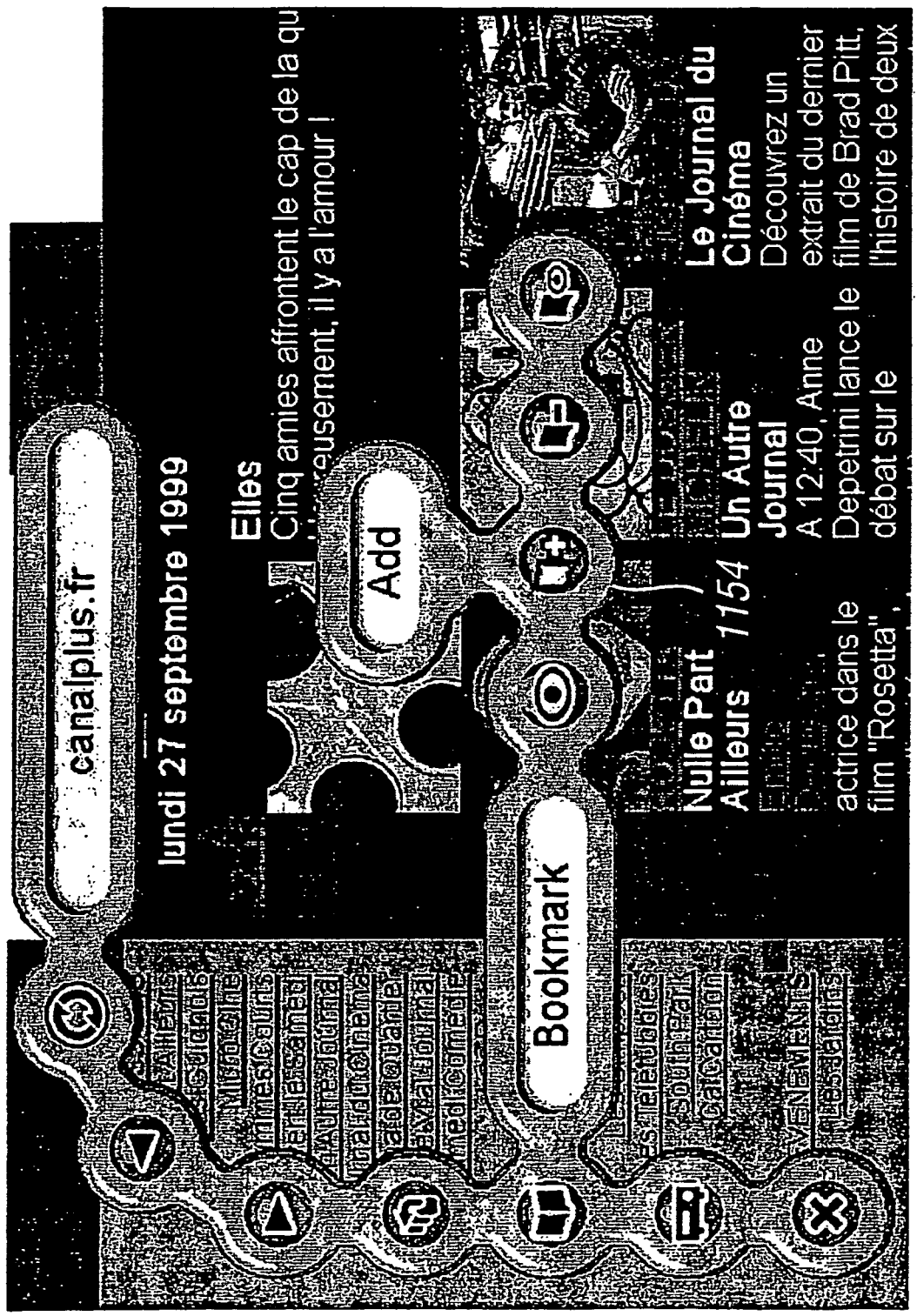
FIG. 17 illustrates a further screen display of the web browser.
Figure 18:
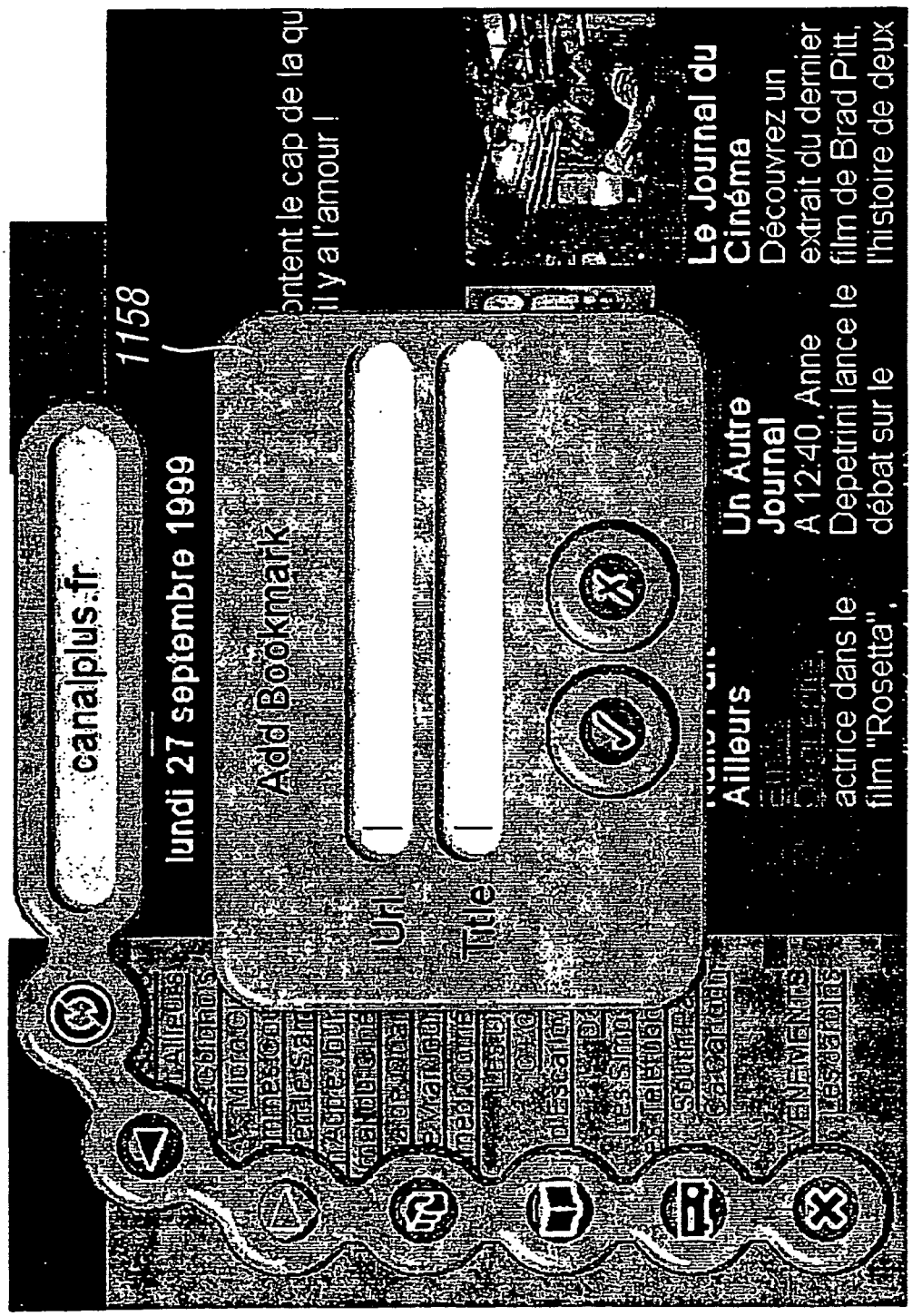
FIG. 18 illustrates a further screen display of the web browser.

In FIG. 17, the ADD button 1154 is highlighted and its tooltip is displayed. If the ADD button is selected, the ADD window is displayed (see FIG. 18). The ADD window 1158 includes two boxes for text entry to enter the URL of the bookmark and its title. Data is entered into the window using the number keys 1181 (for example using the on-screen keyboard described herein). The window also includes OK and CANCEL keys as described above. The user navigates between the text entry boxes and the OK and CANCEL keys using the cursors 1182.

Figure 19:
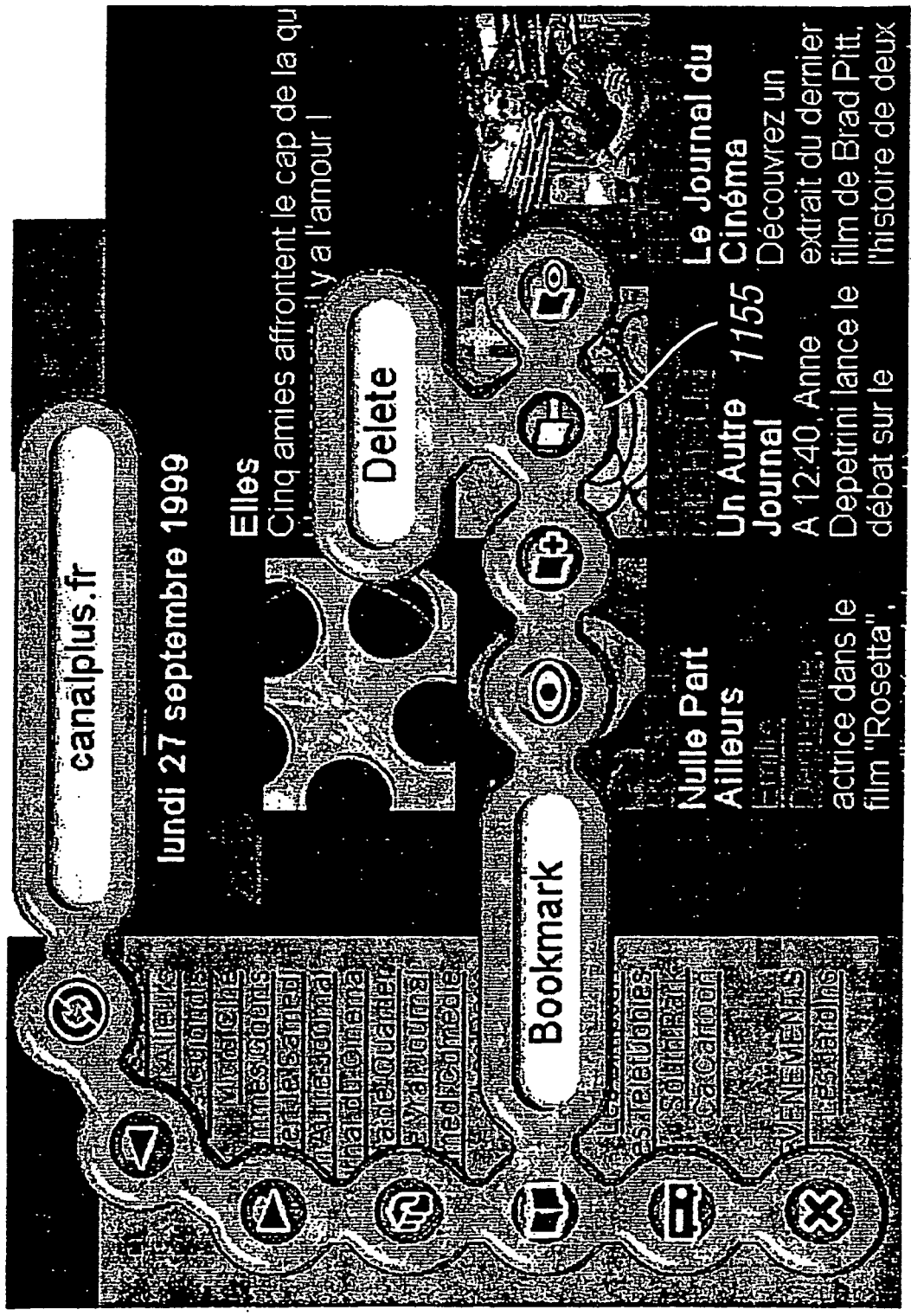
FIG. 19 illustrates a further screen display of the web browser.

FIG. 19 shows the DELETE button 1155 highlighted and its tooltip. By selecting the DELETE button 1155, bookmarks may be deleted.

Figure 20:
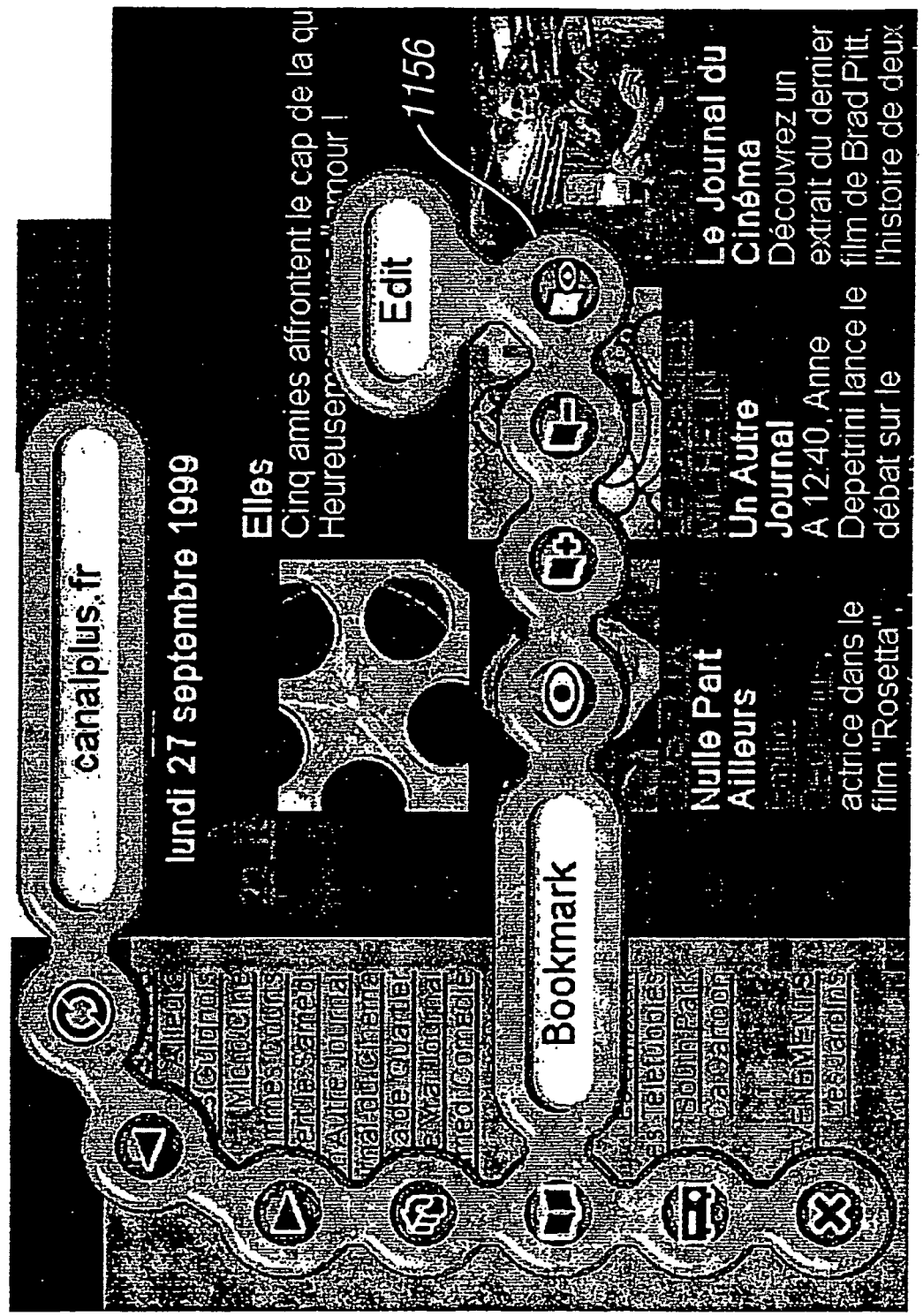
FIG. 20 illustrates a further screen display of the web browser.

FIG. 20 shows the EDIT button 1156 highlighted and its tooltip. By selecting the EDIT button 1156, bookmarks may be edited.

Figure 21:
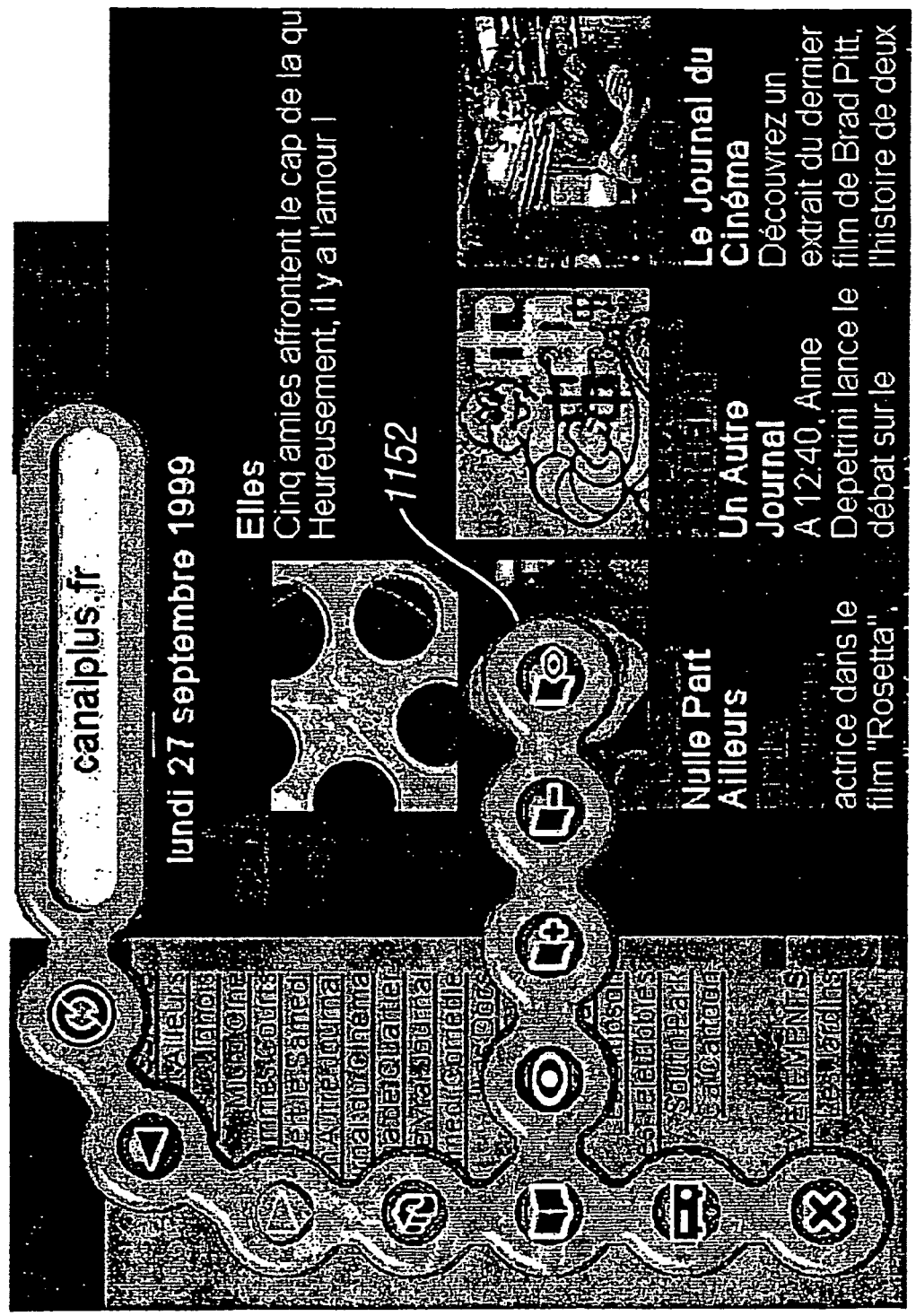
FIG. 21 illustrates a further screen display of the web browser.

FIG. 21 shows an alternate form of the bookmark sub-chain 1152 in which the bookmark tooltip 1151 is not shown. This can save space on the screen, in particular if the sub-chain is long. The appearance of the tooltips is an option which can be selected by the user.

Figure 22:
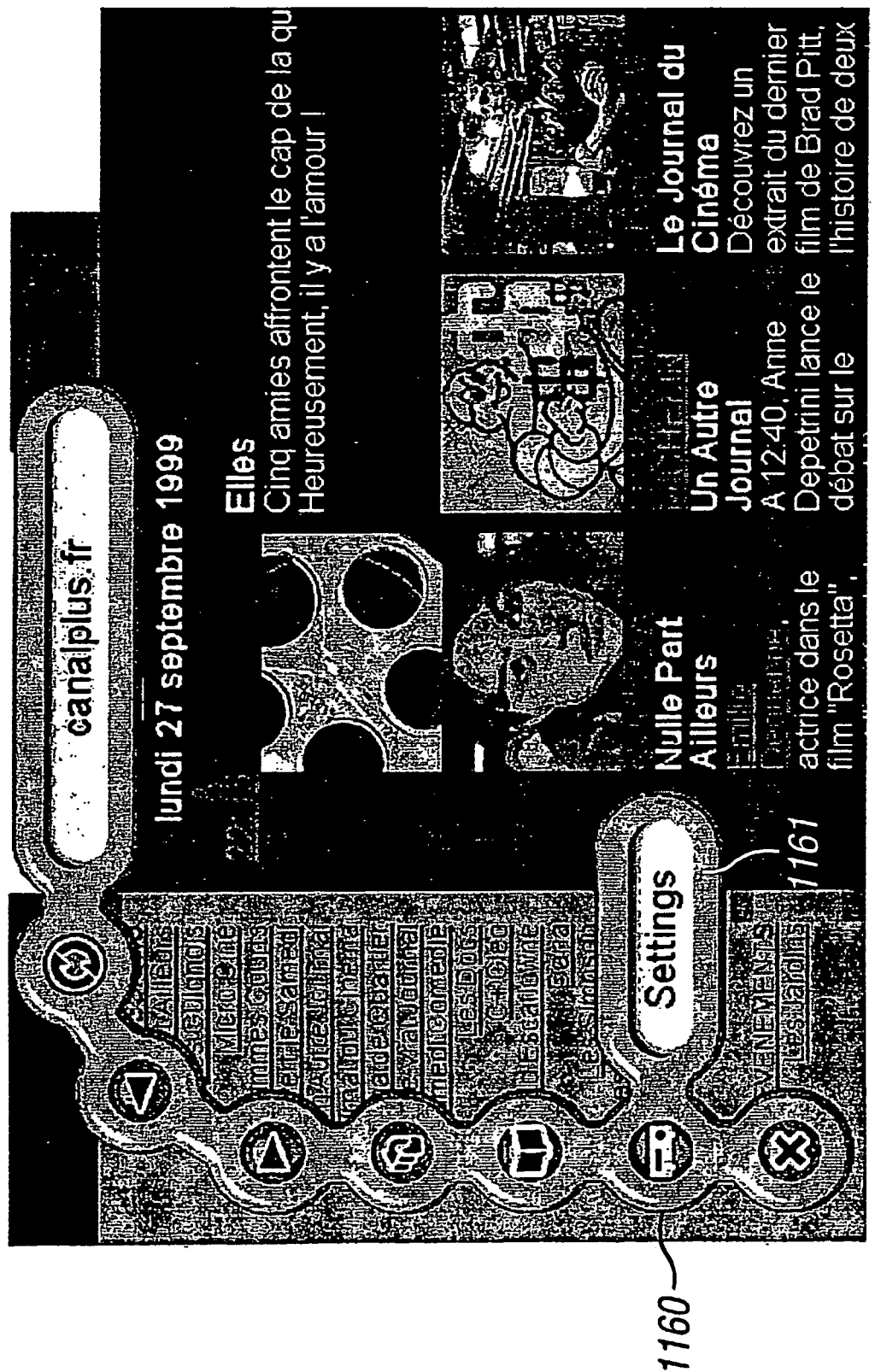
FIG. 22 illustrates a further screen display of the web browser.
Figure 23:
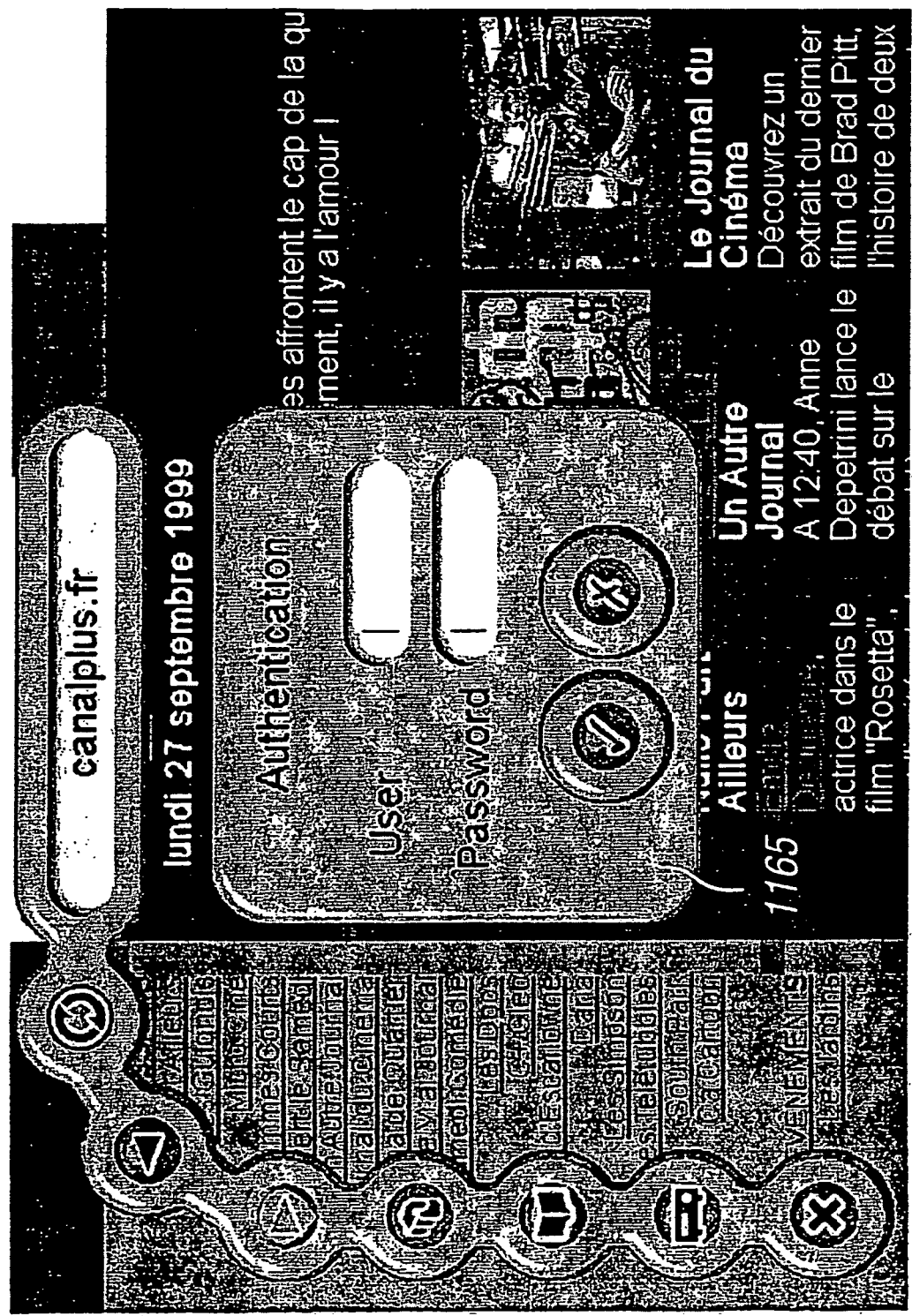
FIG. 23 illustrates a further screen display of the web browser.

FIG. 22 shows the SETTINGS button 1160 highlighted, and its tooltip 1161. When SETTINGS is selected, the authentication window 1165 is displayed (see FIG. 22) prompting the user to identify himself and to give the user password before the settings can be altered. The authentication window 1165 includes two text entry boxes for the entry of the username and password using the number keys 1181 and OK and CANCEL buttons. Once the correct username and password have been entered into the authentication window 1165 and the OK button selected, the settings sub-chain 1162 is displayed, see FIG. 24.

Figure 24:
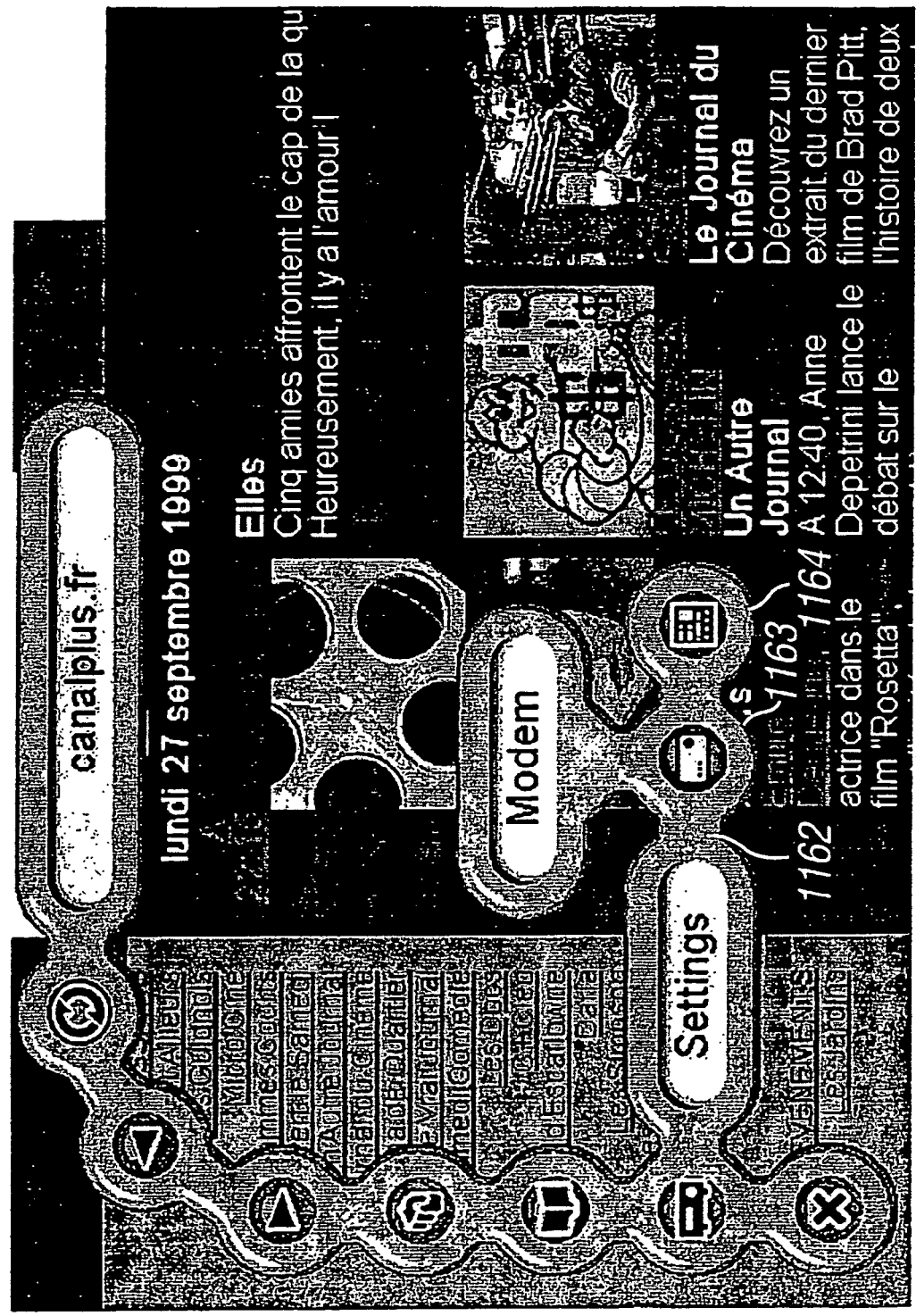
FIG. 24 illustrates a further screen display of the web browser.
Figure 25:
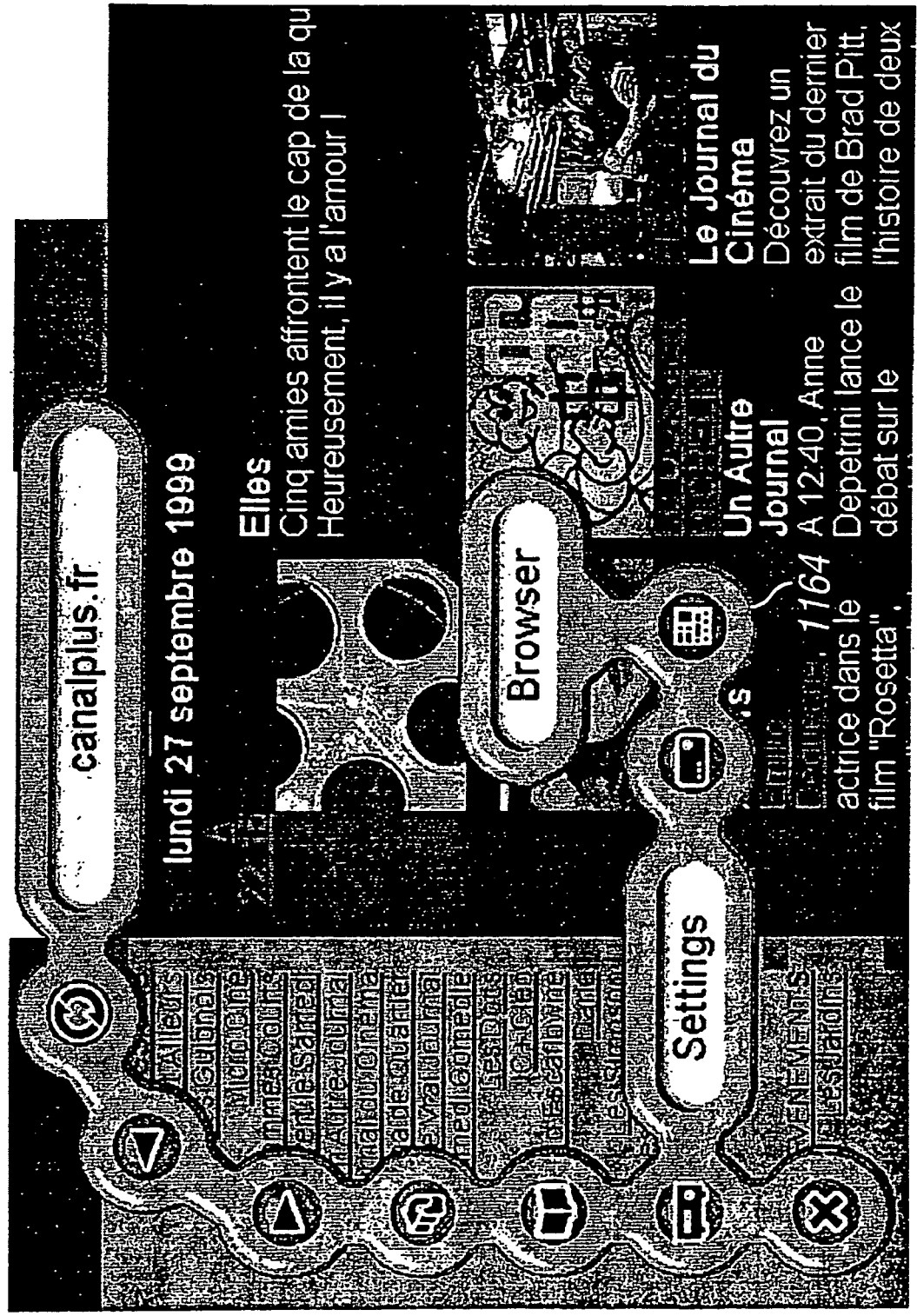
FIG. 25 illustrates a further screen display of the web browser.
Figure 26:
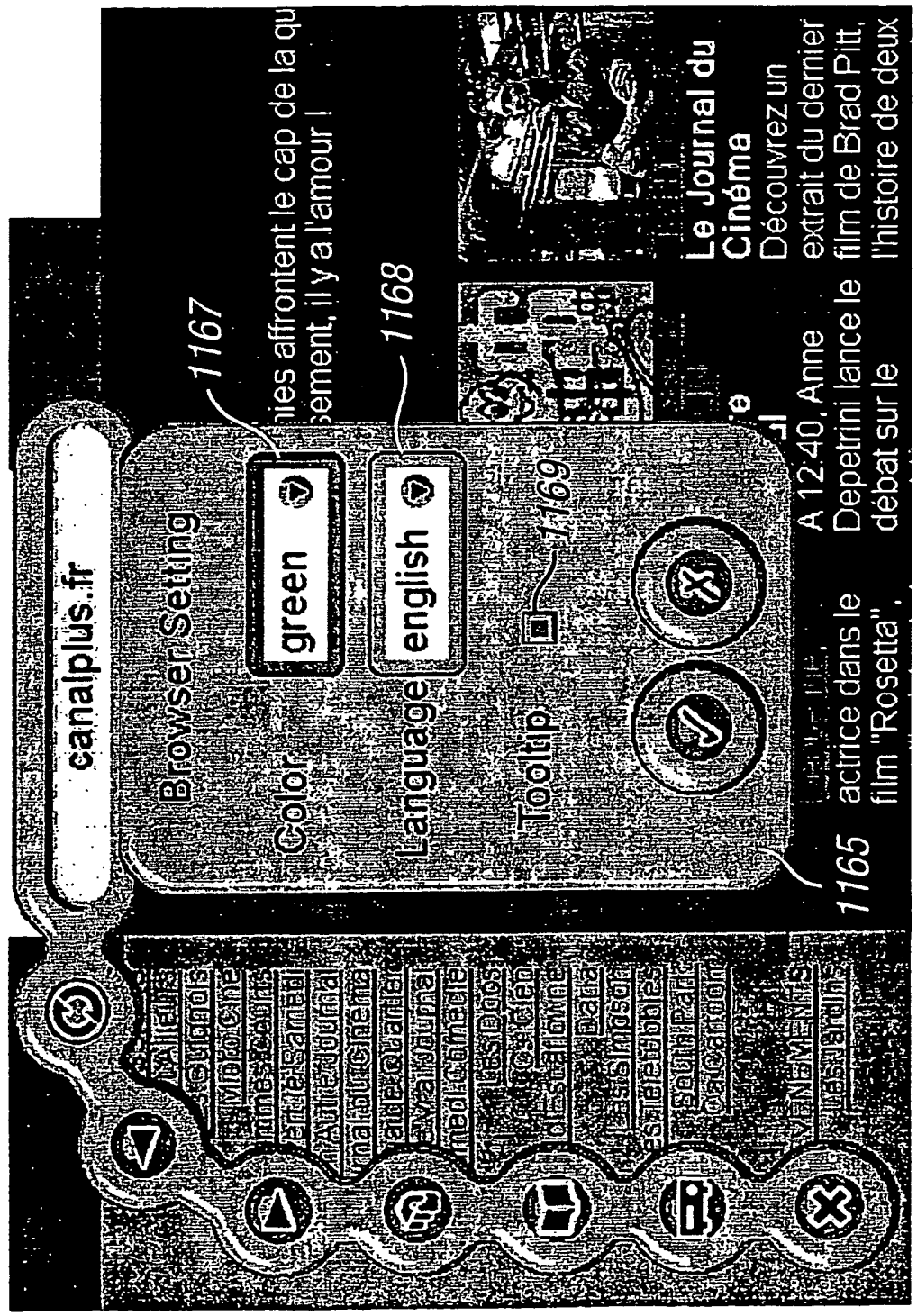
FIG. 26 illustrates a further screen display of the web browser.

The settings sub-chain 1162 includes the MODEM button 1163 and the BROWSER button 1164. FIG. 24 shows the MODEM button 1163 highlighted and its associated tooltip. By selecting the MODEM button 1163, the settings of the modem may be changed. FIG. 25 shows the BROWSER button 1164 highlighted and its associated tooltip. When the BROWSER button 1164 is selected, the browser window 1166 is displayed, see FIG. 26. Again, the user navigates around the objects in the window using the cursor keys 1182. The objects in the browser window include a COLOUR drop-down list 1167. By highlighting the list head and selecting it using the cursor keys 1182, the items of the list appear and the user can move up and down the list and select a new browser colour using the cursors. Similarly, the text language of the browser can be changed using the drop-down list 1168. By moving the highlight to the tooltip select 1169 and pressing the select button 1186, the tooltips can be turned on and off. The window includes, as before, OK and CANCEL buttons.

Figure 27:
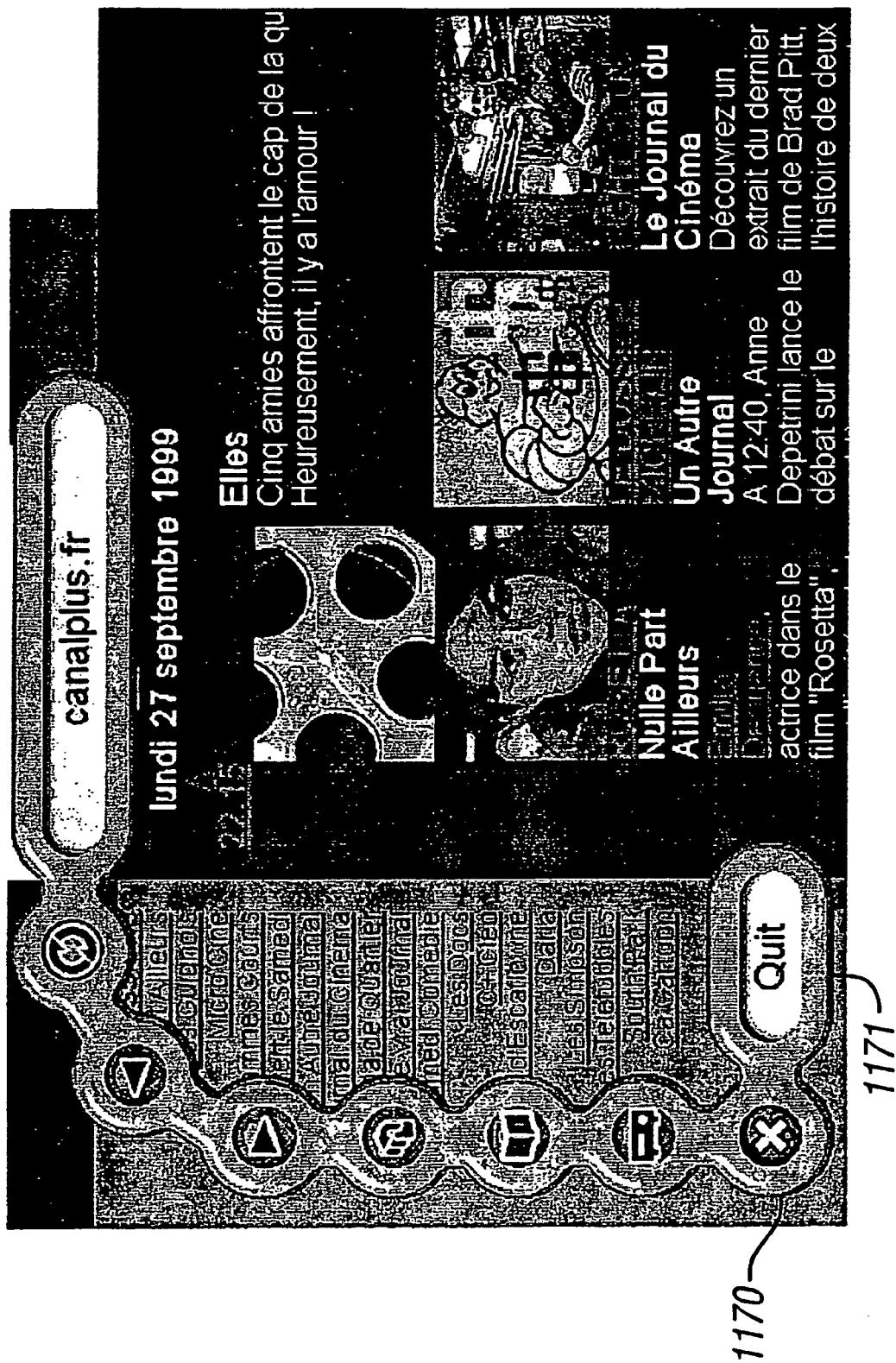
FIG. 27 illustrates a further screen display of the web browser.
Figure 28:
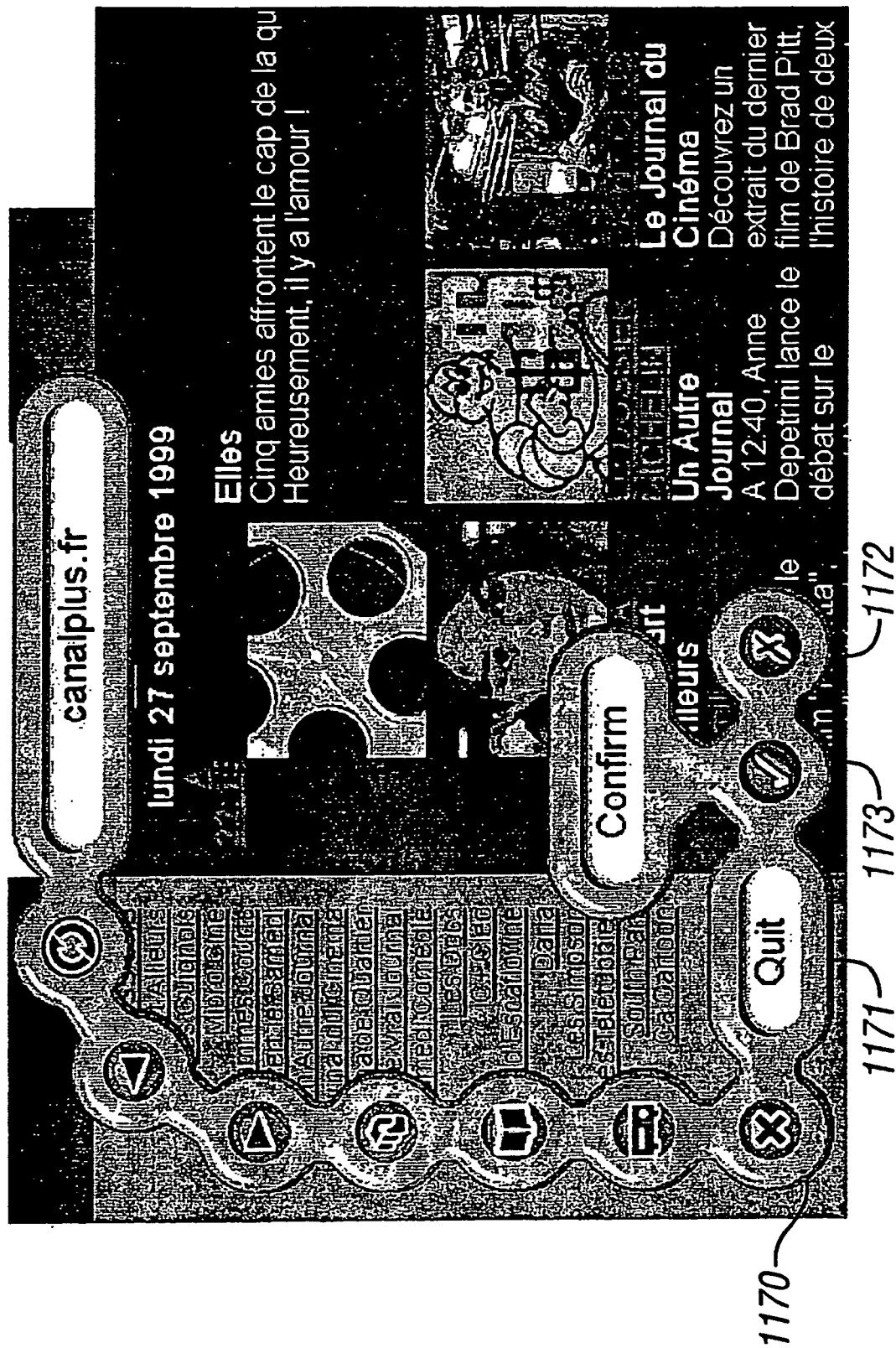
FIG. 28 illustrates a further screen display of the web browser.
Figure 29:
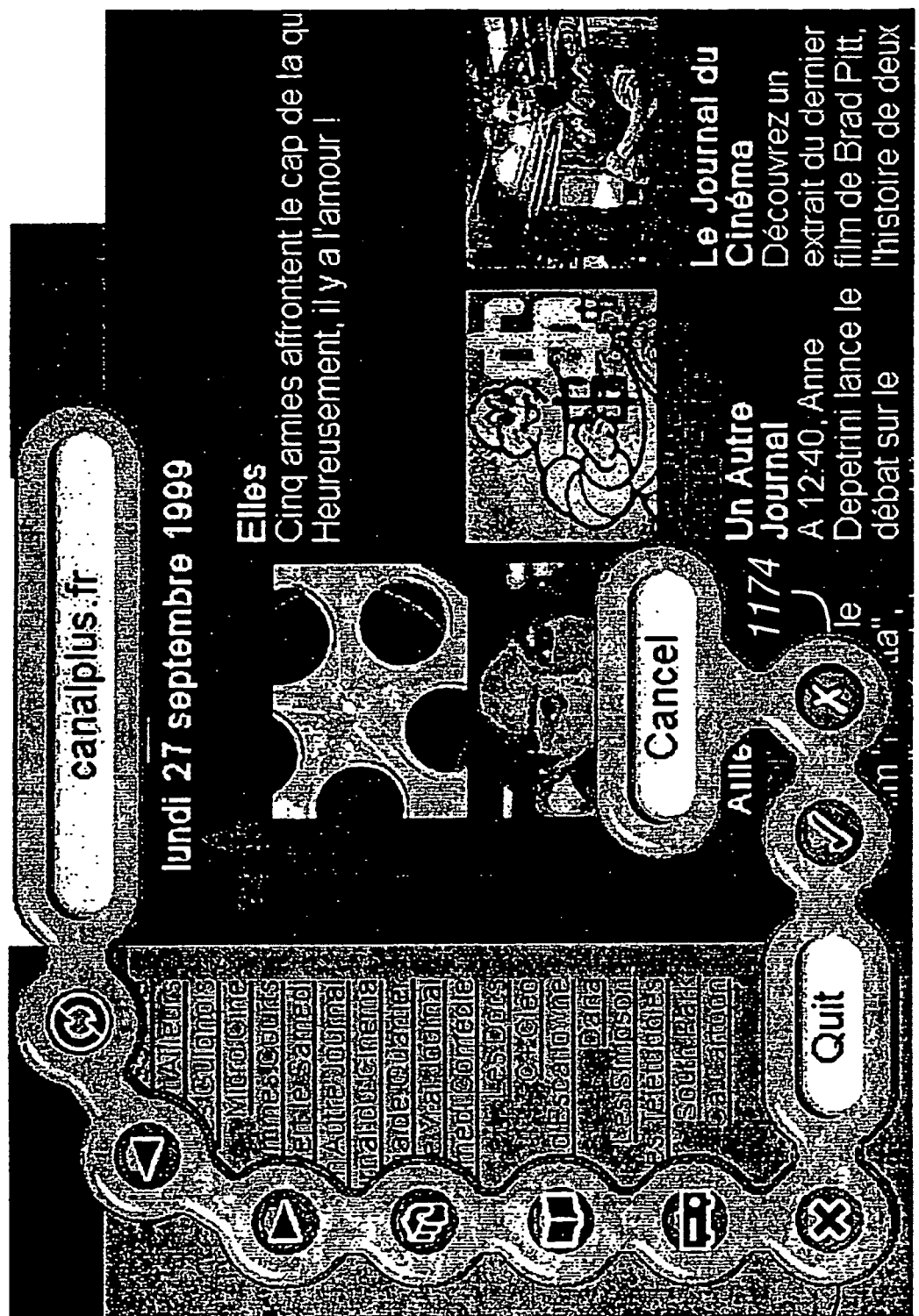
FIG. 29 illustrates a further screen display of the web browser.

FIG. 27 shows the QUIT button 1170 highlighted and its associated tooltip 1171. If the QUIT button 1170 is selected, the quit sub-chain 1172 appears (FIG. 28). In FIG. 28, the CONFIRM button 1173 is highlighted and has its tooltip displayed. If the user wishes to quit the web browser, he selects the CONFIRM button 1173. If the user wants to cancel the quit selection, he selects the CANCEL button 1174 shown highlighted in FIG. 29 with its tooltip.

Alternative designs of the main menu chain 1100 may be used, whereby the shape of the individual buttons and the texture can been changed preferably without changing the overall shape of the chains. The colour may also be changed. These changes can be made available as options in the settings menu, the shape and texture of the chain being changed as a whole to give a coherent design (skin) for the browser.

For example, the buttons might have square, circular, diamond or other shapes, with a texture preferably designed to give a three-dimensional appearance. The appearance of the links between the buttons may be designed to match the appearance of the buttons, or alternatively to complement it. The appearance of the links may also be chosen so as to give the appearance of structural solidity, to enhance the user's perception that the buttons are meaningfully interlinked.

The arc shape of the chain shown in FIGS. 6–30 is chosen by the developer, and is preferably not alterable by the user. Other configurations of the button chain and sub-chains are possible, such as a straight chain or a semi-circular chain. In other embodiments, the button order and configuration of the button chain and sub-chains may be modified by the user.

The receiver/decoder provides internet navigation and email-reading capabilities.

The graphical studio for modelling a navigator is now discussed.

The graphical studio for modelling a navigator is an ensemble or collection of elementary graphical objects. Each graphical object is the pictorial representation on a television screen of one of the functions of the navigator. Each function of the navigator can be represented by a graphical object, or by a sequence of images of a graphical object (an animated image), or a collection of graphical objects (for example, an image in the background of the screen or an image in the background of a dialog box to which other graphical objects can be attached). There are two internal formats for images: MPEG2 and PIXMAP-GRL.

The PNG format is used for elementary graphical objects representing the "navigation system" functionality: load, connect, previous document, next document, exit, etc.

To imprint a non-rectangular image on the graphical plane, it is necessary to use a clipping mask which defines the visible (significant) zones. This mask must be provided by the designer in the form of a bitmap: this mask is not calculated by the program owing to performance constraints.

The two stages for adding a clipping mask are first displaying an image and then, in the graphical plane, filling in a rectangle of the same dimension and position of the image with the transparency colour while applying the clipping mask to render visible the useful part of the image.

The PIXMAP-GRL image format is used for graphical objects representing the navigator resources or the user interface: vertical scrollbar, tables, simple choice, multiple choice, etc.

The PIXMAP type objects are of variable dimension (each graphical object or model is decomposed into simple elementary objects) and colourable (changing colour).

The PIXMAP-GRL image format may be obtained by converting any other graphical formats (such as BMP, JPEG, GIF, PNG, etc.) using well-known methods.

The decomposition of a graphical object into graphical elements is effected according to a matrix (e.g. 3×3, 4×4 or 1×4) which depends on the type of object being displayed.

The palette contains 256 colours. This palette is applied to graphical objects of type PIXMAP and PNG. In a palette, there are two parts. The first part consists of 26 colours which are reserved to facilitate the display and the design of the application. The second part consists of 230 non-modifiable colours which are available for use by applications.

The maximum size of the screen is 720 pixels wide by 576 high. To guarantee the visibility of the screen on every low-end television set, it is necessary to restrict the size to 592 pixels wide and 480 high. To exploit high-end television sets, the user will have the option to adjust the size of the screen. For an internet navigator, sites have in general designed their pages 600 pixels wide and 400 high.

The generic attributes of a graphical object are now discussed in detail.

A graphical object (according to what it represents) has a precise size. The exact size is defined by the designer and serves as a guide for the display.

Each graphical object is resizeable. According to the type of graphical object, it is possible to resize the width and/or height. The method of resizing of a PIXMAP-GRL graphical object follows the recommendations of the decomposition of a graphical object. The method of drawing variable size graphical objects is discussed further later on.

The image of the graphical object on the screen is represented by a multicoloured shape; the background image should have a range of colours if possible (fluid, the effect of modelling clay).

The image of the graphical object does not have to be drawn according to its position (coordinates), or according to the order of the following or preceding object on the screen: the notion of a floating position of the object. Each object is by definition independent of the other objects (except for a background image).

The text is printed by the program according to the chosen language. This implies that no image should contain text. The design of an object is left in the hands of the designer. The general look can follow a particular theme (e.g. Startrek, 007, the Simpsons).

The aspect of focus can be represented by several means: a rectangular focus on the graphical object; a focus highlighting (with another colour) the background of the graphical object, or a focus colouring in the shape of the graphical object.

The normal state (without focus, active, not depressed) is the basic one of the graphical object.

The inhibited state of a graphical object can be represented by several means: the shape of the object in grey (or vignetted); the overlaying of a distinctive prohibitive sign on the graphical object in question; setting the background of the object to monocolour, or making the object invisible.

The depressed state of a graphical object is the graphical representation of an object having the focus following a click on it but before the button is released. This representation can be an inverse display of the object or it can be the same as the focussed state.

With regard to the flip-flop (head to tail) display effect, an image or icon may comprise two visual aspects: one representing the text (the reverse, or 'tails' side of a Euro coin, for example), the other representing a symbol (the face, or 'heads' side). This visual effect is animated by a program running on a timer, a timer is started at the display of a first icon, and as soon as the timer reaches a predetermined value, the change of icon takes place: either a second icon is displayed, or a sequence of icons showing a progressive change is displayed.

The decomposition of a graphical object of PIXMAP-GRL type is now described, with reference to FIGS. 31 to 38. These figures show examples of the elementary graphical objects used in the matrix decomposition method (1201–1209, 1211–1219, etc.), and the corresponding graphical object formed when the elementary objects are combined in the appropriate fashion (1210, 1220, etc.). The figures have been enlarged approximately by a factor of four.

To be able to resize a graphical object (increase or decrease), each graphical object (a design created by the graphic artist) is split into the form of a matrix of graphical elements like the pieces of a puzzle. Each element is then referenced according to the four cardinal corners and the centre (north, south, east, west, centre, north-east, north-west, south-east, south-west, centre of the centre). The width and height of the matrix depends on the type of object.

Certain graphical elements (pieces of the puzzle) are printed only once (the corners). To make the object wider or taller, certain elements are printed in a repetitive fashion (n times the width or height of the element, respectively).

Graphical objects which are formed by, or form part of, the matrix decomposition (or tiling) method are now listed. These graphical objects are drawn in the HTML document area.

Button with/without text in the active state (1210): 3×3 matrix (1201–1209); size of elements: 4 pixels wide and high; elements to resize the width: north-centre (1202), centre (1205), south-centre (1208); elements to resize the height: west-centre (1204), centre (1205), east-centre (1206).

Button with/without text in the active, depressed state (1220): 3×3 matrix (1211–1219); size of elements: 4 pixels wide and high; elements to resize the width: north-centre (1212), centre (1215), south-centre (1218); elements to resize the height: west-centre (1214), centre (1215), east-centre (1216).

Button with/without text in the inactive, greyed state (1230): 3×3 matrix (1221–1229); size of elements: 4 pixels wide and high; elements to resize the width: north-centre (1222), centre (1225), south-centre (1228); elements to resize the height: west-centre (1224), centre (1225), east-centre (1226).

'Check box', shown with/without focus, and crossed/uncrossed (FIG. 34): 1×1 matrix; size of elements: 16 pixels wide and high; elements to resize the width: none; elements to resize the height: none.

List of options, for single or multiple selection (1252, 1253, 1254): 3×3 matrix (1241–1249); size of elements: 4 pixels wide and high; elements to resize the width: north-centre (1242), centre (1245), south-centre (1248); elements to resize the height: west-centre (1244), centre (1245), east-centre (1246); can comprise an up (1250) and/or down indicator (1251); position: x,y origin+width and height of the up indicator.

Up indicator (1250): 1×1 matrix; size of elements: 16 pixels wide and 8 pixels high; elements to resize the width: none; elements to resize the height: none; position: y origin, centred on the width Down indicator (1251): 1×1 matrix; size of elements: 16 pixels wide and 8 pixels high; elements to resize the width: none; elements to resize the height: none; position: y origin+height of up indicator+height of list, centred on the width.

Table (for drawing forms) (1260): 3×3 matrix (1270); size of elements: 2 pixels wide and high; elements to resize the width: north-centre, centre, south-centre; elements to resize the height: west-centre, centre, east-centre; can comprise a cell.

Cell (for drawing an entry in a form) (1280): 3×3 matrix (1290); size of elements: 2 pixels wide and high; elements to resize the width: north-centre, centre, south-centre; elements to resize the height: west-centre, centre, east-centre; can comprise text or an image; position: x,y origin+thickness of the table border.

Text with frame (TextArea) (1300): 3×3 matrix (1310); size of elements: 2 pixels wide and high; elements to resize the width: north-centre, centre, south-centre; elements to resize the height: west-centre, centre, east-centre; can comprise text.

Frame (1320): 3×3 matrix (325); size of elements: 4 pixels wide and high; elements to resize the width: north-centre, centre, south-centre; elements to resize the height: west-centre, centre, east-centre Vertical scrollbar (1330): 1×3 matrix; size of elements: 8 pixels wide and high; elements to resize the width: none; elements to resize the height: centre; attached to the frame (depending on the position of the frame object); comprises the indicator graphical object of the index relative to the height.

Horizontal scrollbar (1340): 3×1 matrix; size of elements: 8 pixels wide and high; elements to resize the width: centre; elements to resize the height: none; attached to the frame (depending on the position of the frame object); comprises the indicator graphical object of the index relative to the width.

Horizontal line: 1×1 matrix; size of elements: 4 pixels wide and high.

Vertical line: 1×1 matrix; size of elements: 4 pixels wide and high.

A summary of all of the graphical objects in the web browser interface and their associated functions is now given.

What follows is a non-exhaustive list of the graphical objects which are necessary for the construction of a navigator model in the decoder. The table given here lists the objects element-by-element and the list of objects composed of several graphical elements.

| Elementary graphical object | Functionality | Type | Comments |
|---|---|---|---|
| BTN_Connecter | Connect/disconnect the modem line | Clickable PNG image | Initiates the modem connection with the defined profile information |
| BTN_Déconnecter | Connect/disconnect the modem line | Clickable PNG image | Disconnects the modem |
| BTN_Information_Profil | Access to the authentication information for the connection profile | Clickable PNG image | Displays a dialog box for configuring the subscriber profile: login, password and telephone number |
| BTN_Information_Serveur | Rapid access to the proxy server information | Clickable PNG image | Displays a dialog box for configuring the parameters of the proxy servers |
| BTN_Configuration_navigateur | Rapid access to the navigator options | Clickable PNG image | Displays a dialog box for configuring the navigator options |
| BTN_Accés_Email | Rapid access to the email application | Clickable PNG image | Starts the email client |
| BTN_Document_Précédent | Previous page | Clickable PNG image | Displays the immediately preceding HTML page |
| BTN_Document_Suivant | Next page | Clickable PNG image | Displays the immediately following HTML page |
| BTN_Stop_Chargement | Stop the current document loading | Clickable PNG image | Stops the current document from loading |
| BTN_Annuaire | Rapid access to bookmarks | Clickable PNG image | Displays a dialog box containing the bookmark list |
| BTN_Quitter | Leaves the application and returns to TV | Clickable PNG image | Leaves the application |
| BTN_Saisie_Adresse | Rapid access to the selection of a link | Clickable PNG image | Opens the dialog box from which one can access a site address (URL) or from which one selects an established URL |
| IMG_Logo_Navigateur | Logo | Clickable PNG image | Circular sequence of images to display the current loading activity |
| IMG_Logo_Opérateur | Logo | Clickable PNG image | |
| IMG_Diode | Status or activity indicator | Non-clickable PNG image | Coloured diodes (LEDs): red, green, blue, black, yellow |

-continued

| Elementary graphical object | Functionality | Type | Comments |
| --- | --- | --- | --- |
| BTN_Fléche_haut | Move up one row | Clickable and non-clickable PNG image | Clickable images indicating: depressed state, non-depressed state and inhibited state<br>Non-clickable images indicating: inhibited and normal status |
| BTN_Fléche_bas | Move down one row | Clickable and non-clickable PNG image | Clickable images indicating: depressed state, non-depressed state and inhibited state<br>Non-clickable images indicating: inhibited and normal status |
| BTN_Fléche_droite | Move cursor forward | Clickable and non-clickable PNG image | Clickable images indicating: depressed state, non-depressed state and inhibited state<br>Non-clickable images indicating: inhibited and normal status |
| BTN_Fleche_gauche | Move cursor backward | Clickable and non-clickable PNG image | 3 clickable images: depressed state, non-depressed state and inhibited state<br>2 non-clickable images: inhibited and normal status |
| BTN_Page_haut | Move cursor up several rows (half a page or previous page) | Clickable and non-clickable PNG image | 3 clickable images: depressed state, non-depressed state and inhibited state<br>2 non-clickable images: inhibited and normal status |
| BTN_Page_bas | Move cursor down several rows (half a page or following page) | Clickable and non-clickable PNG image | 3 clickable images: depressed state, non-depressed state and inhibited state<br>2 non-clickable images: inhibited and normal status |
| BTN_Frame_Suivante | Go to next frame | Clickable PNG image | 3 clickable images: depressed state, non-depressed state and inhibited state.<br>This image is visible if there is a frame following; otherwise the image is not displayed to avoid overloading the screen |
| BTN_Frame_Précédente | Go to previous frame | Clickable PNG image | 3 clickable images: depressed state, non-depressed state and inhibited state.<br>This image is visible if there is a frame following; otherwise the image is not displayed to avoid overloading the screen |
| BTN_Choix_Croix | Indicator of whether an option within a list is checked or not | Clickable and non-editable PNG image | Like a box for insertion of a cross. Multiple choice possible. Hence there are 2 images: checked and non-checked |
| BTN_Choix_Simple | Indicator of whether an option within a list is checked or not | Clickable and non-editable PNG image | Like a box for insertion of a cross. Only one choice from a list. Hence there are 2 images: checked and non-checked |
| BTN_Ok | Validates a question or information | Clickable and non-editable PNG image | Generic validation image (without text). To be used in a dialog box. . . |
| BTN_Annuler | Deletes a question or information | Clickable and non-editable PNG image | Generic deletion image (without text). To be used in a dialog box. . . |
| BTN_Oui | Positive answer to a question | Clickable and non-editable PNG image | Generic validation image (without text). To be used in a dialog box. . . |
| BTN_Non | Negative answer to a question | Clickable and non-editable PNG image | Generic negation image (without text). To be used in a dialog box. . . |
| IMG_Curseur_Normal_Souris | Pointer/graphics cursor | Normal graphics cursor indicator image | Like an arrow with a hotspot |
| IMG_Curseur_Attente_Souris | Pointer in busy mode | Busy indicator | Like an egg timer or chronometer |
| IMG_Curseur_Texte | Position of the graphics cursor in a text during access | Indicator | |

-continued

| Elementary graphical object | Functionality | Type | Comments |
|---|---|---|---|
| IMG_Statusline | Display of a text in one row of 4/5 of the size of the screen | Background image for displaying non-editable text | Image without text. The text will be displayed in truncated format. The text has no more than 40 characters |
| IMG_Indéfinie | Generic display of an image not yet loaded | Clickable and non-clickable image | Image representing an image in an HTML document which has not yet been loaded into the memory, or whose loading was interrupted |
| BDG_Login_Password | Generic dialog box for displaying or entering the login and the password for accessing a secure site | Screen background image with graphic border | Background image delimiting an area of informational text, login field or password field. This dialog box is required to access a secure site. The program masks the password |
| BDG_Information_Profil | Generic dialog box for displaying or entering the login, password and telephone number of a distance access server. | Screen background image with graphic border | Background image delimiting an area of informational text, login field, password field or telephone number field. This dialog box is required before dialling the access server. The program masks the password, and confirmation of the password will be requested. |
| BDG_Confirmation_Password | For confirming the entry of a password. | Dialog box having a background image with graphic border | Background image delimiting an area of informational text and a password field. This dialog box is required when the user modifies or enters a new password. The program masks the password |
| IMG_Telecommande_filigrane | Filigree (outline of the keys) of the remote control for advanced entry using the virtual keyboard | Outline | The outline of the remote control is overlaid on the image of the virtual keyboard to make the keys of the remote control correspond visually to the layout of keys of the virtual keyboard. Rapid access by visual memory and not by documentary memory. The outline of the remote control keys does not consist of any letters or symbols. |
| BKG_Clavier_virtuel | Virtual keyboard for advanced entry using a remote control | Background image of a keyboard | The virtual keyboard is represented on the screen like that of a PC but without displaying letters or figures on the keys. Putting letters on each key is handled by the program: this allows the definition of a generic international language keyboard (azerty, qwerty or others). The outline image of the remote control is overlaid on the keyboard and follows the focus: this achieves the aim of showing visually that pressing a remote control button corresponds to a key press on the keyboard without having to memorize the translation in advance. The ESCape key dismisses the virtual keyboard. Certain keys serve as function keys: "http://www", ".fr", ".com", ".org", etc., and others have certain functions: "Enter", "Backspace", "Del", etc. |
| BKG_Toolbar_Navigation | Displayed in the toolbar background | Background image | |
| BKG_Toolbar_Systeme_Configuration | Displayed in the toolbar background | Background image | |
| BKG_Annuaire | Displayed in the background of the bookmark dialog box | Background image | |

-continued

| Elementary graphical object | Functionality | Type | Comments |
| --- | --- | --- | --- |
| BKG_Information_Profil | Displayed in the background of the subscriber profile configuration dialog box | Background image | |
| BKG_Information_Serveur | Displayed in the background of the proxy server configuration dialog box | | |

The following table describes the different elementary graphical objects which form a graphic object which can have a variable size in the graphical representation. The juxtaposition of elementary objects to make a complex object is effected by the program (reconstituting the puzzle). These objects are of PIXMAP format.

| Elementary graphical object | Functionality | Type | Comments |
| --- | --- | --- | --- |
| TBL_Vertical_Gauche | To represent the border of a variable size table | Image | To draw a border on a table of variable size. This object represents a vertical stretch of the left side of the border |
| TBL_Vertical_Droite | To represent the border of a table | Image | To draw a border on a table of variable size. This object represents a vertical stretch of the right side of the border |
| TBL_Horizontal_Haut | To represent the border of a table | Image | To draw a border on a table of variable size. This object represents a horizontal stretch of the top side of the border |
| TBL_Horizontal_Bas | To represent the border of a table | Image | To draw a border on a table of variable size. This object represents a horizontal stretch of the bottom side of the border |
| TBL_Angle_Haut_Gauche | To represent the corner of the border of a table | Image | To draw the top left corner of a table border. |
| TBL_Angle_Haut_Droite | To represent the corner of the border of a table | Image | To draw the top right corner of a table border. |
| TBL_Angle_Bas_Gauche | To represent the corner of the border of a table | Image | To draw the bottom left corner of a table border. |
| TBL_Angle_Bas_Droite | To represent the corner of the border of a table | Image | To draw the bottom right corner of a table border. |
| CEL_Vertical_Gauche | To represent the border of a cell | Image | To draw the border of a cell. This object represents a vertical stretch of the left side of the border. A cell is one compartment in a table. . . The thickness of a cell border should be smaller than that of the table |
| CEL_Vertical_Droite | To represent the border of a cell | Image | To draw the border of a cell. This object represents a vertical stretch of the right side of the border. |
| CEL_Horizontal_Haut | To represent the border of a cell | Image | To draw the border of a cell. This object represents a horizontal stretch of the top side of the border. |
| CEL_Horizontal_Bas | To represent the border of a cell | Image | To draw the border of a cell. This object represents a horizontal stretch of the bottom side of the border. |
| CEL_Image | To represent the border of a non-loaded image in a cell | Generic image | Generic image representing the placement of a non-loaded image in a cell |

-continued

| Elementary graphical object | Functionality | Type | Comments |
| --- | --- | --- | --- |
| BDG_Vertical_Gauche | To represent the border of a dialog box | Generic image | To draw the border of a variable-size dialog box. This object represents a vertical stretch of the left side of the border. |
| BDG_Vertical_Droite | To represent the border of a dialog box | Generic image | To draw the border of a variable-size dialog box. This object represents a vertical stretch of the right side of the border. |
| BDG_Horizontal_Haut | To represent the border of a dialog box | Generic image | To draw the border of a variable-size dialog box. This object represents a horizontal stretch of the top side of the border. |
| BDG_Horizontal_Bas | To represent the border of a dialog box | Generic image | To draw the border of a variable-size dialog box. This object represents a horizontal stretch of the bottom side of the border. |
| BDG_Angle_Haut_Gauche | To represent the border of a dialog box | Generic image | To draw the top left corner of the border of a variable size dialog box. |
| BDG_Angle_Haut_Droite | To represent the border of a dialog box | Generic image | To draw the top right corner of the border of a variable size dialog box. |
| BDG_Angle_Bas_Gauche | To represent the border of a dialog box | Generic image | To draw the bottom left corner of the border of a variable size dialog box. |
| BDG_Angle_Bas_Droite | To represent the border of a dialog box | Generic image | To draw the bottom right corner of the border of a variable size dialog box. |
| LST_Vertical_Gauche | To represent the border of a vertical list of selectable options | Image | To draw the border of a variable size vertical list. This object represents a vertical stretch of the left side of the border. |
| LST_Vertical_Droite | To represent the border of a vertical list of selectable options | Image | To draw the border of a variable size vertical list. This object represents a vertical stretch of the right side of the border. |
| LST_Bas_Gauche | To represent the border of a vertical options | Image | To draw the border of a variable size vertical list. This object represents a horizontal stretch of the top side of the border. |
| LST_Bas_Droite | To represent the border of a vertical list of selectable options | Image | To draw the border of a variable size vertical list. This object represents a horizontal stretch of the bottom side of the border. |
| LST_Angle_Haut_Gauche | To represent the corner of the border of a variable size vertical list of selectable options | Image | To draw the top left corner of the border of a variable size vertical list. |
| LST_Angle_Haut_Droite | To represent the corner of the border of a variable size vertical list of selectable options | Image | To draw the top right corner of the border of a variable size vertical list. |
| LST_Angle_Bas_Gauche | To represent the corner of the border of a variable size vertical list of selectable options | Image | To draw the bottom left corner of the border of a variable size vertical list. |
| LST_Angle_Bas_Droite | To represent the corner of the border of a variable size vertical list of selectable options | Image | To draw the bottom right corner of the border of a variable size vertical list. |
| ASC_Haut | To represent a vertical scroll bar ('elevator') | Clickable and non-clickable image | To draw the top end of a vertical scroll bar ('elevator') |

-continued

| Elementary graphical object | Functionality | Type | Comments |
| --- | --- | --- | --- |
| ASC_Bas | To represent a vertical scroll bar | Clickable and non-clickable image | To draw the bottom end of a vertical scroll bar |
| ASC_Cage | To represent a vertical scroll bar | Clickable and non-clickable image | To draw one step ('floor') of a vertical scroll bar |
| ASC_Ascenseur | To represent a vertical scroll bar | Clickable and non-clickable image | To indicate the position of the vertical scroll bar |
| SCR_Gauche | To represent a horizontal scroll bar | Clickable and non-clickable image | To draw the left end of a horizontal scroll bar of a window, text area, frame, etc. |
| SCR_Droite | To represent a horizontal scroll bar | Clickable and non-clickable image | To draw the right end of a horizontal scroll bar of a window, text area, frame, etc. |
| SCR_Cage | To represent a horizontal scroll bar | Clickable and non-clickable image | To draw one compartment (step) of a horizontal scroll bar of a window, text area, frame, etc. |
| SCR_Position | To represent a horizontal scroll bar | Clickable and non-clickable image | To indicate the position of the cursor in the horizontal scroll bar of a window, text area, frame, etc. |
| IMG_Texte_Gauche | To represent a line of text to display | Non-clickable image | This is the image at the left side of the non-editable displayed text. The chosen size must match that of the chosen character set |
| IMG_Texte_Droite | To represent a line of text to display | Non-clickable image | This is the image at the right side of the non-editable displayed text. The chosen size must match that of the chosen character set |
| IMG_Texte_Caractere | To represent a line of text to display | Non-clickable image | This is the background image on which a non-editable character is printed. The chosen size must match that of the chosen character set, |
| IMG_Edition_Gauche | To represent a line of text to edit | Editable and clickable image | This is the image at the left side of an editable or selectable text zone. The chosen size must match that of the chosen character set. |
| IMG_Edition_Droite | To represent a line of text to edit | Editable and clickable image | This is the image at the right side of an editable or selectable text zone. The chosen size must match that of the chosen character set. |
| IMG_Edition_Caractere | To represent a line of text to edit | Editable and clickable image | This is the background image on which a character of an editable or selectable text zone is printed. The chosen size must match that of the chosen character set. |
| IMG_Multi_Edition_Gauche | To represent the editing of multi-line text | Editable and clickable image | This is the image at the left side of an editable or selectable text zone. The chosen size must match that of the chosen character set. |
| IMG_Multi_Edition_Droite | To represent the editing of multi-line text | Editable and clickable image | This is the image at the right side of an editable or selectable text zone. The chosen size must match that of the chosen character set. |
| IMG_Multi_Edition_Caractere | To represent the editing of multi-line text | Editable and clickable image | This is the background image on which a character of an editable or selectable text zone is printed. The chosen size must match that of the chosen character set. |

Navigator Functions

| Function | Description | Activated by | Graphical Objects | Comments |
|---|---|---|---|---|
| Connect/ disconnect | Initiate the modem connection with the defined profile/ disconnect the modem | BTN_Connecter BTN_Déconnecter | | Start the modem connection if it is off-line, if the connection profile information is filled in, if a URL is clicked. |
| Configure- modify the authen- tification information of the connection profile | Displays a dialog box to configure the subscriber profile: login, password, telephone | BTN_Information_ Profil | BDG_Information_ Profil | Enter, modify, validate, store in flash memory the login, password and telephone number of the access server Cancel the access |
| Confirm the entry of a password | Request the password to be re-entered | After a password has been changed | BDG_Confir- mation_Password | Enter, validate, cancel Each entered character is replaced by a masking character (asterisk) when printed Compare the entry with the modified password |
| Print or enter the login and password to access a secure site | Request authen- tification from the remote site | Following an attempt to access a secure site | BDG_Login_ Password | Enter, validate, cancel, sending information to the site Each character of the password is replaced by a masking character (asterisk) when printed |
| Managing a virtual keyboard | Virtual keyboard for advance entry with a remote control | When the focus is on an editable object | BKG_Clavier_ Virtuel IMG_Tele- commande_filigrane | The virtual keyboard is represented on the screen like that of a PC but without displaying letters or figures on the keys. Putting letters on each key is handled by the program: this allows the definition of a generic international language keyboard (azerty, qwerty or others). The outline image of the remote control is overlaid on the keyboard and follows the focus: this achieves the aim of showing visually that pressing a remote control button corresponds to a key press on the keyboard without having to memorize the translation in advance. The ESCape key dismisses the virtual keyboard. Certain keys serve as function keys: "http://www",".fr",".com", ".org", etc., and others have certain functions: "Enter", "Backspace","Del", etc. |

The Java API for the web browser is now described.

There follows the list of the JAVA packages which are used at the level of the navigator application in the decoder. This list is divided into two parts: the AWT (Abstract Window Toolkit) classes of the JDK 1.1 and the JAVA interface classes of the different services written in native C code.

| Classes | Methods |
|---|---|
| java.awt.Choice | Add(String) GetItemCount( ) |
| java.awt.Component | GetSelectedIndex( ) Remove(String) SetSelectedIndex(int) AddKeyListener(KeyListener) AddFocusListener(FocusListener) AddMouseListener(MouseListener) Contains(int,int) enableEvents(long) getLocation( ) getSize( ) setBackground(Color) |

| Classes | Methods |
|---|---|
| | setBackground(ImageMask) |
| | setBackground(int) |
| | setLocation(int) |
| | setSize(int,int) |
| java.awt.Graphics | drawImage |
| | getSize |
| | setLocation |
| java.awt.Image | createImage(String) |
| | getHeight( ) |
| | getWidth( ) |
| java.awt.ImageMask extends java.awt.Image | setMask(bitmap) |
| java.awt.List | List(int) |
| | add(String) |
| | getItem(num) |
| | getItemCount( ) |
| | getSelectedItem( ) |
| | remove(String) |
| | replace( ) |
| | setMultipleMode(boolean) |
| java.awt.Panel | setLayout(layout) |
| java.awt.Point | |
| java.awt.Toolkit | loadLut(String) |
| | getDefaultToolkit( ) |
| java.awt.TextField | addActionListener(ActionListener) |
| | setEchoChar(char) |
| | setSecretMode( ) |
| java.awt.Window | setModal(boolean) |
| java.awt.event.FocusEvent | |
| java.awt.event.FocusListener (interface) | void focusGained(FocusEvent) |
| | void focusLost(FocusEvent) |
| java.awt.event.KeyEvent | |
| java.awt.event.KeyListener(interface) | void keyPressed(KeyEvent) |
| | void keyReleased(KeyEvent) |
| | void keyTyped(KeyEvent) |
| java.awt.event.MouseEvent | |
| java.awt.event.MouseListener (interface) | void mouseClicked(MouseEvent) |
| | void mouseEntered(MouseEvent) |
| | void mouseExited(MouseEvent) |
| | void mousePressed(MouseEvent) |
| | void mouseReleased(MouseEvent) |

The navigator package, called the browser package, groups together different packages: the browser.drawer package, which offers services allowing an HTML document to be fetched, and navigation within the document browser; and the mediawebtv package, which allows the establishment of an internet connection with the users authentification.

The structure of the browser.drawer.MhwBookmark class is now described.

A bookmark list is associated with a user. There is no hierarchy within the bookmark list.

Constructor: MhwBookmark(subscriberId): opens an existing bookmark list

Constructor: MhwBookmark(subscriberId): creates a new bookmark list deleteBookmark( ): destroys a bookmark list add (URL, name): adds an entry remove (itemNumber): deletes an entry modify (itemNumber, URL, name): modifies an existing entry getList ( ): returns a list of the entries in the bookmark list (no hierarchy)

getItemCount ( ): returns the number of entries in the bookmark list is Full ( ): boolean—list is full?

is Empty ( ): boolean—list is empty?

setHomePage (itemNumber)

getHomePage ( ): itemNumber goToURL (sessionNumber): loads the document corresponding to the selected entry In the event of failure, an error message is returned by the methods add( ), remove( ), modify( ), getList( ), setHomePage( ) (or an event if the occurrence is asynchronous).

The browser.drawer.MhwHistory class permits the navigation from one document to another within a list of previously displayed documents. There is no hierarchy in the history list. The details of the class are now given.

Constructor: MhwHistory (sessionNumber)

getList ( ): returns the history list (no hierarchy)

getCurrent ( ): gets the current URL setCurrent(indexNumber): change the current URL getNext ( ): gets the URL of the next entry getPrevious ( ): gets the URL of the previous entry getItemCount ( ): returns the number of entries in the history addEventsRegister ( ): subscribes to the error events of the history list removeEventsRegister ( )

In the event of failure, an error message is returned by the methods getList( ), getNext( ), getPrevious( ), setCurrent( ) (or an event if the occurrence is asynchronous).

The events are: addEventsRegister(sessionNumber): [subscribes to the history list error events]; and removeEventsRegister(sessionNumber) [unsubscribes].

The browser.drawer.MhwDocument class allows the loading and displaying of an HTML document in the decoder. The details of the class are now given.

Constructor: MhwDocument (sessionNumber)

freeze ( ): halts the display of the current document (loading of the document continues)

unfreeze ( ): restarts the display of the current document is Pending ( ): whether the document is currently loading stop ( ): halts the loading of the current document reload ( ): reloads the document getDocumentInfo ( ): returns the title and the URL of the document addStatusRegister ( ): subscribes to information on the state and end of loading goToURL (url): loads a web page submit (login, password, URL): submits authentication for loading a web page getStatisticsDocument ( ): returns the number of requests in progress and the URL of the document currently being loaded The browser.mediawebtv.MhwConnection class groups together the user connection and authentification functionality. The details of the class are now given.

Constructor: MhwConnection (subscriberId)

start ( ): requests connection stop ( ): requests disconnection cancel ( ): cancels the connection setAuthentificationType (type): sets the mode of authentication to the CANAL+mode (msd/password) or by login/password getAttributes ( ): returns the connection attributes setAttributes (attributes): modifies the connection attributes setPassword (password): modifies the password getPassword (password): gets the password setAutoCheckPassword (bAutoCheck): sets whether the password is to be verified automatically with the confirmation password getAutoCheckPassword (bAutoCheck): reads whether the password is to be verified automatically with the confirmation password getIPClient (ipaddress, netmask): reads the selected IP and netmask pair setIPClient (ipaddress, netmask): modifies the IP and netmask pair getDNS (dns1, dns2): reads the primary and secondary DNS addresses setDNS (dns1, dns2): modifies the primary and secondary DNS addresses getURLConfigServer (url): reads the address of the configuration server setURLConfigServer (url): modifies the address of the configuration server getQueryCommand (queryCmd, typeOfQuery): reads by type the request to be sent to the configuration server setQueryCommand (queryCmd, typeOfQuery): modifies the request by type queryAcquisitions (tableAcquisitions, typeOfAcquisition, NumberOfAcquisitions): reads the list of acquisitions startAcquisition (acquisitionId): starts an acquisition (data/video)

stopAcquisition (acquisitionId): stops an acquisition (data/video)

addStatusRegister ( ): subscription to be informed of the connection status

The events are: loss of connection; current connection; established connection; connection confirmation request; connection error, modem status: on/off; initialisation in progress; dialling in progress; error but modem is on; server status: invalid port, invalid URL; login error: unknown login; and invalid password.

removeStatusRegister ( ): unsubscribes to the network connection status is Connected subscriberId( ): returns boolean giving the modem connected/disconnected status is Pending ( ): returns boolean for modem currently establishing connection getExtendedProviderUrl (providerUrl): reads the provider currently subscribed to setExtendedProviderUrl (providerUrl): modifies the provider currently subscribed to The browser.mediawebtv.MhwConfiguration class manages the profile of each user and his or her preferences. The details of the class are now given.

Constructor: MhwConfiguration( )
readProfile(subscriberId): read the profile
writeProfile(subscriberId, profile): write the profile
readDefaultProfile( ): read the default profile
writeDefaultProfile(profile): modify the default profile
getUserCount( ): number of users
newUser(profile): identifying for a new user
getLastConnect( ): the last connected user The maximum number of profiles is currently fixed at 5, but this does not represent a strict limit; higher numbers of profiles may be stored if need be.

In the case of failure, an error message is returned by the WriteProfile( ) and writeDefaultProfile( ) methods (or an event if the occurrence is asynchronous)

The browser.mediawebtv.MhwMultiSession class allows a navigator session to be selected. A session is an instance of the navigator which was automatically initiated by another instance. When the navigator starts, a session is created following the establishment of an authenticated connection. The details of the class are now given.

Constructor: MhwMultiSession
getCurrentSessionNumber( )
setCurrentSessionNumber(int number)
getPreviousSession( )
addSession( ): returns the number of the session created
removeSession(int numSession)

The navigator model for the decoder is now described in more detail, with reference to FIGS. 6a and 7–30.

The model presented here is a simple example of a navigator, and gives a general idea of the principal functionality. It gives total freedom at the level of graphical representation. The only important features are the zones or screens within which functions of the same type are grouped and the general user interface.

The navigator employs all of the available graphics (MPEG, PIXMAP) of the graphical studio. The screens of this model are organised in tree form and each one groups together a collection of essential functions. Each function or option in a screen is accessed by moving a focus with the aid of arrow buttons (on the remote control) or by using a keypad with a cursor/pointer. The selection of an action is achieved by a controller click or by a predefined button (e.g. "OK").

In the absence of a physical keyboard, to enter text with the remote control, it is necessary to provide a virtual keyboard. This is achieved by moving the focus with a possibility of tapping quickly, by mapping the buttons of the remote control onto the virtual keyboard; in other words the image of the buttons on the remote control is visible (in traced form) in outline, or slightly opaque, on the picture of the virtual keyboard. The virtual keyboard is discussed in more depth later in this document.

Figure 30:
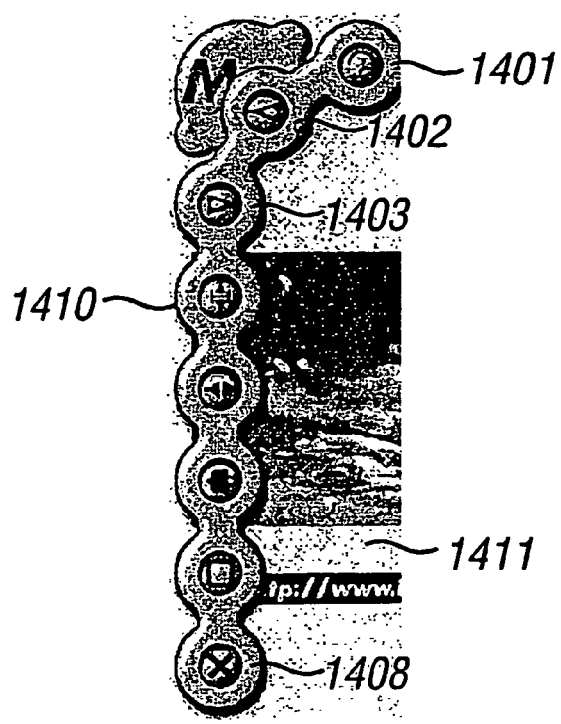
FIG. 30 illustrates a further screen display of the web browser.
Figure 31:
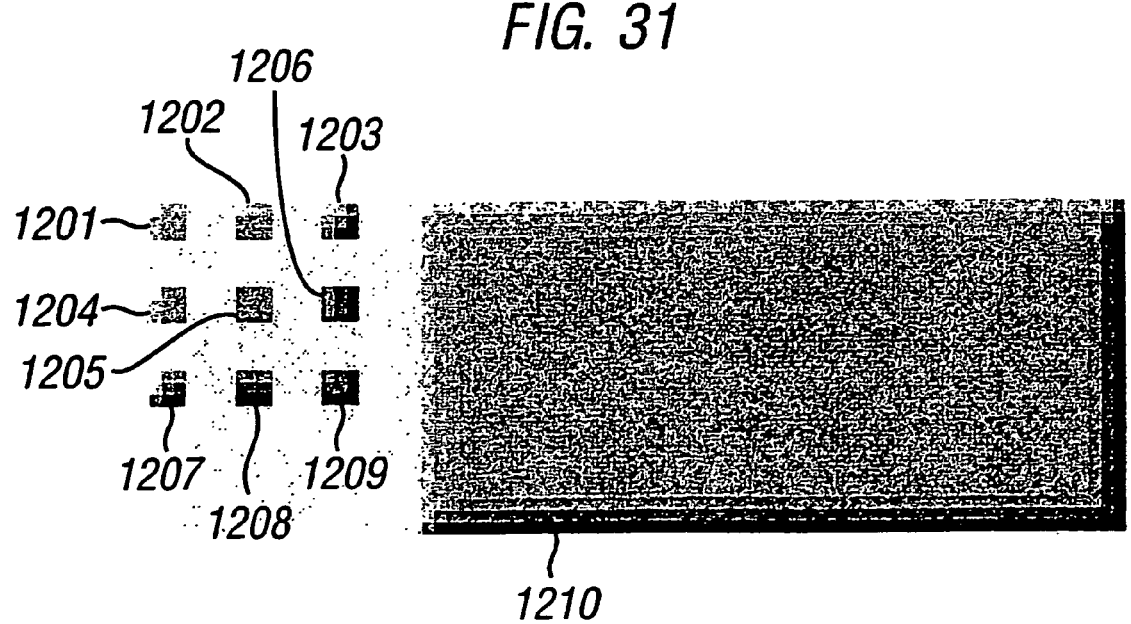
FIG. 31 is an example of a graphical object formed by tiling.
Figure 35:
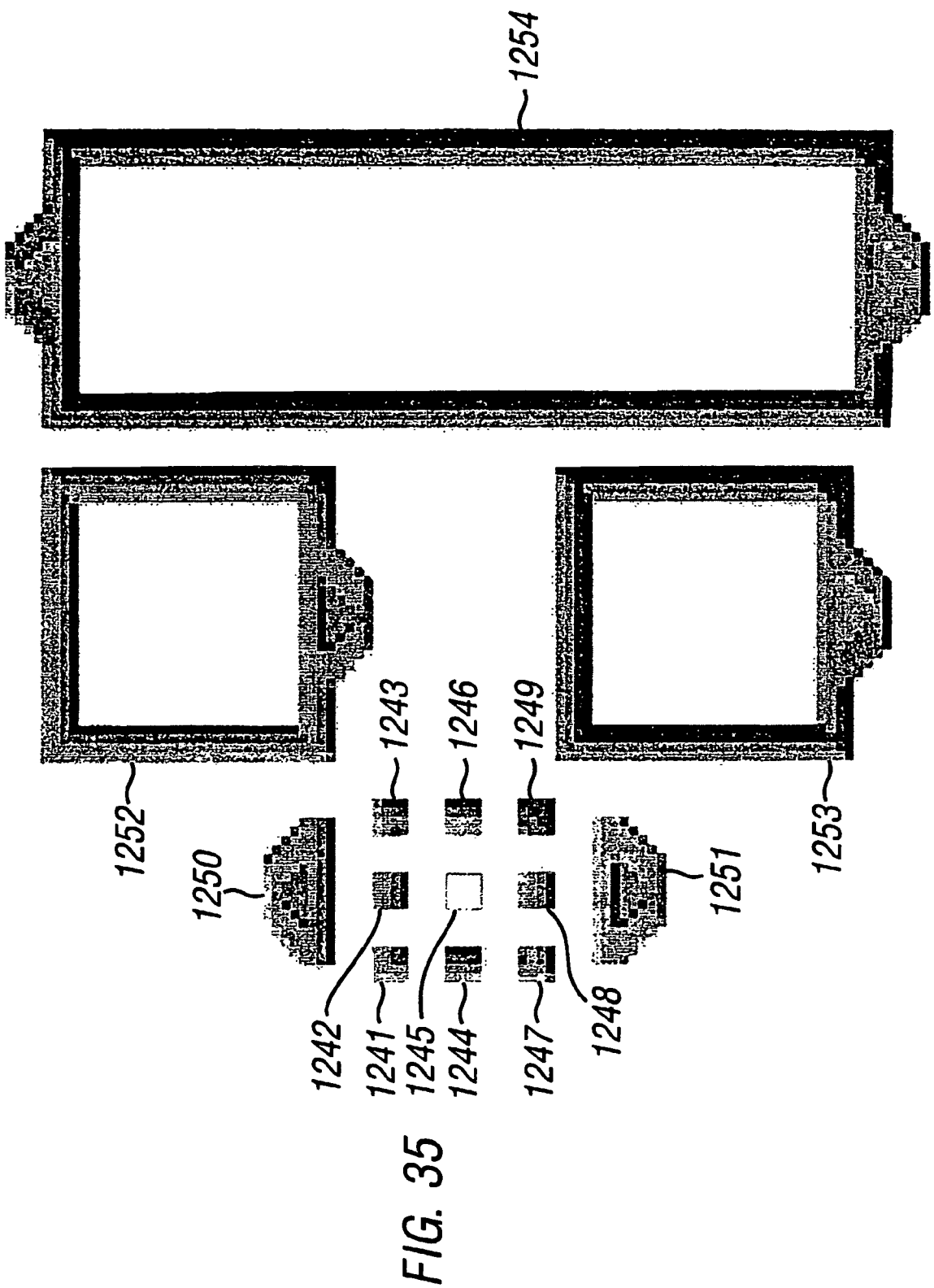
FIG. 35 is a further example of a graphical object formed by tiling.
Figure 36:
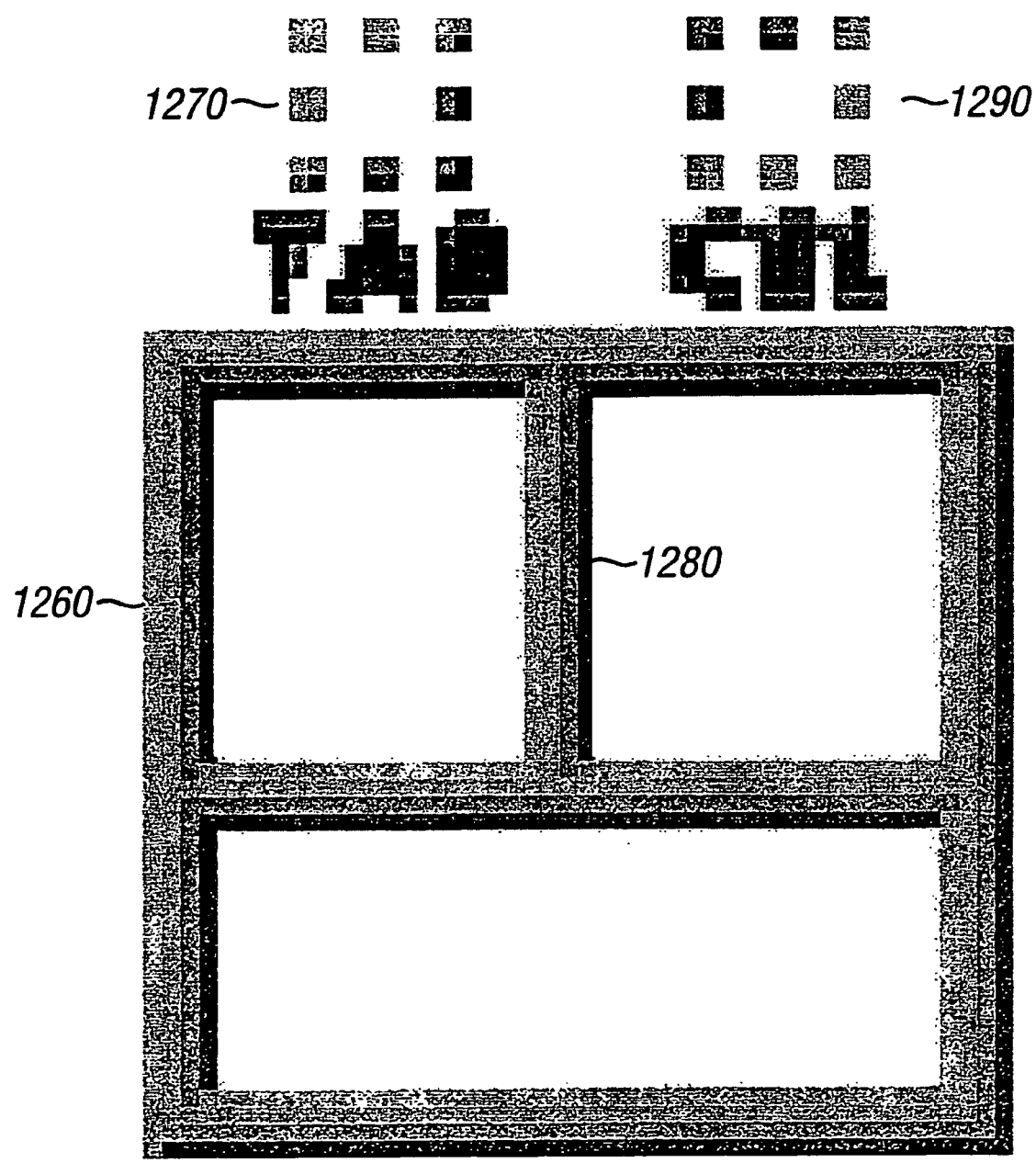
FIG. 36 is a further example of a graphical object formed by tiling.
Figure 37:
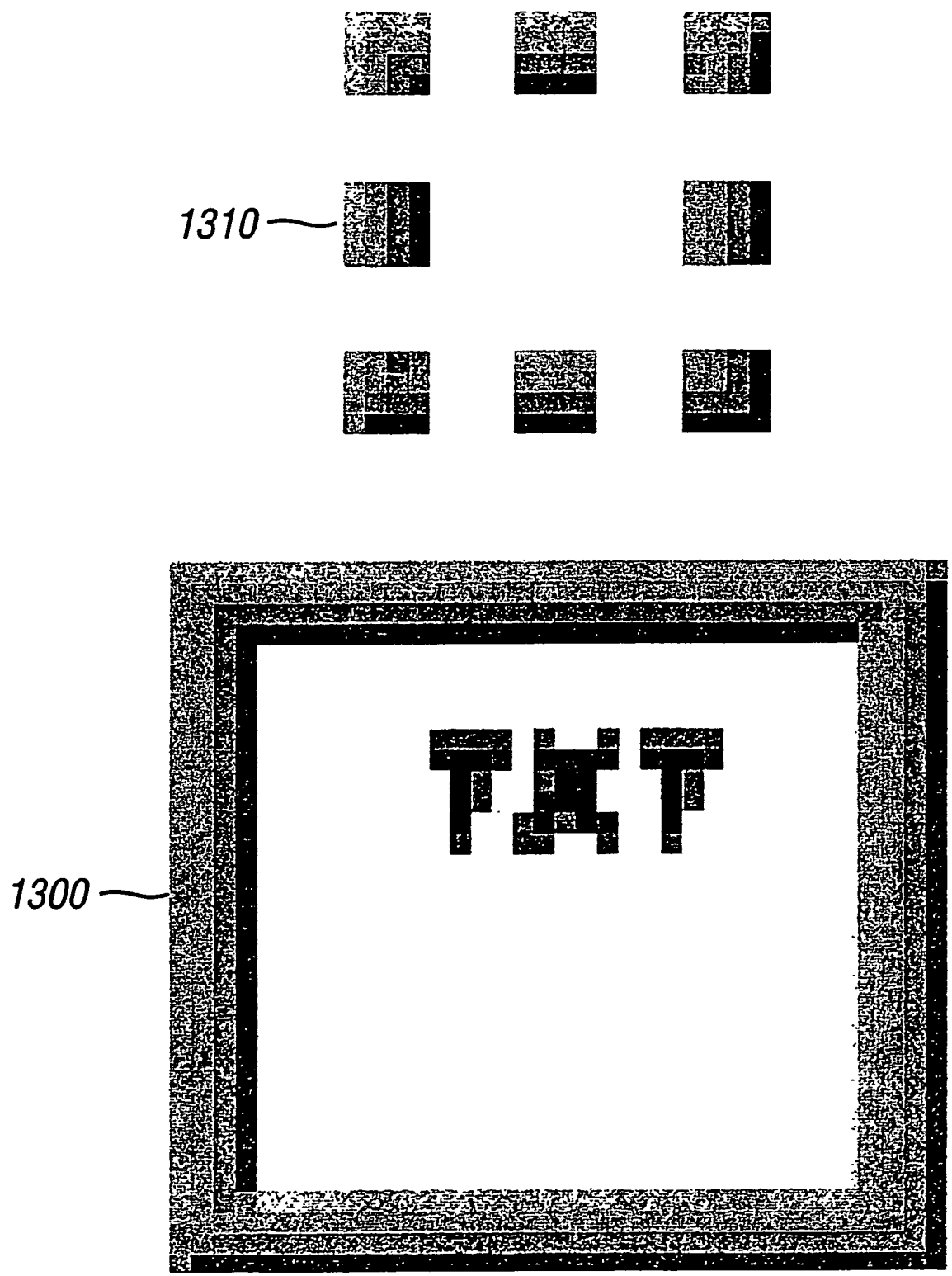
FIG. 37 is a further example of a graphical object formed by tiling.
Figure 38:
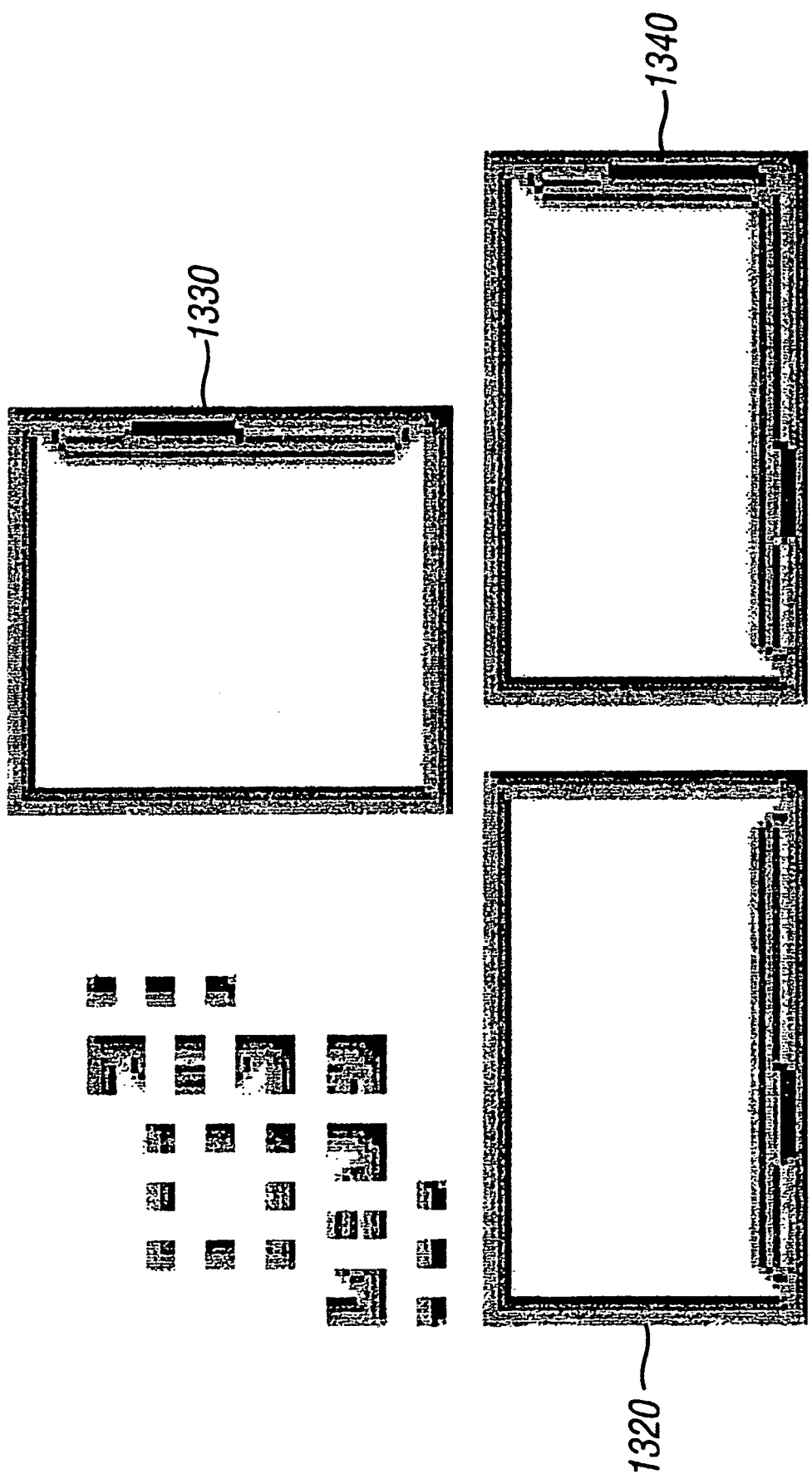
FIG. 38 is a further example of a graphical object formed by tiling.

FIG. 30 shows the top-level chain of navigator function buttons (1410), with a portion of a web page visible beneath (1411).

The main navigator screen is now described, with specific reference to FIG. 30.

The navigator functions are grouped in several layers. The main screen displays a vertical bar (main menu) (1410) which is composed of a series of buttons: Reload/Stop (1401), previous page (1402), next page (1403), history of recently visited sites, bookmarks, connect/disconnect, configuration, exit navigator (1408).

The navigator GUI (main screen) (1410) is displayed when a function key is pressed (either on the remote control or on the keyboard). When the GUI is visible on the TV screen, the HTML document (1411) (which the GUI covers over) continues to be loaded into memory, but the refresh of the document is suspended so as not to affect the display performance of the GUI. The HTML document is redisplayed when the navigator GUI is dismissed. This restriction will be lifted if the performances are eventually satisfactory, thereby allowing the simultaneous display of the HTML document and the GUI.

The GUI is dismissed from the TV screen by pressing a function key (on the remote control or the keyboard), or by clicking outside the GUI button zones. The display of the HTML document currently being loaded or stored in the cache memory is then started or recommenced.

A button is effectively a rectangular or square zone (for example, 32×32 pixels). When the graphics cursor enters a zone, that zone (window) receives the focus (cf. the EnterNotify(WindowId) function).

If the button graphic is a tyre, for example, it has to be detected whether the actual position of the graphics cursor effectively covers the pixels of the tyre. To this end, it is necessary to find the value of the pixel at the hotspot of the mouse pointer in the clipping mask of the button (by calculation of the relative position, getpixel( ) in the clipping mask, then testing the pixel value). This detection method allows the test to be improved for whether or not a click was effected before starting the function of the button.

When the mouse pointer leaves the button's rectangular or square zone, the zone loses the focus (cf. LeaveNotify (WindowId)).

The descriptive button summaries are now described in more detail.

When the mouse pointer or the rectangular focus coincides with a button representing a function, a short phrase (tooltip) is displayed either horizontally or vertically, describing the function of that button. When the button is selected, either by a mouse click or by a function key, a list of buttons appears containing sub-menu options. The system of short descriptive phrases (tooltips) is also used for the sub-menu buttons.

Navigation of the menu options is achieved with the arrow keys either on the remote control or on the keyboard. The last button on the main screen to have had the focus is remembered for the next time the main screen is displayed.

The virtual keyboard is now discussed in more detail, with reference to FIGS. 42–45.

FIG. 42 shows schematically how the currently visible virtual keyboard (1501) maps onto the underlying 'grid' of virtual keyboards (1501, 1506).

FIG. 43 shows a typical mapping of characters to keys on a virtual keyboard.

FIG. 44 shows the images used for the virtual keyboard, with the first (1545) and second (1546) number block having the focus respectively (also showing two different types of remote control 1542 and 1543).

FIG. 45 shows a typical virtual keyboard layout with typical dimensions superimposed.

Firstly, the virtual keyboard is conceived as an tool which is independent of the application in which it is used. This, it can be used within the "WebBrowser" application and equally within the "Mail" application. Moreover, its 'look' is completely independent of the 'look' of the application concerned.

The virtual keyboard is displayed from the moment that the user, not possessing a physical keyboard or a remote control with keyboard, selects an editable area of the screen. The focus is positioned at the end of the text in the editable area. Pressing "OK" (on the remote control or virtual keyboard) or "Cancel" (on the virtual keyboard) dismisses it.

The virtual keyboard which is visible on the screen (1501) is composed of three blocks of ten keys (representing three number blocks of the remote control) side by side (1502, 1503, 1504). The user can pass the focus (1505) from one block to another using the arrow keys on the remote control. After a block is selected, pressing a button on the number block of the remote control enters the corresponding character printed on the virtual keyboard.

The user can also use the up and down arrow keys. This brings the same virtual keyboard on the screen but with different characters on the keys (1506). Thus, flipping between a set of 5 virtual keyboards, one can display all of the characters on the keyboard of a western computer. There is also the possibility of adding other keyboards as the need arises.

With reference to FIG. 44, to allow an immediate association to be made between the number block of the remote control and the focus on the virtual keyboard, a superimposed image of the remote control indicates the focus (1542, 1543). Thus the user can easily visualise that only one part of the keyboard has the focus, and that the rest of the characters can be reached by moving the focus with the arrow keys. The keyboard is designed with the latter points in mind.

The virtual keyboard solution takes up little screen height, and allows for easy extension of the number of characters available. By default, it is the virtual keyboard with the miniature alphabet which is displayed.

Certain buttons have important special functions:—

"OK" on the remote control, for validing the current choice (if the field only has one line, the ¶ character (1521) also validates, or may alternatively be chosen to have no effect at all; otherwise, it corresponds only to a carriage return).

"Cancel" (1522) on the virtual keyboard, to exit the tool without validating (the modifications made after opening the keyboard will be lost).

"Back Space" (1523) on the virtual keyboard, which erases the last character entered.

The up, down, left and right arrow keys, to move within the editing area.

"Tab" (1520) on the virtual keyboard, which inserts a configurable number of spaces in one go (four by default).

The keyboard is always in 'insert' mode.

An example of a keyboard is given in FIG. 44, and is discussed further below.

With the 5 keyboards (5×3) shown in FIG. 43, and the two fonts installed for the WebBrowser application (Arialweb and Courier), all of the characters of a traditional keyboard can be covered. The dimensions of the keyboard on screen are 272 pixels wide by 184 pixels high.

The virtual keyboard and the functional connections with regard to its use in the various applications are developed within the "canalplus.virtualkbd" package.

The classes comprised within the package include "MhwVirtualKbd" (the virtual keyboard graphical description and behavioural class), "MhwVkTextField" (the class derived from 'java.awt.TextField' which allows a virtual keyboard defined within the global application sharing the TextField to control events) and "MhwTextArea" (a class inherited from the 'java.awt.TextArea' which allows a virtual keyboard defined within the global application using the TextArea class to control events).

The MhwVirtualKbd class is now described in more detail.

The constructor of the "MhwVirtualKbd" class is defined as 'private'. Thus only one unique virtual keyboard can be constructed, when the main application which may need to use it is started (in the absence of a physical keyboard, for example). The aim is therefore to present a keyboard configured especially for the current application, and which appears when the user enters a text field (single- or multi-line).

When the keyboard is created, the four main (static) variables which can be configured will have been set:— parent: container, 'parent' of the virtual keyboard, which must itself exist at the time the keyboard is created. It is set using the "setParent" method which returns a 'NullPointerException' if the 'parent' passed in the argument is 'null'.

descriptive file: ASCII file which describes the keyboard, both in terms of the graphics behind the images, which concerns the various 'keyboards' obtained when the virtual keyboard is used, and the labels printed on the keys. The characters are specified by their unicode code. The name of the descriptive file can be set using the "setScreensFile" method.

number of screens: number of 'number blocks' initialised and used by the virtual keyboard. This number, set using the "setScreensNumber", corresponds to the number of keyboards, the characteristics of which are read in the descriptive file detailed above.

initial coordinates: these are the coordinates of the top-left corner of the background image of the keyboard in the parent container (described above). This is set using the "setCoordInit" method.

Once the keyboard is created, it can be decided whether or not to use it by using the "getInstance" method, which finds the keyboard of the current application, if it exists (if the virtual keyboard of the application does not yet exist, and if the application uses it, the "getInstance" method creates one, using for it the variables [the four previously described] which one would have set).

Event management is now described.

According to the preceding descriptions, the virtual keyboard functions, once displayed, solely by interpreting the events sent to it by: the number block, the "OK" button, and the four arrow direction keys on the remote control. These buttons will have specific roles for the keyboard in use.

The "OK" button has an important role, because it allows the user to do two things: 'return' to the text field to enter information, and then display and start the operation of the virtual keyboard; and 'leave' the text field, saving the changes.

Arrow Keys

The 'right' and 'left' arrows allow the image of the remote control (indicating the number block which has the 'focus') to be moved on the three number blocks which are represented on the virtual keyboard. The keys of the number block on the remote control are thus 'bound', depending on the 'keyboard' having the focus, to the display of various characters.

In the most common case, 'tapping' on of these buttons when the virtual keyboard is active causes the automatic insertion of the character shown on that key, in the current text field at the position indicated by the cursor.

Of the characters, six can be considered as 'special' characters, and do not directly cause the character displayed on the key to be displayed in the text field:

BackSpace: '<' (1523): when the button on the remote control corresponding to this character is pressed, the character immediately to the left of the cursor position in the current text field is erased.

Tab: '>>' (1520): when the button on the remote control corresponding to this character is pressed, a configurable number of spaces (' '), 4 by default, is inserted at the current cursor position.

Enter: '¶' (1521): when the button on the remote control corresponding to this character is pressed, a 'line feed' is inserted at the cursor position. In fact, if the current text field is an instance of the 'MhwVkTextField' class, i.e. one which only has one editable line, tapping this button will either have no effect or cause validation of the field. If, on the contrary, this text field is an instance of the 'MhwVkTextArea' class, it consists of several editable lines and this character causes a 'line feed' (if the cursor is positioned on the last editable line, tapping this button will have no effect).

Cancel: '¢' (1522): when the button on the remote control corresponding to this character is pressed, all of the modifications made to the current text field subsequent to the opening of the virtual keyboard are undone. In other words, its content is returned to the value it had before the modifications were made, and the virtual keyboard is 'exited'.

Left arrow: when the button on the remote control corresponding to this character is pressed, the cursor in the current text field is moved one place to the left. If the cursor is already in the 'zero' position (no further movement to the left is possible), this button has no effect. Right arrow: when the button on the remote control corresponding to this character is pressed, the cursor in the current text field is moved one place to the right. If the cursor is already positioned after the last character in the text field (and cannot move any further right), this button has no effect.

Up arrow: when the button on the remote control corresponding to this character is pressed, the cursor in the current text field is moved one place upwards. If the cursor is already in the first line of the text field (or if the current text field only has one line: MhwVkTextField), this button has no effect.

Down arrow: when the button on the remote control corresponding to this character is pressed, the cursor in the current text field is moved one place downwards. If the cursor is already in the last line of the text field (or if the current text field only has one line: MhwVkTextField), this button has no effect.

The "findLocation" method determines the placement of the virtual keyboard on the screen, seeking to minimise the "cropped" surface.

The MhwVkTextField class is simply a specialisation of the "TextField" class in the "java.awt" package. It additionally manages a boolean value which specifies the use (or not) of the virtual keyboard.

The constructors are exactly the same as those of the "TextField" class in the "java.awt" package, with a simple additional argument: a boolean specifying the use of the virtual keyboard.

If the boolean is "true", a 'base' instance of the "TextField" class is created, and a virtual keyboard listener, available within the current application, is also added at the same time, using the "addKeyListener" method. If not, a 'normal' TextField is created.

When the TextField has the focus, if the user presses 'OK' and the boolean specifies the use of the virtual keyboard, the virtual keyboard is displayed and gains the focus. It manages all of the events and is able to fill the text field. If the user presses 'OK' again, its text is validated, and the keyboard returns the focus. If the use of the virtual keyboard is not envisaged (boolean=false), the "TextField" has the same 'behaviour' as a standard TextField in "java.awt".

The MhwVkTextArea class is simply a specialisation of the "TextArea" class in the "java.awt" package. It additionally manages a boolean value which specifies the use (or not) of the virtual keyboard.

The constructors are exactly the same as those of the "TextArea" class in the "java.awt" package, with a simple additional argument: a boolean specifying the use of the virtual keyboard.

If the boolean is "true", a 'base' instance of the "TextArea" class is created, and a virtual keyboard listener, available within the current application, is also added at the same time, using the "addKeyListener" method. If not, a 'normal' TextArea is created.

When the TextArea has the focus, if the user presses 'OK' and the boolean specifies the use of the virtual keyboard, the virtual keyboard is displayed and gains the focus. It manages all of the events and is able to fill the text field. If the user presses 'OK' again, its text is validated, and the keyboard returns the focus. If the use of the virtual keyboard is not envisaged (boolean=false), the "TextArea" has the same 'behaviour' as a standard TextArea in "java.awt".

The following section describes further the implementation of features described above, and in particular the reconstruction of graphical objects (for example text fields, buttons, sliders, lists, checkboxes, choices etc.) from a set of graphical elements.

Figure 39:
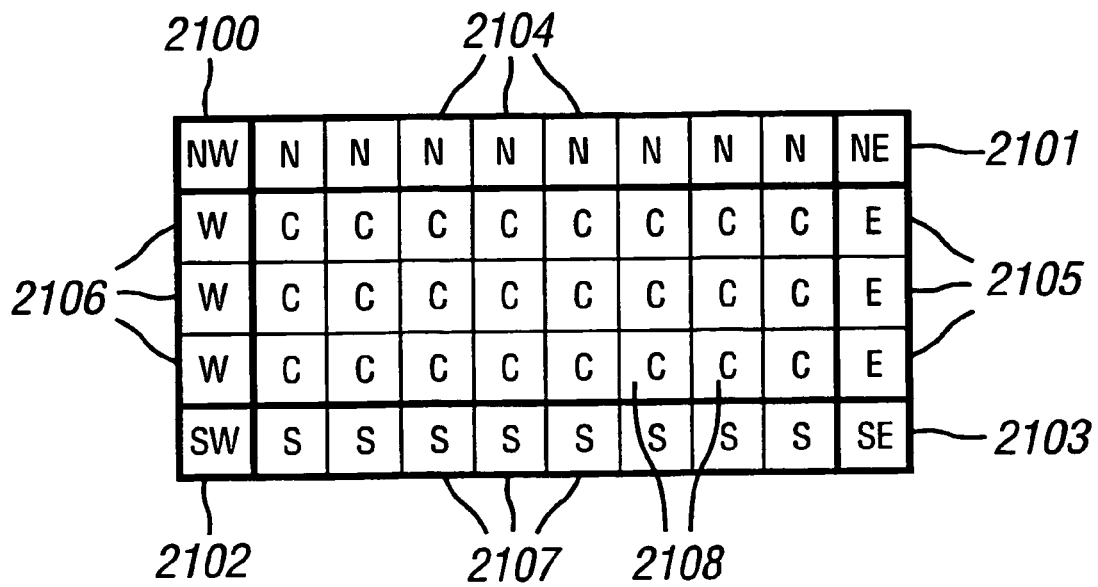
FIG. 39 illustrates the method of tiling graphical objects.

FIG. 39 shows a button, for example, which is made from 9 elements: the four corners (NW 2100, NE 2101, SW 2102, SE 2103), the four sides (N 2104, E 2105, W 2106, S 2107) and the centre (C 2108).

Typically, but not necessarily, each of these 9 elements is square (4×4 pixels, 8×8 pixels, 16×16 pixels). The blocks of N, E, W, S and C elements are tiled within the area required (defined by the size of the component together with the border defined by the look). This area does not have to be a multiple of the size of the element. Currently, the tiling goes from left to right or top to bottom, so any incompletely drawn elements appear at the bottom and right hand sides. It could be envisaged to add "centered" and "right" justified tiling rules if this was felt to be useful. In general, the NW, NE, SW and SE elements are the same size as the border and so tiling is not necessary. If, however, they are smaller than required, the tiling is performed automatically.

A brief description follows of how this is implemented. The work is divided into three areas: the mechanism built into the native WGT module allowing the creation and assignment of different looks to different WGT widgets; the development of the native "LookPixmap" module, in which the functions for painting the different graphical features of components are included; and the development of the mhw.awt Java package for interfacing with the native code.

These three areas of development are described in the following sections.

The WGT module look mechanism will now be described, with references to FIGS. 40 and 41.

The aim of this section is to describe how the WGT module has been modified so as to be able to control the 'look' of the various graphic objects managed. New looks can be defined in new classes which can be added as and when necessary, leaving the WGT module untouched. A standard WGT look (LookWgt) is provided, instantiated and attributed to widgets by default so that applications not wishing to use this facility do not need to use it.

The following features are required: a number of different looks can be defined for each object type; a different look can be given to each object independently; and by default, the look defined by the current WGT is applied to objects.

Two different techniques for drawing the look of an object must be possible: bitmap and vectorial.

In the bitmap technique, the object is drawn by combining a number of predefined bitmap elements to create a single bitmap which is then drawn. To create objects of variable size, elements can be repeated, along the sides for example, in order to build an object of the required size.

Neither the size nor the precise arrangement of each of these elements is defined. The idea is to leave this as free as possible so that the creation of new looks is not overly restricted by WGT. The look class must define the bitmap elements and the rules for fitting them together as a function of the object size required.

The LookPixmap (native) and the PixmapLook (Java) classes described later use this method exclusively. There is nothing to stop developers creating their own look, derived or not from LookPixmap, which uses vectorial methods.

In the vectorial technique, the object is drawn using a series of basic draw operations such as DrawRectancle( ), DrawArc( ). The look class must define the rules for drawing the object as a function of the object size required.

It is perfectly possible to envisage a look class combining both Bitmap and Vectorial techniques. For example, the bitmap approach could be used for the basic form of a button, while the vectorial approach could provide the highlighting.

The WGT Module Look Mechanism are now discussed in more detail.

The following mechanisms have been incorporated:

Division of the current paint method for each object into seven functions, certain of which are contained in the look class attributed to the object: DrawBackground( ); MhwWgtLookDrawBackground( ); DrawForeground( ); MhwWgtLookDrawForeground( ); MhwWgtLookDrawRelief( ); MhwWgtLookDrawFocus( ); MhwWgtLookHighlight( )

Creation of an abstract class MhwWgtLook.

Creation of a class MhwWgtLookWgt derived from MhwWgtLook, and instantiated when WGT is initialized.

Addition of a g_TheDefaultLook global variable used to set the look that will be attributed to each object when it is created if a specific look is not attributed MhwWgtXXXAttsSetLook.

Addition of a public method MhwWgtSetDefaultLook (context) for changing the default look for objects.

Addition to the object classes of two public methods, MhwWgtSetXXXAttrLook(*object, *look) and MhwWgtGetXXXAttsLook(*object).

These aspects are presented in the following sections, beginning with the methods for painting.

Each paint function now calls the following methods when it is called: DrawBackground( ); MhwWgtLookDrawBackground( ); DrawForeground( ); MhwWgtLookDrawForeground( ); MhwWgtLookDrawRelief( ); MhwWgtLookDrawFocus( ); and MhwWgtLookHighlight( ).

The two methods DrawBackground( ) and DrawForeground( ) are part of WGT and are called regardless of the look. The others are, in fact, pointers to the corresponding functions in the Look class associated with the widget in question. In this way, the look class implements the paint functions for these parts.

| | |
|---|---|
| Background | This allows the look to draw behind the entire widget. |
| Foreground | This can be used to draw an image of other graphic over the central part of the widget (excluding the border). |
| Relief | This is called if the widget's relief flag is set and is used to draw a border or relief for the widget. |
| Focus | This is called if the widget has the focus. It can be used to indicate this graphically. |
| Highlight | This is called if the widget is highlighted. It can be used to indicate this graphically. |

The abstract class MhwWgtLook is defined and contains the following: WgtCoreLookClassMethod; WgtCoreLookClassField; WgtCoreLookClass; WgtCoreLookPart; and WgtCoreLookObject.

These are described below.

FIELDS:

| | |
|---|---|
| MhwWgtLookClass | *extends; |
| Int32 | classId; |
| String | ClassName; |
| Card16 | mask; |
| Card8 | borderwidthTop; |
| Card8 | borderwidthBottom: |
| Card8 | borderwidthLeft; |
| Card8 | borderwidthRight; |
| MhwWgtColorMapId | Colormap: |
| MhwWgtVisual | visual; |
| Card32 | blackPixel; |
| Card32 | whitePixel; |
| Card32 | transparentPixel; |
| MhwWgtColor | verylightGray; |
| MhwWgtColor | lightGray; |
| MhwWgtColor | middleGray; |
| MhwWgtColor | darkGray; |
| MhwWgtColor | highlight; |
| MhwWgtColor | blackColor; |
| MhwWgtColor | whiteColor; |

METHOD TABLE (set to point to the overloaded methods in derived classes):

| | | |
|---|---|---|
| MhwWgtError | (*delete) | (MhwWgtLook); |
| MhwWgtErrox | (*free) | (MhwWgtLook); |
| MhwWgtError | (*reference) | (MhwWgtLook); |
| Card8 | (*getBorderWidth) | (MhwWgtLook, MhwWgtWidget, MhwWgtLookBorder); |
| MhwWgtError | (*getBorderWidth) | (MhwWgtLook, MhwWgtLookBorder, Card8); |
| Bool | (*isInstanceOf) | (MhwWgtLook, Int32); |
| MhwWgtError | (*drawBackground) | (MhwWgtLook, MhwWgtWidget, Int16, Int16, Card16, Card16); |
| MhwWgtError | (*drawForeground) | (MhwWgtLook, MhwWgtWidget, Int16, Int16, Card16, Card16); |
| MhwWgtError | (*drawRelief) | (MhwWgtLook, MhwWgtWidget, Int16, Int16, Card16, Card16, MhwWgtLookRelief); |
| MhwWgtError | (*unDrawRelief) | (MhwWgtLook, MhwWgtWidget, Int16, Int16, Card16, Card16); |
| MhwWgtError | (*drawFocus) | (MhwWgtLook, MhwWgtWidget, Int16, Int16, Card16, Card16); |
| MhwWgtError | (*unDrawFocus) | (MhwWgtLook, MhwWgtWidget, Int16, Int16, Card16, Card16); |
| MhwWgtError | (*drawHighlight) | (MhwWgtLook, MhwWgtWidget, Int16, Int16, Card16, Card16); |
| MhwWgtError | (*unDrawHighlight) | (MhwWgtLook, MhwWgtWidget, Int16, Int16, Card16, Card16); |
| MhwWgtError | (*drawInset) | (MhwWgtLook, MhwWgtWidget, Int16, Int16, Card16, Card16); |
| MhwWgtError | (*drawOutset) | (MhwWgtLook, MhwWgtWidget, Int16, Int16, Card16, Card16). |
| MhwWgtError | (*drawSelectedBG) | (MhwWgtLook, MhwWgtWidget, Int16, Int16, Card16, Card16); |
| MhwWgtError | (*drawCheckSymbol) | (MhwWgtLook, MhwWgtWidget, Int16, Int16, Card16, Card16, Bool, MhwWgtCheckStyle): |
| MhwWgtError | (*drawChoiceSymbol) | (MhwWgtLook, MhwWgtWidget, Int16, Int16, Card16, Card16); |
| MhwWgtError | (*drawAnchor) | (MhwWgtLook, MhwWgtWidget, Int16, Int16, Card16, Card16, String, Card32, Int8, MhwWgtLookItemFlag, MhwWgtColor); |
| MhwWgtError | (*drawCross) | (MhwWgtLook, MhwWgtWidget, Int16, Int16, Card16, Card16); |
| MhwWgtError | (*unDrawCross) | (MhwWgtLook, MhwWgtWidget, Int16, Int16, Card16, Card16); |
| MhwWgtError | (*drawItem) | (MhwWgtLook, MhwWgtWidget, Int16, Int16, Card16, Card16, String. Card32, Int8, MhwWgtLookItemFlag); |
| MhwWgtError | (*reDrawItem) | (MhwWgtLook, MhwWgtWidget, Int16, Int16, Card16, Card16, String, Card32, Int8, MhwWgtLookItemFlag, Bool); |
| MhwWgtError | (*drawSlidArrow) | (MhwWgtLook, MhwWgtWidget, Int16, Int16, Card16, Card16, MhwWgtSlidDirection); |

| | | |
|---|---|---|
| \-continued | | |
| MhwWgtError | (*drawSlidLift) | (MhwWgtLook. MhwWgtWidget. Int16, Int16, Card16, Card16); |
| MhwWgtError | (*drawCursor) | (MhwWgtLook, MhwWgtWidget, Int16. Int16, Card16, Card16); |
| MhwWgtError | (unDrawCursor) | (MhwWgtLook, MhwWgtWidget, Int16, Int16, Card16, Card16); |
| MhwWgtError | (*drawString) | (MhwWgtLook, MhwWgtWidget, Int16, Int16, String, Card32, Int8); |
| MhwWgtDimension | (*getPreferredSizeArrow) | (MhwWgtLook); |
| MhwWgtDimension | (*getPreferredSizeCheck) | (MhwWgtLook); |
| MhwWgtDimension | (*getPreferredSizeChoice) | (MhwWgtLook); |
| MhwWgtDimension | (*getPreferredSizeCross) | (MhwWgtLook); |
| Card8 | (*getItemBorderwidth) | (MhwWgtLook); |

(The Card8, Card16, etc. data types are aliases for number types having the indicated number of bits, e.g. Card8 is equivalent to a 'char', Card16 is equivalent to a 'short', etc.)

Each draw method is identical for each object type. For looks which require a different method for each method, or at least for certain methods, the method in the look class must identify the widget type and act accordingly.

Note the purpose of the DrawNothing( ) method. It simply returns OK if called. Certain features are not necessarily implemented in a given look. So that WGT does not necessarily have to test the existence of a given function, any unimplemented functions should point to this method.

Note also Mask. This is a private, read-only Boolean array where each element corresponds to one of the above methods. If an element is set to 1, then the corresponding method is redefined. Otherwise, the method is not redefined. In this way, if it wants to, WGT can find out in a single operation which methods it has to call.

The look class is used to define the interface between any look definition and WGT. WGT uses only these methods to display the required look. If additional functionality is required of a look, it can be incorporated in an extended look structure, but it is up to the application and not WGT to take these methods/parameters into account. In this way, additional attributes and methods can be added.

A derived look structure must contain all these methods and attributes, and it can also add its own. However. WGT will only take those methods defined in the MhwWgtLook structure into account.

The MhwWgtLookWgt class is now discussed.

So that existing applications do not have to be modified to remain compatible with the modified version of WGT, a basic look class, defining the look that WGT objects currently have, is created and instantiated by WGT.

It is a sub-class of MhwWgtLook and is called MhwWgt-LookWgt. When this class is initialised, the values of all of the pointers in the structure are set to point at the WGT-defined methods.

This basic class contains nothing else—it simply defines the look that WGT currently provides.

| | |
|---|---|
| FIELDS: | |
| Card8 | reliefWidth |
| MhwWgtColor | reliefColorWhite; |
| MhwWgtColor | reliefColorBlack; |
| Card8 | focusWidth; |
| MhwWgtColor | focusColor; |
| Card8 | highlightWidth; |
| MhwWgtColor | highlightColor; |
| MhwWgtColor | anchorColorBGNormal; |
| MhwWgtColor | anchorColorFGVisited: |
| MhwWgtColor | anchorColorBGCurrent: |
| Card16 | mask; |
| Card8 | reliefWidth; |
| MhwWgtColor | reliefColorWhite; |
| MhwWgtColor | reliefColorBlack; |
| Card8 | focusWidth; |
| MhwWgtColor | focusColor; |
| Card8 | highlightWidth; |
| MhwWgtColor | highlightColor; |
| MhwWgtColor | anchorColorBGNormal; |
| MhwWgtColor | anchorColorFGVisited; |
| MhwWgtColor | anchorColorBGCurrent; |
| MhwWgtColorMapId | colorMap; |
| Card32 | blackPixel; |
| Card32 | whitePixel; |
| Card32 | transparentPixel; |
| MhwWgtColor | verylightGray; |
| MhwWgtColor | lightGray; |
| MhwWgtColor | middleGray; |
| MhwWgtColor | darkGray: |
| MhwWgtColor | highlight; |
| MhwWgtColor | blackColor; |
| MhwWgtColor | whiteColor; |

-continued

METHOD TABLE:

| | | |
|---|---|---|
| MhwWgtError | (*setReliefWidth) | (MhwWgtLkWgt, Card8); |
| MhwWgtError | (*setReliefColorBlack) | (MhwWgtLkWgt, MhwWgtColor); |
| MhwWgtError | (*setReliefColorWhite) | (MhwWgtLkWgt, MhwWgtColor); |
| MhwWgtError | (*setFocusWidth) | (MhwWgtLkWgt, Card8); |
| MhwWgtError | (*setFocusColor) | (MhwWgtLkWgt, MhwWgtColor); |
| MhwWgtError | (*setHighlightWidth) | (MhwWgtLkWgt, Card8); |
| MhwWgtError | (*setHighlightColor) | (MhwWgtLkWgt, MhwWgtColor); |
| MhwWgtError | (*setAnchorColorBGNormal) | (MhwWgtLkWgt, MhwWgtColor); |
| MhwWgtError | (*setAnchorColorFGVisited) | (MhwWgtLkWgt, MhwWgtColor); |
| MhwWgtError | (*setAnchorColorBGCurrent) | (MhwWgtLkWgt, MhwWgtColor); |

With regard to the WGT initialisation, an instance of the MhwWgtLookwgt class must be created when the WGT is started. WGT will thus have access to these methods if the application does not specify a different look. The g_TheDefaultLook global variable (described below) must initially be set to point at this look.

The processes of defining new Looks and setting default Looks are now described.

WGT is not responsible for defining or instantiating new look objects. Applications must do this themselves. All look objects created must be castable in an MhwWgtLook structure. C.f the management of Looks below.

With regard to default looks, a field:

MhwWgtLook *DefaultLook must be added to the MhwWgtContext object pointing to the instance of MhwWgtLook to be applied to any new objects created from this context. When a new WGT context is created, this field must be set to point at WgtBasicLook.

With regard to setting the default Look for a Context, a public method:

MgwWgtSetDefaultLook(MhwWgtContext, aContext, MhwWqtLook aLook)

is provided to set the DefaultLook field in aContext to point at aLook.

For associating a Look with an Object, the following attribute is added to the coreAtts structure in the core class:

MhwWgtLook *Look

This attribute is thus created for each object created. Whenever a object is instantiated, Look is set to point at the DefaultLook global variable.

Two new public methods MhwWgtSetXXXAttsLook(MhwWgtWidget anObject, MhWWgtLook aLook) and MhwWgtGeXXXAttsLook(MhwWgtWidget anObject, MhwWgtLook *aLook) should be added to the core class to allow the look instance associated with the object to be changed.

The management of Looks is now discussed.

WGT does not provide any look management. In order to use a look other than the default, an application must first ensure that one or more look classes are instantiated and initialised, and then each time that it creates a new WGT object, use the MhwWgtSetCoreAttsLook( ) method to associate the object with the desired look. If it wishes to use a given look for all future widgets, it can use the MhwWgtSetDefaultLook( ) method described above.

An application wishing to use any look other than the one defined by default is responsible for creating and instantiating the look. In another embodiment of the invention, an application may download looks remotely. In this case, however, the application itself must supply the required classes, derived from MhwWgtLook.

A look must not be destroyed by the application that created it until all the widgets which use it have been destroyed. This requires the addition of a refCounter field to count the number of "clients".

look=MhwNewLook( )
MhwLookRef(look);
.
.
.
MhwLookUnref(look);
Look=0;

This replaces free (look). The look will actually be destroyed when its refCounter field equals 0.

SetXxxLook(widget, look) {
if(widget->core.look)
MhwLookUnref(widget->core.look);
widget->core.look=look;
if(look)
MhwLookRef(look);
}

The WGT Module List of APIs for implementing Looks is given here:

| | | |
|---|---|---|
| extern MhwWgtError | MhwWgtLookInitDefault | (MhwWgtLookClass*, MhwWgtLookAtts*); |
| extern MhwWgtError | MhwWgtLookinitClass | (Void); |
| extern MhwWgtError | MhwWgtLookResetDefault | (MhwWgtLookClass*); |
| extern MhwWgtError | MhwWgtLookAttsGetBorderWidthBTLR | (MhwWgtLookAtts*, Card8*, Card8*, Card8*, Card8*); |
| extern MhwWgtError | MhwWgtLookAttsGetBorderWidthBottom | (MhwWgtLookAtts*, Card8*); |
| extern MhwWgtError | MhwWgtLookAttsGetBorderWidthLeft | (MhwWgtLookAtts*, Card8*); |
| extern MhwWgtError | MhwWgtLookAttsGetaorderWidthRight | (MhwWgtLookAtts*, Card8*); |
| extern MhwWgtError | MhwWgtLookAttsGetBorderWidthTop | (MhwWgtLookAtts*, Card8*); |

```
extern MhwWgtError MhwWgtLookAttsGetDefault        (MhwWgtLookClass*,
                                                    MhwWgtLookAtts*)
extern MhwWgtError MhwWgtLookAttsInit              (MhwWgtLookAtts*);
extern MhwWgtError MhwWgtLookAttsSetBorderWidthBTLR (MhwWgtLookAtts*,
                                                    Card8, Card8, Card8, Card8);
extern MhwWgtError MhwWgtLookAttsSetBorderWidthBottom
                                                   (MhwWgtLookAtts*, Card8);
extern MhwWgtError MhwWgtLookAttsSetBorderWidthLeft (MhwWgtLookAtts*,
                                                    Card8);
extern MhwWgtError MhwWgtLookAttsSetBorderWidthRight (MhwWgtLookAtts*,
                                                    Card8);
extern MhwWgtError MhwWgtLookAttsSetBorderWidthTop  (MhwWgtLookAtts*,
                                                    Card8);
```

The Look/LookPixmap module will now be described in more detail.

The MhwWgtLookPixmap class is derived from the MhwWgtLook class described above. Essentially it works by reconstructing the various elements of each component to create a graphical image of the required size, as described above.

These images are used for the following: backgrounds for buttons; relief (that is the border around the active zone of text areas, for example); a symbol for the Choice component; checkboxes; sliders; and slider lifts.

Figure 40:
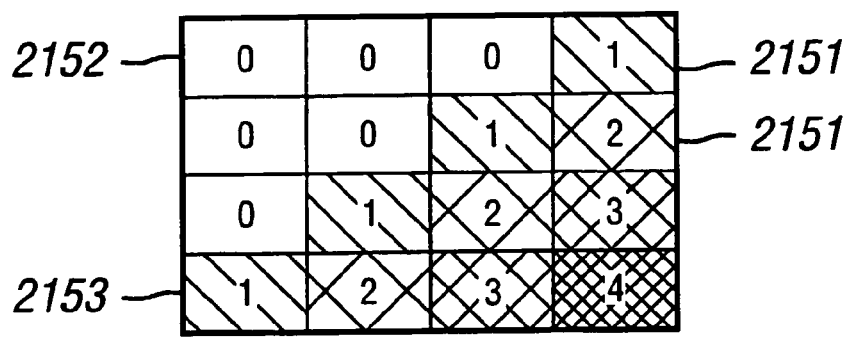
FIG. 40 shows a typical image buffer.
Figure 41:
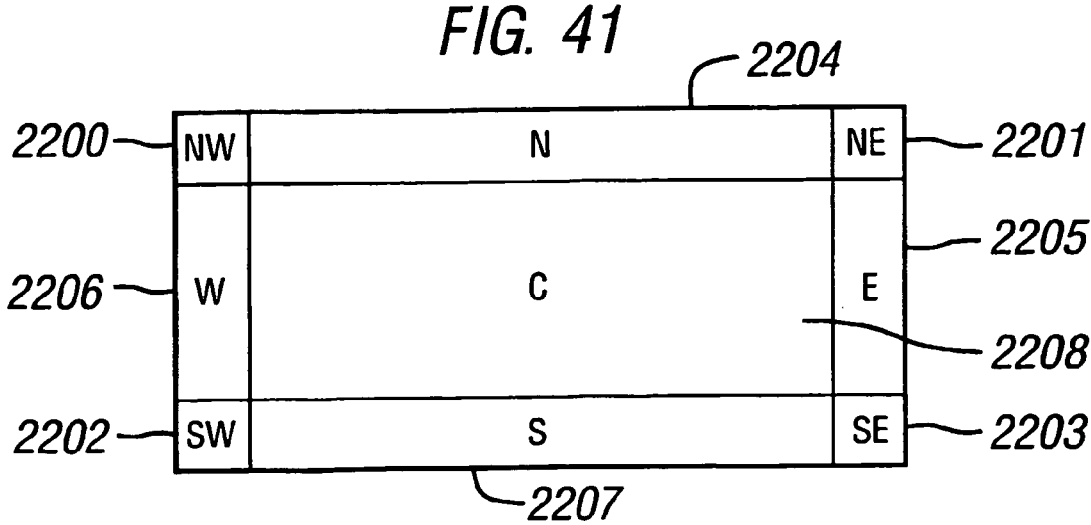
FIG. 41 shows the layout of a tiled graphical object.

With reference to FIG. 40, to reduce initialization time, the images are not compressed, but are stored in a special format designed to minimize as far as possible the space occupied. The colour of each pixel (2152) is described in a single byte, which is the index number (2151) of the colour in the current colourmap. FIG. 40 shows an example buffer, image, containing an 4×4 image (2153).

The image (2153) in FIG. 40 would be stored as follows:

```
Card8 slidLiftSeVrImage4 [4] [4] =
{
    { 0, 0, 0, 1},
    { 0, 0, 1, 2},
    { 0, 1, 2, 3},
    { 1, 2, 3, 4}
};
```

The LookPixMap Image structure will now be described.

In order to identify the size of an image buffer, a structure, LookPixmapImage, is defined including the image buffer described above, together with the width and height of the image. This structure, defined below, is used to contain the data for each graphical element.

```
typedef struct
{
    Card8   *imageData;   Buffer containing the image. It is a two
                          dimensional array of Card8, each element
                          of which contains the index number in the
                          palette of the colour to be displayed at the
                          position in the array.
    Card8   *maskData;    Buffer containing the mask. It is a one
                          dimensional array of Card8, with one bit
                          per pixel. (Format as returned by the
                          Image module).
    Card16  width;        Width of the image.
    Card16  height;       Height of the image.
    Card8   isOpaque;     0 if image contains any transparent
                          elements,
                          1 if entirely opaque.
}
LookPixmapImage;
```

Images can be of different sizes, although for a given type of element they will generally be the same. The central element (xxxxxC), however, is often of size 1×1. The MhwWgtLookPixmapAllImages structure groups together all the picture elements as shown below:

```
typedef struct
{
LookPixmapImage    *relnoNW;    NorthWest corner of relief - state
                                Normal
LookPixmapImage    *relnoSW;    SouthWest corner of relief - state
                                Normal
LookPixmapImage    *relnoNE;    NorthEast corner of relief - state
                                Normal
LookPixmapImage    *relnoSE;    SouthEast corner of relief - state
                                Normal
LookPixmapImage    *relnoN;     North edge of relief - state Normal
LookPixmapImage    *relnoW;     West edge of relief - state Normal
LookPixmapImage    *relnoE;     East edge of relief - state Normal
LookPixmapImage    *relnoS:     South edge of relief - state Normal
LookPixmapImage    *relnoC;     Central area of relief - state
                                Normal
LookPixmapImage    *relfoNW;    State - Focus only
LookPixmapImage    *relfoSW;
LookPixmapImage    *relfcNW;
LookPixmapImage    *relfoSE;
LookPixmapImage    *relfoN;
LookPixmapImage    *relfoW;
LookPixmapImage    *relfoE;
LookPixmapImage    *relfoS;
LookPixmapImage    *relfoC;
LookPixmapImage    *relhiNW;    State - Highlight only
LookPixmapImage    *relhiSW;
LookPixmapImage    *relhiNE;
LookPixmapImage    *relhiSE;
LookPixmapImage    *relhiN;
LookPixmapImage    *relhiW;
LookPixmapImage    *relhiE;
LookPixmapImage    *relhiS;
LookPixmapImage    *relhiC;
LookPixmapImage    *relfhNW;    State - Focus and Highlight
LookPixmapImage    *relfhSW;
LookPixmapImage    *rolfhNE;
LookPixmapImage    *relfhSE;
LookPixmapImage    *relfhN;
LookPixmapImage    *relfhW;
LookPixmapImage    *relfhE;
LookPixmapImage    *relfhS:
LookPixmapImage    *relfhC;
LookPixmapImage    *butnoNW;    Button elements
LookPixmapImage    *butnoSW:
LookPixmapImage    *butnoNE;
LookPixmapImage    *butnoSE;
LookPixmapImage    *butnoN;
LookPixmapImage    *butnoW:
LookPixmapImage    *butnoE:
LookPixmapImage    *butnoS;
LookPixmapImage    *butnoC;
LookPixmapImage    *butfoNW;
LookPixmapImage    *butfoSW;
```

-continued

| LookPixmapImage | *butfoNE; | |
|---|---|---|
| LookPixmapImage | *butfoSE; | |
| LookPixmapImage | *butfoN; | |
| LookPixmapImage | *butfoW; | |
| LookPixmapImage | *butfoE; | |
| LookPixmapImage | *butfoS; | |
| LookPixmapImage | *butfoC; | |
| LookPixmapImage | *buthiNW; | |
| LookPixmapImage | *buthiSW; | |
| LookPixmapImage | *buthiNE; | |
| LookPixmapImage | *buthiSE; | |
| LookPixmapImage | *buthiN; | |
| LookPixmapImage | *buthiW; | |
| LookPixmapImage | *buthiE; | |
| LookPixmapImage | *buthiS; | |
| LookPixmapImage | *buthiC; | |
| LookPixmapImage | *butfhNW; | |
| LookPixmapImage | *butfhSW; | |
| LookPixmapImage | *butfhNE; | |
| LookPixmapImage | *butfhSE; | |
| LookPixmapImage | *butfhN; | |
| LookPixmapImage | *butfhW; | |
| LookPixmapImage | *butfhE; | |
| LookPixmapImage | *butfhS; | |
| LookPixmapImage | *butfhC; | |
| LookPixmapImage | *choice; | Choice Symbol |
| LookPixmapImage | *chck1na, | Checkbox symbol - Type 1 not selected no focus |
| LookPixmapImage | *chck1a; | Checkbox symbol - Type 1 selected no focus |
| LookPixmapImage | *chckf1na; | Checkbox symbol - Type 1 not selected focus |
| LookPixmapImage | *chckf1a; | Checkbox symbol - Type 1 selected focus |
| LookPixmapImage | *chck2na; | Checkbox symbol - Type 2 not selected no focus |
| LookPixmapImage | *chck2a; | Checkbox symbol - Type 2 selected no focus |
| LookPixmapImage | *chckf2na; | Checkbox symbol - Type 2 not selected focus |
| LookPixmapImage | *chckf2a; | Checkbox symbol - Type 2 selected focus |
| LookPixmapImage | *slidNeVr; | Slider background elements |
| LookPixmapImage | *slidEVr; | |
| LookPixmapImage | *slidSeVr: | |
| LookPixmapImage | *slidSwHr: | |
| LookPixmapImage | *slidSHr; | |
| LookPixmapImage | *slidSeHr; | |
| LookPixmapImage | *slidSeVrHr; | |
| LookPixmapImage | *slidLiftNeVr; | Slider lift elements |
| LookPixmapImage | *slidLiftEVr; | |
| LookPixmapImage | *slidLiftSeVr, | |
| LookPixmapImage | *slidliftSwHr; | |
| LookPixmapImage | *slidLiftSHr; | |
| LookPixmapImage | *slidLiftSeHr; | |
| } | | |
| MhwWgtLookPixmapAllImages; | | |

This section describes the LookPixmap module, including the LookPixmap class, which has been created to allow a set of different looks to be applied to the Web Browser.

This module contains the following source files: MhwWgtLookPixmap.h;

MhwWgtLookPixmapStruct.h; WgtLookPixmapClass.c; WgtLookPixmapPrivate.c;

MhwWgtLookPixmalImages.h;
MhwWgtLookPixmapImages2.h;
MhwWgtLookPixmapImages3.h;
MhwWgtLookPixmapImages4.h;
MhwWgtLookPixmapImages5.h; and
MhwWgtLookPixmapImages6.h.

The LookPixmap Module will now be described, including details of the preferred method of creating and using LookPixmap Objects.

Any software using WGT for the creation and management of Widgets can use the LookPixmap module to provide alternative looks to the WGT widgets. For an application to use the LookPixmap look, a LookPixmap object must be created. This can be done using the following code:

| MhwWgtLkWebClass | PixmapLook; |
|---|---|
| MhwWgtLkWeb | PixmapLookObject; |
| MhwWgtLkWebAtts | LookPixmapValues; |
| MhwWgtError | WgtErr; |

WgtErr = MhwWgtLkWebInitClass ( );
WgtErr = MhwWgtLkWebAttsInit (&LookPixmapValues);
WgtErr = MhwWgtLkWebInitDefault (&PixmapLook, &LookPixmapValues);
PixmapLookObject = MhwWgtLkWebNew (&LookPixMapValues);

A method for setting the default look is now described.

An application can use a given look object by default. By default. the default look is the LookWgt object created by WGT. In order to set another default look, on condition that it has already been created as described above. the following function can be used:

MhwWgtSetDefaultLook ((MhwWgtLook) PixmapLookObject);

All subsequent WGT widgets created will be associated with the LookPixmap look class and not the WGT default LookWgt An application can choose or set a look for a given type of widget, or a given widget, as will now be described.

An application can set the look for a given widget when the object is created by calling the following function just before the widget is created:

MhwWgtXXXAttsSetLook (MhwWgtXXXAtts*, MhwWgtLook);

It can also set the look of an object after creation using the following function:

MhwWgtXXXsetLook (MhwWgtXXXWidget *, MhwWgtLook);

(where xxx is the type of widget—eg LIST).

The method of using LookPixmap Images is now described.

A single LookPixmap object uses a single set of images. You can obviously change the look dramatically, simply by changing the images.

You can change the images used for a given LookPixmap object by calling the following functions:

MhwWgtLookPixmapSetImages (MhwWgtLookPixmap *, MhwWgtLookPixmapAllImages*);

Sets the images used for all widgets using the specified LookPixmap object to the specified image set.

MhwWgtLookPixmapSetDefaultImages (MhwWgtLookPixmap*);

Sets the images used for all widgets using the specified LookPixmap object to the default image set.

If you wish to use different images for different widgets, you must create a LookPixmap object for each set of images required. You then assign each image set to the appropriate look, and then associate each look to the appropriate widget.

The API of the LookPixmap module will now be described, with reference to FIGS. 39 and 41.

The following public APIs are available:

MhwWptLookPixmapSetImages( )
  Prototype:

| MhwWgtError MhwWgtLookPixmap SetImages | (MhwWgtLkWeb aLook, MhwWgtLookPixmapAllImages* someImages); |
|---|---|

Description
Sets the set of images used by aLook to the set of images pointed to by someImages.

Parameters:
  aLook       The MhwWgtLkWeb object to which to associate
              the images, someImages
  someImages  The set of images to associate with aLook.
Returns:
  MHW_WGT_SUCCESS MhwWgtLookPixmapSetImagesID( )
  Prototype:

| MhwWgtError MhwWgtLookPixmapSetImagesID | (MhwWgtLkWeb aLook, Card8 anImageID); |
|---|---|

Description
Sets the set of images used by aLook to the set of images hard-programmed in MhwWgtLookPixMap and identified by anImageID.

Parameters:
  aLook       The MhwWgtLkWeb object to which to associate
              the images identified by anImageID.
  anImageID   The identifier of the set of images, hard-
              programmed in MhwWgtLookPixmap, to associate
              with aLook.
Returns:
  MHW_WGT_SUCCESS MhwWgtLookPixmapSetDefaultImages( )
  Prototype:

| MhwWgtError MhwWgtLookPixmapSetDefaultImages | (MhwWgtLkWeb aLook); |
|---|---|

Description
Sets the set of images used by aLook to the set of images hard-programmed in MhwWgtLookPixmap and identified by the identifier 1.

Parameters:
  aLook   The MhwWgtLkWeb object to which to associate the
          images identified by anImageID.
Returns:
  MHW_WGT_SUCCESS MhwWgtLookPixmapLoadImage( )
  Prototype:

| MhwWgtError MhwWgtLookPixmapLoadImage | (MhwWgtLkWeb aLook, Int32 anElementID, Int32 aWidth, Int32 aHeight, Card8* anImageBuffer); |
|---|---|

Description:
Used to change a single image pointed to by the current MhwWgtLookPixmapAllImages structure to point at the specified image. Creates an LookPixmapImage structure and sets the current MhwWgtLookPimapAllImages structure pointed to by aLook to point at this LookPixmapImage for the element specified by anElementID.

Parameters:
  aLook          The MhwWgtLkWeb object to which to associate
                 the images identified by anImageID.
  anElementID    The identifier of the element to change.
  aWidth         The width, in pixels, of the new image.
  aHeight        The height, in pixels, of the new image.
  anImageBuffer  The buffer containing the new image data.
Returns:
  MHW_WGT_SUCCESS LookPixmapMakeImageFromElements( )
  Prototype:

| MhwWgtError LookPixmapMakeImageFromElements | (LookPixmapImage* elemN, LookPixmapImage* elemE, LookPixmapImage* elemW, LookPixmapImage* elemS, LookPixmapImage* elemNW, LookPixmapImage* elemE, LookPixmapImage* elemSW, LookPixmapImage* elemSE, LookPixmapImage* elemC, Card16 anX, Card16 aY, Card16 aWidth, Card16 aHeight, MHWWindowID aWindow, LookPixmapDrawMode aDrawMode); |
|---|---|

Description:
Takes the nine images of elemX and draws them in the specified MHW window. The rules for constructing the image are specified by aDrawMode (currently only MHW_WGT_LIKWEB_DRAW_NORMAL exists). The final image is drawn in the window with the top left corner positioned at (anX, aY) and of size aWidthxaHeight.

If one or more of the elements have zero size (either elemXX.width or elemXX.height is zero) this element is not drawn.

Parameters:
  elemN, elemE, elemW, elemS, elemNW, elemNE, elemSW,
  elemSE, elemC: the
                image to draw at the top, right, left, bottom, top left
                corner, top right corner, bottom left corner, bottom
                right corner and middle, respectively.
  anX           The x-position in the window, aWindow, to draw
                the final image.
  aY            The y-position in the window, aWindow, to draw
                the final image.

| | |
|---|---|
| αWidth | The width, in pixels, of the new image. |
| αHeight | The height, in pixels, of the new image. |
| αWindow | The window in which to draw the constructed image. |
| αDrawMode | The mode in which to construct the image. MHW_WGT_LKWEB_DRAW_NORMAL: Puts the NW (2100), NE (2101), SW (2102) and SE (2103) elements in the four corners (2200, 2201, 2202, 2203) with no tiling. Horizontally tiles the N and S elements. Vertically tiles the W and E elements. Tiles both horizontally and vertically the C element. Although it will work for any image sizes, it is only guaranteed to correctly tile the area provided that the central area (2208) is rectangular. |
| Returns: | MHW_WGT_SUCCESS |

The Mhw.awt Java Interface Package will now be described.

Three Java classes have been developed so that the Look mechanism defined in WGT can be exploited by java applications. These are: mhw.awt.Look; mhw.awt.WgtLook; and mhw.awt.PixmapLook.

The Look class is the abstract class corresponding to the class MhwWgtLook described above.

The WgtLook class is used to create and handle instances of the WGT class MhwWgtLookWgt.

The PixmapLook class is used to store the images used by the WgtLook class.

The Mhw.awt.PixmapLook API will now be described, beginning with details of the constructors.

PixmapLook public PixmapLook( )

Creates a new instance of a PixmapLook object, with the images initialised to the default images (ID=1).

PixmapLook public PixmapLook (int imageID)

Creates a new instance of a PixmapLook object, with the images initialised to the images specified by imageID.

The methods will now be described.

SetImages

| | |
|---|---|
| public void | SetImages( ) |

Set the current images for this PixmapLook object to the default (ID=I)

SetImages

| | | |
|---|---|---|
| public void | SetImages | (int imageID) |

Set the current Images for this PixmapLook object to the images specified by imageID.

LoadImage

| | | |
|---|---|---|
| public void | LoadImage | (int elementID, int width, int height, byte[ ] buffer) |

Loads a specified image element. Each PixmapLook object has a set of (94) images associated with it. These images represent the graphic component elements as follows: 0 relnoNW; 1 relnoSW; 2 relnoNE; 3 relnoSE; 4 relnoN; 5 relnoW; 6 relnoE; 7 relnoS; 8 relnoC; 9 relfoNW; 10 relfoSW; 11 relfoNE; 12 relfoSE, 13 relfoN; 14 relfoW; 15 relfoE; 16 relfoS; 17 relfoC; 18 relhiNW; 19 relhiSW; 20 relhiNE; 21 relhiSE; 22 relhiN; 23 relhiW; 24 relhiE; 25 relhiS; 26 relhiC; 27 relfhNW; 28 relfhSW; 29 relfhNE; 30 relfhSE; 31 relfhN; 32 relfhW; 33 relfhE; 34 relfhS; 35 relfh C; 36 butnoNW; 37 butnoSW; 38 butnoNE; 39 butnoSE; 40 butnoN; 41 butnoW; 42 butnoE; 43 butnoS; 44 butnoC; 45 butfoNW; 46 butfoSW; 47 butfoNE; 48 butfoSE; 49 butfoN; 50 butfoW; 51 butfoE; 52 butfoS; 53 butfoC; 54 buthiNW; 55 buthiSW; 56 buthiNE; 57 buthiSE; 58 buthiN; 59 buthiW; 60 buthiE; 61 buthiS; 62 buthiC; 63 butfhNW; 64 butfhSW; 65 butfhNE; 66 butfhSE; 67 butfhN; 68 butfhW; 69 butfhE; 70 butfhS; 71 butfhC; 72 choice; 73 chcklno; 74 chcklse; 75 chcklfo; 76 chcklfs; 77 chck2no; 78 chck2se; 79 chck2fo; 80 chck2fs; 81 slidNeVr, 82 slidEVr, 83 slidSeVr; 84 slidSwHr, 85 slidSHr; 86 slidSeHr; 87 slidSeVrHr; 88 slidLiftNeVr, 89 slidLiftEVr, 90 slidLiftSeVr; 91 slidLiftSwHr; 92 slidLiftSHr, 93 slidLiftSeHr.

width specifies the width of the image passed.

height specifies the height of the image passed.

buffer contains the image data. This is in the form of a byte array, each byte giving the colormap index to be used for each pixel. The index used for pixel (x,y) is buffer [(y*width)+x].

MakeImageFromElements

| | | |
|---|---|---|
| public void | MakeImageFromElements | (int[ ] widths, int[ ] heights, byte[ ][ ] buffers, int anX, int aY, int aWidth, int aHeight, java.awt.Component aComponent) |

Constructs an image based on 9 elements (N, E, W, S, NW, NE, SW, SE, C) and draw it on the window associated with the component aComponent with the top left corner at (anX, aY) and with size aWidth×aHeight. The image buffers are passed as a two dimensional array, one dimension giving the image number (0–8 corresponding to N, E, W, S, NW, NE, SW, SE, C) and the other containing the data. The widths and heights of each buffer are given in the arrays widths and heights.

DownloadLookDir public java.lang.String DownloadLookDir( )

Downloads a "look" directory from the MPEG stream. Returns a string containing information on each set of look images which can be downloaded separated by newlines. The line number of a title (0 to n−1) corresponds to the identifier (ImageSet) to be used with the function DownLoadLookImages(int ImageSet).

The directory is in fact a simple text file containing the string that is returned. The file path is hard coded in the source—currently /home/users/mstoddar/mhplus/util/looks/images.dir. This can be changed as appropriate. This can thus be used in the decoder to automatically download from the MPEG stream.

The format of the file is:
<Image Set Title 1>\t<>Image Set Descriptions><\t><URL Resoucrce><\t><URL Preview><\n>
<Image Set Title 2><\t<Image Set Description><\t><URL Resource><\t><URL Preview><\n>
<Image Set Title 3><\t><Image Set Description><\t><URL Resource><\t><URL Preview><\n>
<Image Set Title 4><\n><Image Set Description><URL Resource><\t><URL Preview><\n>
Returns " " if unsuccessful.

DownloadLookImages
public void DownloadLookImages (int ImageSet)
Downloads a new set of images from the MPEG stream, identified by the line number (0 to n−1) of one of the entries returned in DownLoadLookDir( ), and attributes them to this look.
The file containing the data is in the following format:
WWWWHHHHWWWWHHHH . . . a series of four byte strings (leading spaces) containing the decimal values of the widths and heights of all 94 images (in the same order as in the method LoadImage( )). The data buffers for each image follow, again in the same format as LoadImage( ). No alignment is made between images, the beginning of the next image starting at the byte following the previous one.
The file path is hard coded in the source—currently /home/users/mstoddar/mhplus/util/looks/
images.<ImageSet>. This can be changed as appropriate. This can thus be used in the decoder to automatically download from the MPEG stream.
public void DownloadLookImages (string ImageURL)
Downloads a new set of images from the MPEG stream, identified by the URL specified, and attributes them to this look.
The file containing the data is in the format given above.
The structure of the file is given below in C syntax for clarity:
Card8 relnoNWwidth[4π String representation of decimal value (leading spaces)
Card8 relnoNWheight[4]
Card8 relnoSWwidth[4]
Card8 relnoSWheight(4]
Card8 relnoNEwidth[4]
Card8 relnoNEheight[4]
Card8 reinoSEwidth[4]
Card8 relnoSEheight[4]
Card8 relnoNwidth[4]
Card8 relnoNheight[4]
Card8 relnoWwidth[4]
Card8 relnoWheight[4]
Card8 relnoEwidth[4]
Card8 relnoEheight[4]
Card8 relnoSwidth[4]
Card8 relnoSheight[4]
Card8 relnoCwidth[4]
Card8 relnoCheight[4]
Card8 relfoNWwidth[4]
Card8 relfoNWheight[4]
Card8 relfoSWwidth[4]
Card8 relfoSWheight[4]
Card8 relfoNEwidth[4]
Card8 relfoNEheight[4]
Card8 relfoSEwidth[4]
Card8 relfoSEheight[4]
Card8 relfoNwidth[4]
Card8 relfoNheight[4]
Card8 relfoWwidth[4]
Card8 relfoWheight[4]
Card8 relfoEwidth[4]
Card8 relfoEheight[4]
Card8 relfoSwidth[4]
Card8 relfoSheight[4]
Card8 relfoCwidth[4]
Card8 relfoCheight[4]
Card8 relhiNWwidth[4]
Card8 relhiNWheight[4]
Card8 relhiSWwidth[4]
Card8 relhiSWheight[4]
Card8 relhiNEwidth[4]
Card8 relhiNEheight[4]
Card8 relhiSEwidth[4]
Card8 relhiSEheight[4]
Card8 relhiNwidth[4]
Card8 relhiNheight[4]
Card8 relhiWwidth[4]
Card8 relhiWheight[4]
Card8 relhiEwidth[4]
Card8 relhiEheight[4]
Card8 relhiSwidth[4]
Card8 relhiSheight[4]
Card8 relhiCwidth[4]
Card8 relhiCheight[4]
Card8 relfhNWwidth[4]
Card8 relfhNWheight[4]
Card8 relfhSWwidth[4]
Card8 relfhSWheight[4]
Card8 relfhNEwidth[d]
Card8 relfhNEheight[4]
Card8 relfhSEwidth[4]
Card8 relfhSEheight[4]
Card8 relfhNwidth[4]
Card8 relfhNheight[4]
Card8 relfhWwidth[4]
Card8 relfhWheight[4]
Card8 relfhEwidth[4]
Card8 relfhEheight[4]
Card8 relfhSwidth[4]
Card8 relfhSheight[4]
Card8 relfhCwidth[4]
Card8 relfhCheight[4]
Card8 butnoNWwidth[4]
Card8 butnoNWheight[4]
Card8 butnoSWwidth[4]
Card8 butnoSWheight[4]
Card8 butnoNEwidth[4]
Card8 butnoNEheight[4]
Card8 butnoSEwidth[4]
Card8 butnoSEheight[4]
Card8 butnoNwidth[4]
Card8 butnoNheight[4]
Card8 butnoWwidth[4]
Card8 butnoWheight[4]
Card8 butnoEwidth[4]
Card8 butnoEheight[4]
Card8 butnoSwidth[4]
Card8 butnoSheight[4]
Card8 butnoCwidth[4]
Card8 butnoCheight[4]
Card8 butfoNWwidth[4]
Card8 butfoNWheight[4]
Card8 butfoSWwidth[4]
Card8 butfoSWheight[4]
Card8 butfoNEwidth[4]

Card8 butfoNEheight[4]
Card8 butfoSEwidth[4]
Card8 butfoSEheight[4]
Card8 butfoNwidth[4]
Card8 butfoNheight[4]
Card8 butfoWwidth[4]
Card8 butfoWheight[4]
Card8 butfoEwidth[4]
Card8 butfoEheight[4]
Card8 butfoSwidth[4]
Card8 butfoSheight[4]
Card8 butfoCwidth[4]
Card8 butfoCheight[4]
Card8 buthiNWwidth[4]
Card8 buthiNWheight[4]
Card8 buthiSWwidth[4]
Card8 buthiSWheight[4]
Card8 buthiNEwidth[4]
Card8 buthiNEheight[4]
Card8 buthiSEwidth[4]
Card8 buthiSEheight[4]
Card8 buthiNwidth[4]
Card8 buthiNheight[4]
Card8 buthiWwidth[4]
Card8 buthiWheight[4]
Card8 buthiEwidth[4]
Card8 buthiEheight[4]
Card8 buthiSwidth[4]
Card8 buthiSheight[4]
Card8 buthiCwidth[4]
Card8 buthiCheight[4]
Card8 butfhNWwidth[4
Card8 butfhNWheight[4]
Card8 butfhSWwidth[4]
Card8 burfhSWheight[4]
Card8 butfhNEwidth[4]
Card8 butfhNEheight[4]
Card8 butfhSEwidth[4]
Card8 butfhSEheight[4]
Card8 butfhNwidth[4]
Card8 butfhNheight[4]
Card8 butfhWwidth[4]
Card8 butfhwheight[4]
Card8 butfhEwidth[4]
Card8 butfhEheight[4]
Card8 butfhSwidth[4]
Card8 butfhSheight[4]
Card8 butfhCwidth[4]
Card8 butfhCheight[4]
Card8 choicewidth[4]
Card8 choiceheight[4]
Card8 chcklnowidth[4]
Card8 chckinoheight[4]
Card8 chcklsewidth[4]
Card8 chcklseheight[4]
Card8 chcklfowidth[4]
Card8 chcklfoheight[4]
Card8 chcklfswidth[4]
Card8 chcklfsheight[4]
Card8 chck2nowidth[4]
Card8 chck2noheight[4]
Card8 chck2sewidth[4]
Card8 chck2seheight[4]
Card8 chck2fowidth[4]
Card8 chck2foheight[4]
Card8 chck2fswidth[4]
Card8 chck2faheight[4]

Card8 slidNeVrwidth[4]
Card8 slidNeVrheight[4]
Card8 slidEVrwidth[4]
Card8 slidEVrheight[4]
Card8 slidSeVrwidth[4]
Card8 slidSeVrheight[4]
Card8 slidSwHrwidth[4]
Card8 slidSwHrheight[4]
Card8 slidSHrwidth[4]
Card8 slidSHrheight[4]
Card8 slidSeHrwidth[4]
Card8 slidSeHrheight[4]
Card8 slidSeVrHrwidth[4]
Card8 slidSeVrHrheight[4]
Card8 slidLiftNeVrwidth[4]
Card8 slidLiftNeVrheight[4]
Card8 slidLiftEVrwidth[4]
Card8 slidLiftEVrheight[4]
Card8 slidLiftSeVrwidth[4]
Card8 slidLiftSeVrheight[4]
Card8 slidLiftSwHrwidth[4]
Card8 slidLiftSwHrheight[4]
Card8 slidLiftSHrwidth[4]
Card8 slidLiftSHrheight[4]
Card8 slidLiftSeHrwidth[4]
Card8 slidLiftSeHrheight[4]
Card8 RelnoNWbuffer[width×height]
Card8 RelnoSWbuffer[width×height]
Card8 RelnoNEbuffer[width×height]
Card8 RelnoSEbuffer[width×height]
Card8 RelnoNbuffer[width×height]
Card8 RelnoWbuffer[width×height]
Card8 RelnoEbuffer[width×height]
Card8 RelnoSbuffer[width×height]
Card8 RelnoCbuffer[width×height]
Card8 RelfoNWbuffer[width×height]
Card8 RelfoSWbuffer[width×height]
Card8 RelfoNEbuffer[width×height]
Card8 ReltoSEbuffer[width×height]
Card8 RelfoNbuffer[width×height]
Card8 RelfoWbuffer[width×height]
Card8 RelfoEbuffer[width×height]
Card8 RelfoSbuffer[width×height]
Card8 RelfoCbuffer[width×height]
Card8 RelhiNWbuffer[width×height]
Card8 RelhiSWbuffer[width×height]
Card8 RelhiNEbuffer[width×height]
Card8 RelhiSEbuffer[width×height]
Card8 RelhiNbuffer[width×height]
Card8 RelhiWbuffer[width×height]
Card8 RelhiEbuffer[width×height]
Card8 RelhiSbuffer[width×height]
Card8 RelhiCbuffer[width×height]
Card8 RelfhNWbuffer[width×height]
Card8 RelfhSWbuffer[width×height]
Card8 RelfhNEbuffer[width×height]
Card8 RelfhSEbuffer[width×height]
Card8 RelfhNbuffer[width×height]
Card8 RelfhWbuffer[width×height]
Card8 RelfhEbuffer[width×height]
Card8 RelfhSbuffer[width×height]
Card8 RelfhCbuffer[width×height]
Card8 ButnoNWbuffer[width×height]
Card8 ButnoSWbuffer[width×height]
Card8 ButnoNEbuffer[width×height]
Card8 ButnoSEbuffer[width×height]
Card8 ButnoNbuffer[width×height]

Card8 ButnoWbuffer[width×height]
Card8 ButnoEbuffer[width×height]
Card8 ButnoSbuffer[width×height]
Card8 ButnoCbuffer[width×height]
Card8 ButfoNWbuffer[width×height]
Card8 ButfoSWbuffer[width×height]
Card8 ButfoNEbuffer[width×height]
Card8 ButfoSEbuffer[width×height]
Card8 ButfoNbuffer[width×height]
Card8 ButfoWbuffer[width×height]
Card8 ButfoEbuffer[width×height]
Card8 ButfoSbuffer[width×height]
Card8 ButfoCbuffer[width×height]
Card8 ButhiNWbuffer[width×height]
Card8 ButhiSWbuffer[width×height]
Card8 ButhiNEbuffer[width×height]
Card8 ButhiSEbuffer[width×height]
Card8 ButhiNbuffer[width×height]
Card8 ButhiWbuffer[width×height]
Card8 ButhiEbuffer[width×height]
Card8 ButhiSbuffer[width×height]
Card8 ButhiCbuffer[width×height]
Card8 ButfhNWbuffer[width×height]
Card8 ButfhSWbuffer[width×height]
Card8 ButfhNEbuffer[width×height]
Card8 ButfhSEbuffer[width×height]
Card8 ButfhNbuffer[width×height]
Card8 ButfhWbuffer[width×height]
Card8 ButfhEbuffer[width×height]
Card8 ButfhSbuffer[width×height]
Card8 ButfhCbuffer[width×height]
Card8 Choicebuffer[width×height]
Card8 chcklnobuffer[width×height]
Card8 chcklsebuffer[width×height]
Card8 chcklfobuffer[width×height]
Card8 chcklfsbuffer[width×height]
Card8 chck2nobuffer[width×height]
Card8 chck2sebuffer[width×height]
Card8 chck2fobuffer[width×height]
Card8 chck2fsbuffer[width×height]
Card8 slidNeVrbuffer[width×height]
Card8 slidEVrbuffer[width×height]
Card8 slidSeVrbuffer[width×height]
Card8 slidSwHrbuffer[width×height]
Card8 slidSHrbuffer[width×height]
Card8 slidSeHrbuffer[width×height]
Card8 slidSeVrHrbuffer[width×height]
Card8 slidLiftNeVrbuffer[width×height]
Card8 slidLiftEVrbuffer[width×height]
Card8 slidLiftSeVrbuffer[width×height]
Card8 slidLiftSwHrbuffer[width×height]
Card8 slidLiEtSHrbuffer[width×height]
Card8 slidLiftSeHrbuffer[width×height]

For Example:

|         | Width | Height | Width | Height |
|---------|-------|--------|-------|--------|
| 0000000 | 8     | 8      | 8     | 8      |
| 0000020 | 8     | 8      | 8     | 8      |
| 0000040 | 8     | 8      | 8     | 8      |
| 0000060 | 8     | 8      | 8     | 8      |
| 0000100 | 8     | 8      | 8     | 8      |
| 0000120 | 8     | 8      | 8     | 8      |
| 0000140 | 8     | 8      | 8     | 8      |
| 0000160 | 8     | 8      | 8     | 8      |
| 0000200 | 8     | 8      | 1     | 1      |
| 0000220 | 8     | 8      | 8     | 8      |
| 0000240 | 8     | 8      | 8     | 8      |
| 0000260 | 8     | 8      | 8     | 8      |
| 0000300 | 8     | 8      | 8     | 8      |
| 0000320 | 1     | 1      | 8     | 8      |
| 0000340 | 8     | 8      | 8     | 8      |
| 0000360 | 8     | 8      | 8     | 8      |
| 0000400 | 8     | 8      | 8     | 8      |
| 0000420 | 8     | 8      | 1     | 1      |
| 0000440 | 8     | 8      | 8     | 8      |
| 0000460 | 8     | 8      | 8     | 8      |
| 0000500 | 8     | 8      | 8     | 8      |
| 0000520 | 8     | 8      | 8     | 8      |
| 0000540 | 1     | 1      | 8     | 8      |
| 0000560 | 8     | 8      | 8     | 8      |
| 0000600 | 8     | 8      | 8     | 8      |
| 0000620 | 8     | 8      | 8     | 8      |
| 0000640 | 8     | 8      | 1     | 1      |
| 0000660 | 8     | 8      | 8     | 8      |
| 0000700 | 8     | 8      | 8     | 8      |
| 0000720 | 8     | 8      | 8     | 8      |
| 0000740 | 8     | 8      | 8     | 8      |
| 0000760 | 1     | 1      | 8     | 8      |
| 0001000 | 8     | 8      | 8     | 8      |
| 0001020 | 8     | 8      | 8     | 8      |
| 0001040 | 8     | 8      | 8     | 8      |
| 0001060 | 8     | 8      | 1     | 1      |
| 0001100 | 16    | 16     | 16    | 16     |
| 0001120 | 16    | 16     | 16    | 16     |
| 0001140 | 16    | 16     | 16    | 16     |
| 0001160 | 16    | 16     | 16    | 16     |
| 0001200 | 16    | 16     | 8     | 8      |
| 0001220 | 8     | 8      | 8     | 8      |
| 0001240 | 8     | 8      | 8     | 8      |
| 0001260 | 8     | 8      | 1     | 1      |
| 0001300 | 2     | 2      | 2     | 2      |
| 0001320 | 2     | 2      | 2     | 2      |
| 0001340 | 2     | 2      | 2     | 2      |

| Start of buffer 1 data. (relnoNW) (8 × 8 bytes) | | | | | | | | | | | | | | | |
|---|---|---|---|---|---|---|---|---|---|---|---|---|---|---|---|
| 0001360 | \0 | \0 | \0 | \0 | \0 | 266 | 004 | 004 | \0 | \0 | \0 | 266 | \n | \r | \r | \r |
| 0001400 | \0 | \0 | \n | \r | 017 | \r | \v | 001 | \0 | 266 | \r | 017 | \r | 001 | 001 | 001 |
| 0001420 | \0 | \n | 017 | \r | 001 | 001 | 001 | 001 | 265 | \r | \r | 001 | 001 | 001 | 001 | 001 |
| 0001440 | 004 | \r | \v | 001 | 001 | 001 | 001 | 001 | 004 | \v | 001 | 001 | 001 | 001 | 001 | 006 |
| Start of buffer 2 data. (relnoSW) (8 × 8 bytes) | | | | | | | | | | | | | | | |
| 0001460 | 004 | 004 | 263 | \0 | \0 | \0 | \0 | \r | \r | \v | 004 | \a | \0 | \0 | \0 |
| 0001500 | 001 | 001 | 001 | 270 | 004 | 262 | \0 | \0 | 001 | 001 | 001 | 001 | \n | 004 | 004 | \0 |
| 0001520 | 001 | 001 | 001 | 001 | 001 | \n | \a | \0 | 001 | 001 | 001 | 001 | 001 | 270 | \L | 265 |
| 0001540 | 001 | 001 | 001 | 001 | 001 | 270 | \t | \a | 006 | 001 | 001 | 001 | 001 | 270 | \C | 006 |
| Start of buffer 3 data. (relnoNE) (8 × 8 bytes) | | | | | | | | | | | | | | | |
| 0001560 | 004 | \v | 001 | 001 | 001 | 001 | 001 | 006 | \b | 001 | 001 | 001 | 001 | 001 | 001 | 001 |
| 0001600 | 006 | \n | 001 | 001 | 001 | 001 | 001 | 001 | \0 | 265 | \n | 001 | 001 | 001 | 001 | 001 |

-continued

| | | | | | | | | | | | | | | | | |
|---|---|---|---|---|---|---|---|---|---|---|---|---|---|---|---|---|
| 0001620 | \0 | 006 | \t | \rL | 001 | 001 | 001 | 001 | \0 | \0 | 261 | \t | \n | \n | \n | \n |
| 0001640 | \0 | \0 | \0 | 006 | 022 | 265 | 265 | \t | \0 | \0 | \0 | \0 | \0 | \a | 006 | 006 |
| Start of buffer 4 data. (relnoSE) (8 × 8 bytes) | | | | | | | | | | | | | | | | |
| 0001660 | \r | 001 | 001 | 001 | 001 | 270 | \t | 006 | 001 | 001 | 001 | 001 | 001 | 270 | \t | 006 |
| 0001700 | 001 | 001 | 001 | 001 | 001 | \n | 265 | 261 | 001 | 001 | 001 | 001 | \n | 266 | 261 | \0 |
| 0001720 | 001 | 001 | 001 | \n | 266 | \b | 261 | \0 | 270 | 270 | 004 | 266 | \b | 261 | \0 | \0 |
| 0001740 | \t | \t | \b | 261 | 261 | \0 | \0 | \0 | 006 | 006 | 261 | \0 | \0 | \0 | \0 | \0 | etc.

reDrawAll public void reDrawAll( )

Finds the widget with the focus, then the parents until no more. Top window then set to invisible and visible again. Then the whole window should be redrawn.

The various methods described above for displaying one or more graphical objects, for navigating between a plurality of such objects, or for receiving input from the user may equally be applied to other areas primarily, but not exclusively, within the context of the reception of broadcasts from a broadcast supplier. In general, any functionality of a set-top box involving visual interaction with a user may employ such methods.

For example, a navigable chain of icons, possibly with subchains attached, could be employed in a home shopping application, to allow the user to display articles, view prices, place orders and otherwise interact with the application. The graphical object used to place an order might, when highlighted, automatically 'flip' in the manner described above between the symbol to buy (for example, a dollar sign, $) and text representing the amount spent so far, or the word "buy" in the language of the subscriber. Alternatively, or in addition, a graphical object containing the word 'buy' in the subscriber's language, could appear whenever the 'buy' icon is selected, and provide a branch for any sub-chains to 'hang off'.

The 'buy' icon in the above example might be placed next to an icon which, when clicked, views the list of purchases made so far, and another icon which, when clicked, sets delivery options for the products just bought, so as to provide a logical sequence of icons in the chain which the user can navigate. When the 'buy' icon is selected, a sub-chain could appear with various subsidiary options, which might include different credit plans in the case of more expensive items. Any text information required from the user, such as a street address for delivery, could be entered with the virtual keyboard.

In an electronic programme guide, similar methods could be employed, for interactively browsing and displaying different channels, themes and times and dates. Further customisation might be possible for re-arranging the graphic options in the chain according to the user's preferences; in the case of a chain of channels, the user's preferred channels could be grouped at the head of the chain. Such a preference could be indicated by the user, or deduced by the programme.

Other applications for the methods described above include on-line catalogues, news and weather services on demand, games, and general administration of the set-top box (managing its configuration, etc.). In the case of games, the head/tail flip-flop effect could be used to provide in-game animations without necessarily requiring additional methods to be written, and the virtual keyboard could be used as an alternative form of controller for more advanced types of game.

It should also be appreciated that all methods of interaction using a remote control, as described herein, may be substituted or supplemented by the use of a mouse (or other directional controller, such as a rollerball or joystick) and/or keyboard (or other device having a plurality of keys), either by simulating the buttons of a remote control (for example using the numbers 0–9; the arrow keys, and the return key on a keyboard) or directly (for example using the mouse to click on buttons, and the keyboard to enter text directly instead of using the virtual keyboard).

The Virtual Keyboard described above may be implemented on any device having a plurality of keys, such as a games machine or a mobile telephone, for example. In the latter case, the virtual keyboard could be displayed substantially as described on the screen of the telephone (on phones with a sufficiently large display), or in a compressed form (on phone with smaller displays). Such compression of the virtual keyboard might entail showing only one number block of characters at a time, preferably with a suggestion of the characters or types of characters which might be accessed by pressing the left, right, up and/or down keys (or their equivalents, for example in the case of roller-type directional controllers). The compressed virtual keyboard may be used in other applications, particularly where there is little space available to display the keyboard.

The term 'check box' may refer to a graphical object of any shape, for example circular, which is able to display different states, preferably two states corresponding to 'checked' and 'unchecked', but possibly more than two states, and which may alter its state in a consistent fashion when clicked or selected by the user. The 'checked' state may be indicated by a tick, cross or other embellishment on the box.

For ease of reference, the terms below used herein have the following preferred meanings:—

HTML: HyperText Markup Language, a language describing the documents which are interchanged on the Internet. The document may include references to sites, formatting information, sound and pictures, etc.

HTTP: HyperText Transport Protocol, a protocol for communicating between Internet servers holding HTML documents and a navigation application, which displays the HTML documents.

MPEG-2: Motion Picture Expert Group, a method of coding animated images and sound in realtime.

PPP: Point-to-Point Protocol, a distance access communications protocol allowing two computers to be networked via a modem.

PROXY SERVER: An application located on the server which allows secure Internet connections, and which also buffers HTTP and FTP requests.

SESSION: An instance of a type of connection or of an application in memory at a given point in time.

URL: Uniform Resource Locator, an address used to locate a file or resources on the Internet. A link to a site designates the address of the resource contained in the web page.

WWW: World Wide Web, Internet network using local or remote documents. A web document is a web page, and the links in the page allow navigation between different pages and between different subjects, regardless of whether situated on a local or remote network.

GUI: Graphical User Interface.

WGT: Widget Toolkit.

It will be understood that the present invention has been described above purely by way of example, and modifications of detail can be made within the scope of the invention.

Each feature disclosed in the description, and (where appropriate) the claims and drawings may be provided independently or in any appropriate combination.

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like are performed on or using electrical and like signals.

Features which relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term "computer system" may be interchanged for "computer", "system", "equipment", "apparatus", "machine" and like terms.

Reference numerals appearing in the claims are by way of illustration only and shall have no limiting effect on the scope of the claims.

The Applicant hereby declares, for the avoidance of doubt that he claims copyright in the attached drawings.

The invention claimed is:

1. A method of controlling the appearance of an object-oriented widget in a graphical user interface, comprising:
   defining a look object class, wherein the look object class is linked into an application; and
   associating the look object class with the object-oriented widget;
   wherein the look object class includes code or parameters determining how the object-oriented widget is displayed,
   wherein the look object class is configured to control the appearance of the object-oriented widget, and
   wherein the look object class includes an update counter whose value is updated when the look object class is re-defined or modified.

2. A method according to claim 1, wherein the look object class is defined by object-oriented program code.

3. A method according to claim 1, wherein the object-oriented widget includes an attribute identifying the look object class associated with the object-oriented widget.

4. A method according to claim 1, further comprising modifying the appearance of the object-oriented widget by re-defining or modifying the look object class or by associating a different look object class with the object-oriented widget.

5. A method according to claim 1, wherein the look object class includes a validation mask which indicates methods that can be called by the look object class.

6. A method according to claim 1, further comprising controlling the appearance of a plurality of object-oriented widgets in a graphical user interface by associating the look object class with the plurality of object-oriented widgets.

7. A method according to claim 6, wherein the plurality of object-oriented widgets comprises a linked chain.

8. A method according to claim 1, wherein the look object class includes a counter which indicates the number of object-oriented widgets which are associated with that look object class.

9. Apparatus for controlling the appearance of an object-oriented widget in a graphical user interface, comprising:
   means for defining a look object class, wherein the look object class is linked into an application; and
   means for associating the look object class with the object-oriented widget; and
   means for displaying the object-oriented widget,
   wherein the object-oriented widget is an application intended to be displayed,
   wherein the look object class is configured to control the appearance of the object-oriented widget, and
   wherein the look object class includes an update counter whose value is updated when the look object class is re-defined or modified.

10. A computer program comprising code for:
    defining a look object class, wherein the look object class is linked into an application; and
    associating the look object class with an object-oriented widget;
    wherein the object-oriented widget is an application intended to be displayed, and
    wherein the look object class is configured to control the appearance of the object-oriented widget, and
    wherein the look object class includes an update counter whose value is updated when the look object class is re-defined or modified.

11. A computer program product comprising a memory and processor, the memory having stored therein an application, and the processor (under the control of the application) being adapted to carry out the method as claimed in claim 1.

12. A computer program product comprising a program for carrying out the method as claimed in claim 1.

13. A computer program for carrying out the method of claim 1.

14. A computer readable medium having stored thereon a program for carrying out the method as claimed in claim 1.

* * * * *